US006079707A

United States Patent [19]
Fujiwara et al.

[11] Patent Number: 6,079,707
[45] Date of Patent: Jun. 27, 2000

[54] APPARATUS HAVING DOCUMENT TRANSPORT MECHANISM

[75] Inventors: Tatsuo Fujiwara; Norio Kanemitsu, both of Kawasaki, Japan

[73] Assignee: Fujitsu Limited, Kawasaki, Japan

[21] Appl. No.: 09/177,829

[22] Filed: Oct. 23, 1998

Related U.S. Application Data

[62] Division of application No. 08/843,855, Apr. 17, 1997, Pat. No. 5,882,003, which is a division of application No. 08/244,916, filed as application No. PCT/JP93/01451, Oct. 12, 1992, Pat. No. 5,662,320.

[30] Foreign Application Priority Data

Oct. 12, 1992 [JP] Japan ................................ 4-300332

[51] Int. Cl.$^7$ ........................................ B65H 31/00
[52] U.S. Cl. ............................ 271/207; 271/220
[58] Field of Search ........................ 271/207, 176, 271/220, 223; 414/789.9, 790.3; 221/191

[56] References Cited

U.S. PATENT DOCUMENTS

| | | |
|---|---|---|
| 4,655,369 | 4/1987 | Gabriel . |
| 4,727,387 | 2/1988 | Israely ................................. 346/160 |
| 4,740,817 | 4/1988 | Suzuki et al. ...................... 271/41.1 X |
| 4,888,602 | 12/1989 | Watanabe et al. ................. 271/4.08 X |
| 4,928,151 | 5/1990 | Saeki . |
| 4,958,823 | 9/1990 | Iwaki et al. .......................... 271/164 X |
| 5,003,493 | 3/1991 | Okada et al. ....................... 271/162 X |
| 5,061,099 | 10/1991 | Iwatani et al. . |
| 5,106,074 | 4/1992 | Nishigaki et al. ...................... 271/162 |
| 5,139,252 | 8/1992 | Morita et al. ...................... 271/162 X |
| 5,645,396 | 7/1997 | Romanowski ..................... 414/790.3 X |
| 5,697,761 | 12/1997 | Morgan et al. ....................... 414/790.3 |

FOREIGN PATENT DOCUMENTS

| | | |
|---|---|---|
| 02 88 241 | 10/1988 | European Pat. Off. . |
| 2 656 181 | 6/1991 | France . |
| 40 20 814 | 1/1991 | Germany . |
| 59-207333 | 11/1984 | Japan . |
| 63-061857 | 4/1988 | Japan . |
| 2-010665 | 1/1990 | Japan . |
| 2-094770 | 4/1990 | Japan . |
| 2-093865 | 7/1990 | Japan . |
| 2-276728 | 11/1990 | Japan . |
| 4-024557 | 2/1992 | Japan . |
| 4-304061 | 10/1992 | Japan . |
| 22 38 758 | 6/1991 | United Kingdom . |
| 91 07046 | 5/1991 | WIPO . |
| 91/07046 | 10/1992 | WIPO . |

*Primary Examiner*—David H. Bollinger
*Attorney, Agent, or Firm*—Staas & Halsey LLP

[57] ABSTRACT

A document transport apparatus has a box-shaped housing, or case, having first and second openings provided in a sidewall of the case, a hopper in a first drawer movable into and out of the case through the first opening, and a stacker part in a second drawer movable in and out of the case through the second opening. A transport mechanism transports a document sheet, in the closed position of the first drawer, from the hopper part, past an image reader/printer, for reading data from or printing data onto the transported sheet, to the stacker part, again with the second drawer being closed.

59 Claims, 79 Drawing Sheets

F I G. 81
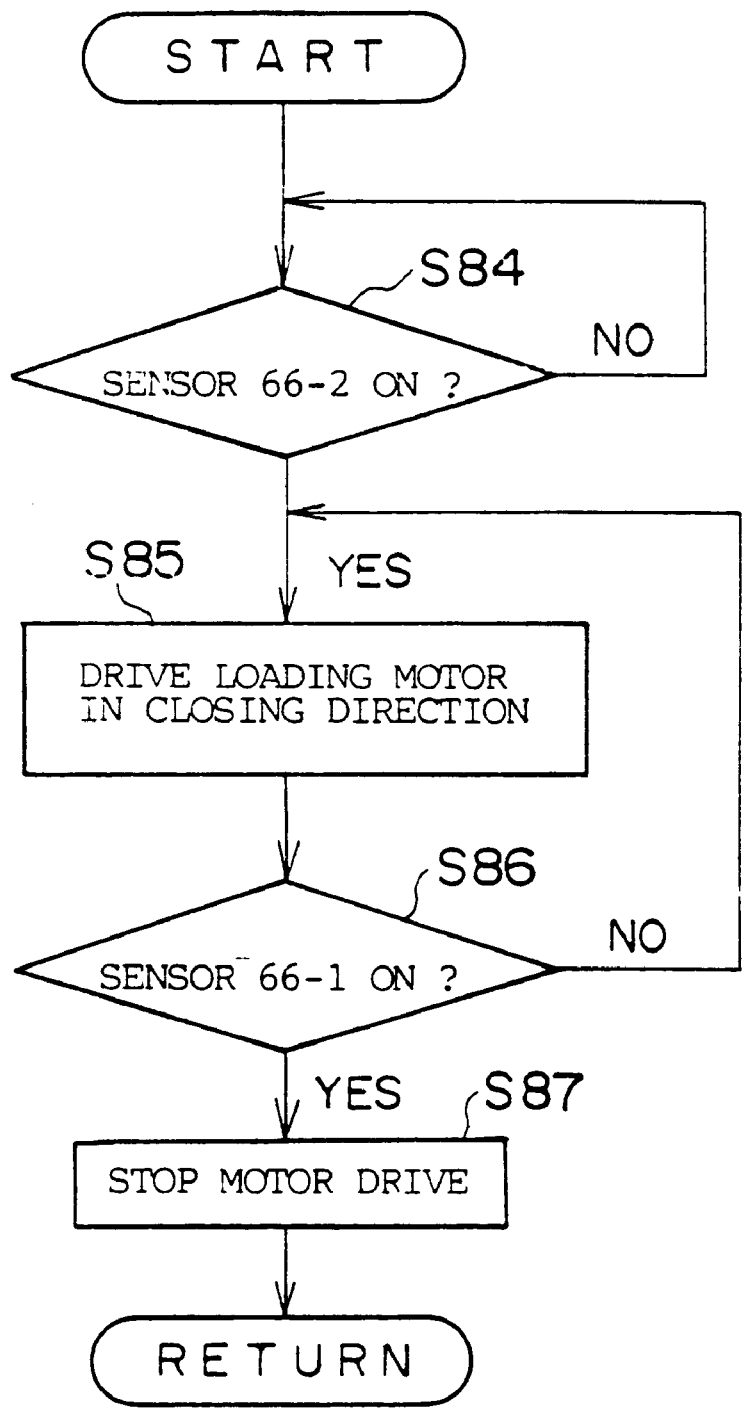

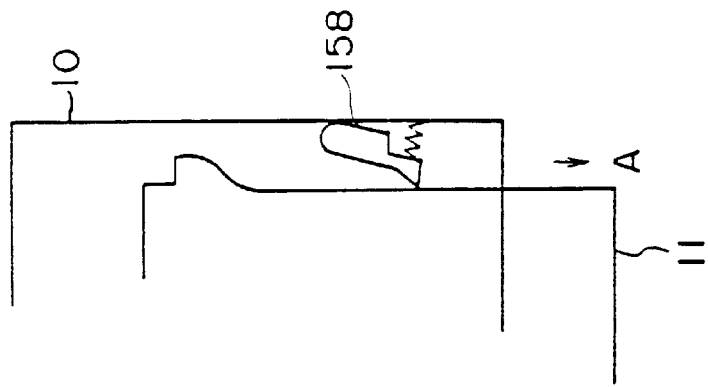
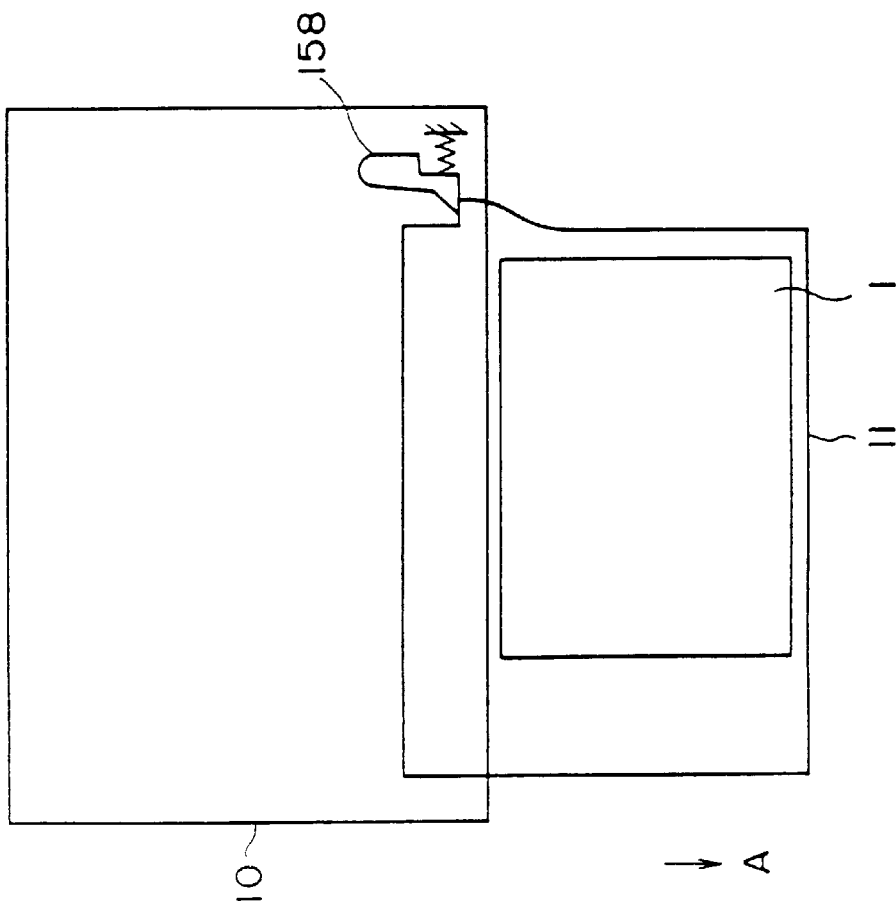

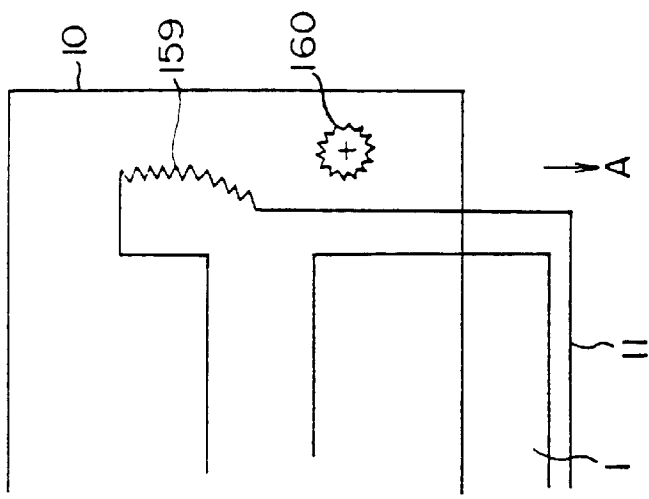
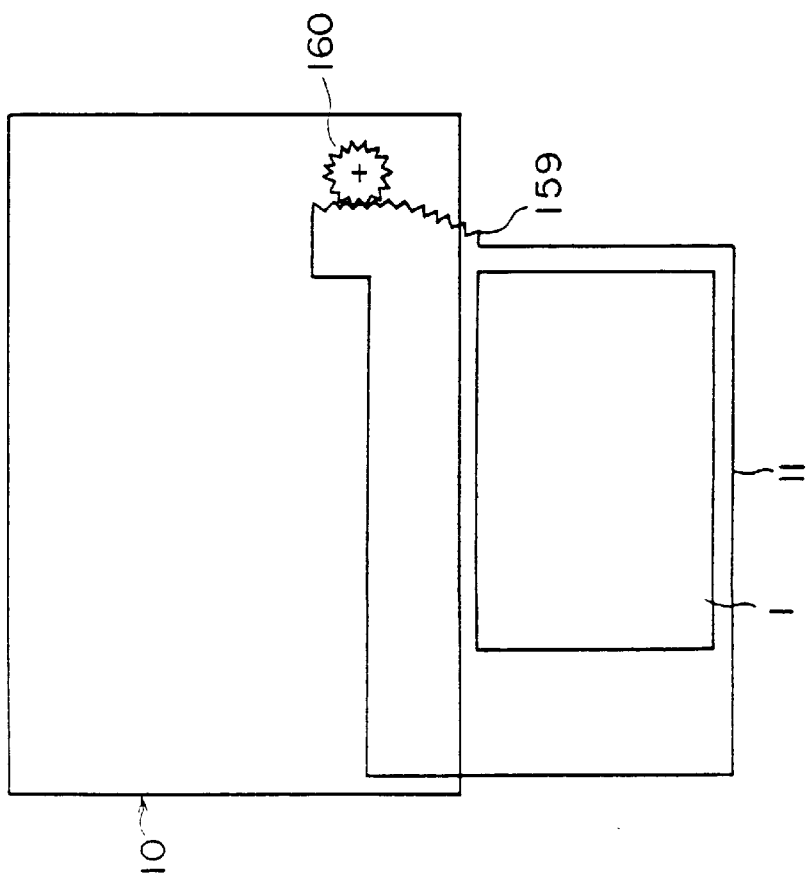

F I G. 99
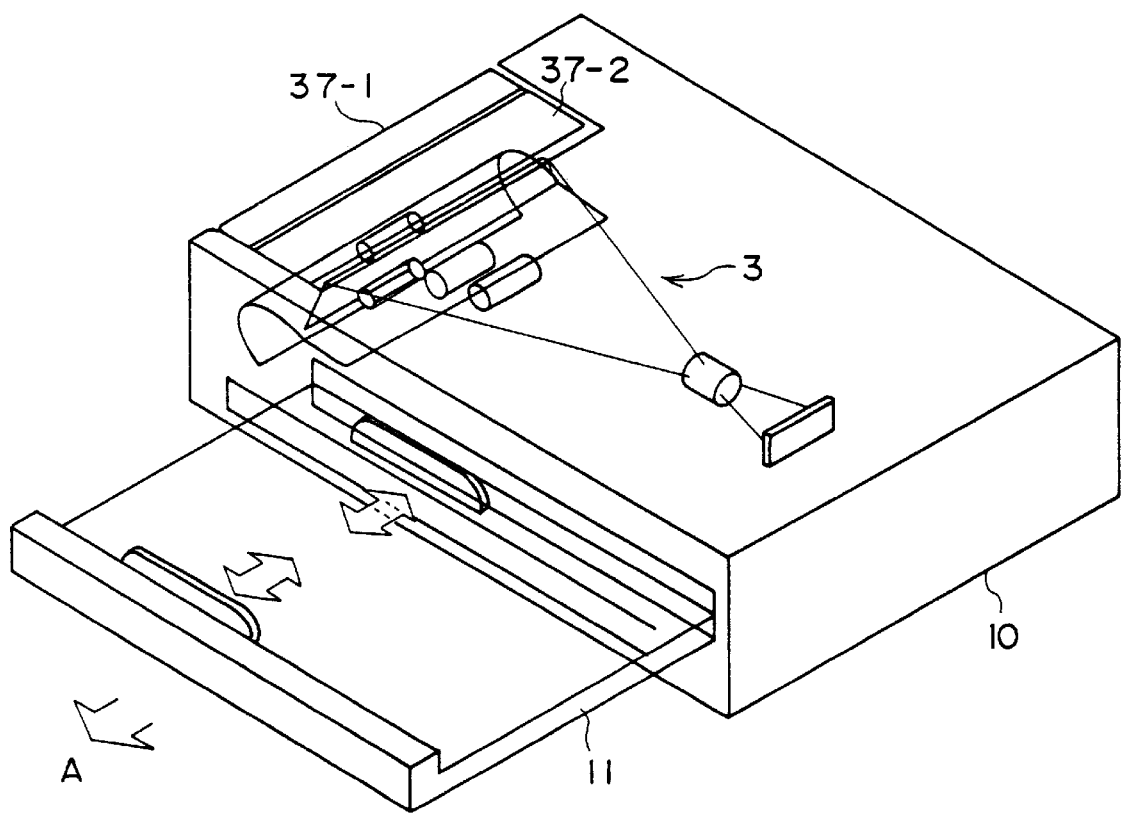

F I G. 105
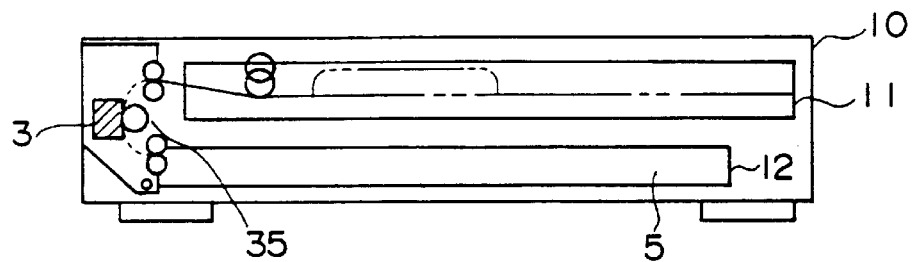
F I G. 106
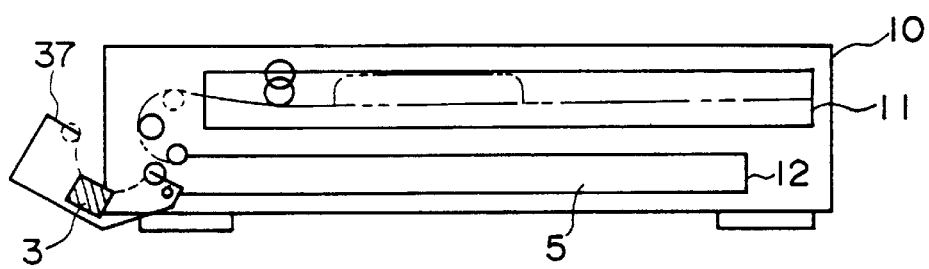
F I G. 107
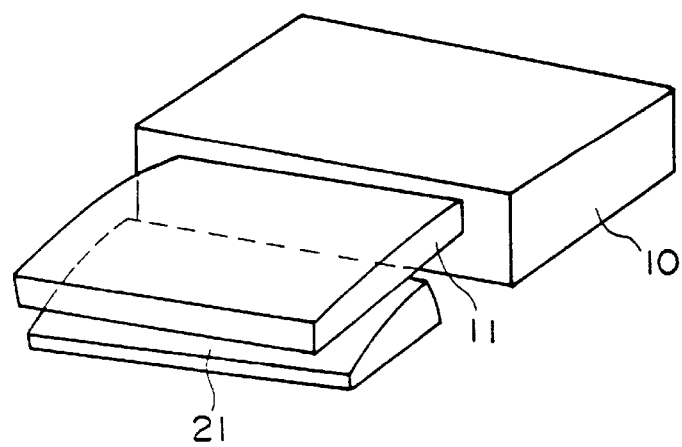

APPARATUS HAVING DOCUMENT TRANSPORT MECHANISM

This application is a Division of U.S. Ser. No. 08/843,855 filed Apr. 17, 1997 U.S. Pat. No. 5,882,003 which is a Division of Ser. No. 08/244,916 filed Sep. 1, 1994, U.S. Pat. No. 5,662,320, which is a 371 of PCT/JP93/01451 filed Oct. 12, 1992.

TECHNICAL FIELD

The present invention generally relates to apparatuses having a document transport mechanism, and more particularly to an apparatus having a document transport mechanism, such as an image reading apparatus and an image forming apparatus, and suited for reducing space occupied thereby in an office or room.

BACKGROUND ART

Recently, it has become possible to process a large amount of data at a high speed due to the improved performance of central processing units (CPUs). As a result, the image processing techniques have rapidly improved, and image reading apparatuses for business use and personal use have rapidly become popular due to this progress.

However, the office space or room space in general is limited, and the space restrictions are strict particularly at the central parts of the city. For this reason, the large operation space required by the image reading apparatus and the image forming apparatus has become a problem, and it is desirable to make improvements from the point of view of the space utilization efficiency.

Conventionally, there are image reading apparatuses of an automatic document feed (ADF) type, a flat bed type, and a composite type which is a combination of the ADF type and the flat bed type.

FIG. 1 shows a flat bed type image reading apparatus which is presently used popularly as an apparatus for personal use. According to this flat bed type image reading apparatus, a document is placed on a document glass 72, and the document is covered by a document holding cover 71. When a switch which is not shown is turned ON, a read head (carrier) 73 moves back and forth to successively read the image of the document on the document glass 72.

According to this apparatus, the operation region only exists at the top and the office space can be used with relatively good efficiency. However, the operation efficiency is poor because the document must be set one document at a time. In addition, it is necessary to set the document and operate the apparatus for each document, and the operation region at the front must be open.

FIG. 2 shows a composite type image reading apparatus which is a combination of the ADF type and the flat bed type. This composite type apparatus is popularly used in general. According to this apparatus, when the documents are stacked on a hopper part 74, the document is transported by a transport part 76 and is read by an image reader part 73. The read documents are ejected to a stacker part 75 and successively stacked.

According to this apparatus, a plurality of documents is automatically and consecutively supplied and processed, and the operation is extremely efficient. However, the hopper part 74 and the stacker part 75 respectively project to the top and the side, and a large space is required for the operation region. As a result, the position where the apparatus may be set up becomes restricted, and improvements were desired from this point of view.

FIG. 3 shows an improved composite type apparatus which is a combination of the ADF type and the flat bed type, and the stacker part 75 is provided below the hopper part 74. Hence, a document placed on the hopper part 75 is transported by the transport part 76 and is turned over by a U-shaped sheet guide. The document is read when the document passes above the image reader part 73. The read document is erected on the stacker part 75 below the hopper part 74 in the turned over state and stacked.

Accordingly, the problem of requiring a large operation region because of the stacker part 75 which projects from the side of the image reading apparatus is eliminated. However, as in the case of the flat bed type apparatus, the hopper part 74 exists at the top of the apparatus, and it is impossible to put things on the top of the apparatus because of the need to place the documents.

Therefore, the image reading apparatuses which are presently used in general have the hopper part 74 and the stacker part 75 which respectively project to the top and the side of the apparatus, and a large operation region is required. For this reason, improvements are required from the point of view of realizing efficient utilization of the office space. In addition, the image reading apparatus also takes up a large space as a system, and it is difficult to set up the apparatus close to the user.

The above described problems of the image reading apparatuses also occur in the image forming apparatuses such as printers, and improvements are similarly required from the point of view of realizing efficient utilization of the office space.

SUMMARY OF THE INVENTION

Accordingly, it is a general object of the present invention to provide a novel and useful apparatus in which the problems described above are eliminated.

Another and more specific object of the present invention is to provide an apparatus comprising a box shaped case having a top surface, four side surfaces, and first and second openings respectively provided on arbitrary side surfaces of the box shaped case, a drawer provided within the first opening and capable of opening and closing with respect to the box shaped case, where the drawer has a hopper part on which a sheet is placed, and transport means for transporting the sheet placed on the hopper part within the box shaped case to a stacker part which is within the box shaped case and communicates to the second opening.

According to the apparatus of the present invention, a document input/output part does not exist at least on top of the apparatus, and a document is ejected within a box shaped case. Hence, it is possible to confine the operation space to within the box shaped case, and an object can be placed on top of the apparatus. In addition, it is possible to effectively utilize not only the space above the apparatus but also the space in front, rear, right and left of the apparatus. For example, there is no part that projects from the side of the apparatus, and the restrictions related to the set-up position of the apparatus are small, thereby making it possible to efficiently utilize the office space and the like.

Still another object of the present invention is to provide the apparatus of the type described above and further comprising image reader means for reading an image on the sheet which is transported by the transport means or, image forming means for forming an image on the sheet which is transported by the transport means. According to the apparatus of the present invention, a document input/output part does not exist at least on top of the apparatus, and a document which is subjected to an image read or an image formation process is ejected within a box shaped case. Hence, it is possible to confine the operation space for the image reading and image forming processes within the box shaped case, and an object can be placed on top of the apparatus. In addition, it is possible to effectively utilize not only the space above the apparatus but also the space in front, rear, right and left of the apparatus. For example, there is no part that projects from the side of the apparatus, and the restrictions related to the set-up position of the apparatus are small, thereby making it possible to efficiently utilize the office space and the like.

BRIEF DESCRIPTION OF THE DRAWINGS

FIG. 81 is a flow chart for explaining a drawer close operation;

FIGS. 93(a) and 93(b) respectively are plan views for explaining a thirteenth embodiment of the drawer;

FIGS. 94(a) and 94(b) respectively are plan views for explaining a fourteenth embodiment of the drawer;

FIG. 99 is a perspective view showing the sixth embodiment of the apparatus according to the present invention in a state where the drawer is open;

FIG. 105 is a cross sectional view showing an eighth embodiment of the apparatus according to the present invention;

FIG. 106 is a cross sectional view for explaining the jam removing operation in the eighth embodiment of the apparatus according to the present invention;

FIG. 107 is a perspective view for explaining an eighteenth embodiment of the drawer;

DESCRIPTION OF THE PREFERRED EMBODIMENTS

Figure 1:
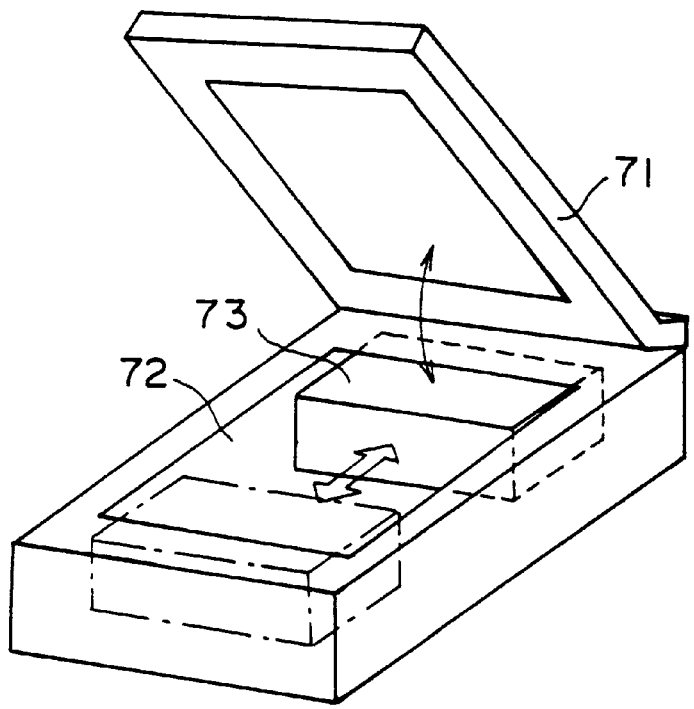
FIG. 1 is a perspective view showing an example of a conventional flat bed type image reading apparatus.
Figure 2:
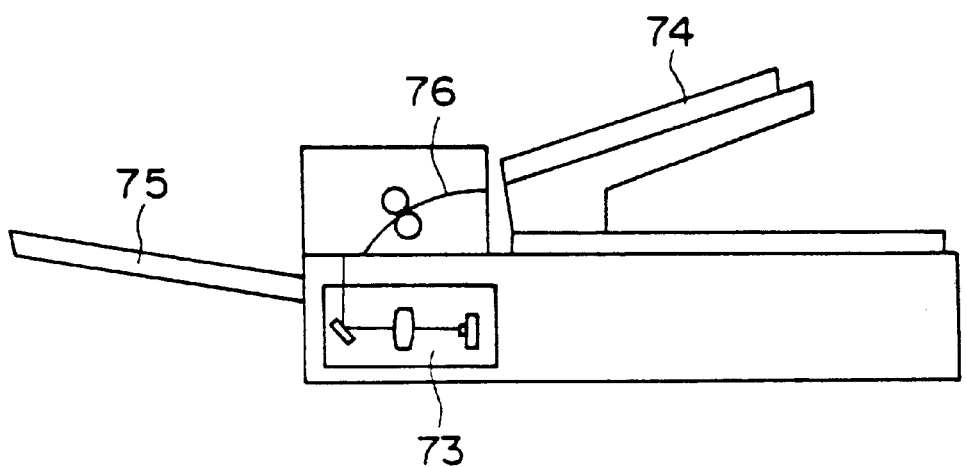
FIG. 2 is a cross sectional view of the side showing an example of a conventional ADF type image reading apparatus.
Figure 3:
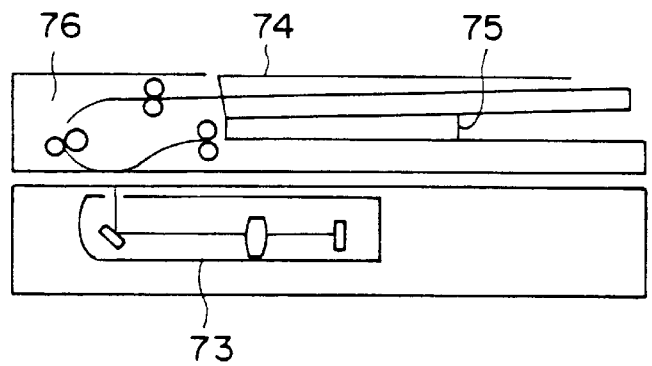
FIG. 3 is a cross sectional view of the side showing another example of the conventional ADF type image reading apparatus.

First, a description will be given of the operating principle of an apparatus according to the present invention, by referring to FIG. 4. The apparatus shown in FIG. 4 includes a box shaped case 10. A hopper part 1, a document transport part 2, an image reader and/or forming part 3, a document turn-over part 4 and a stacker part 5 are arranged within a closed space formed in the box shaped case 10. The hopper part 1 is provided within an opening provided at the front of the box shaped case 10 or, within a drawer 11. In addition, the stacker part 5 is provided within an opening provided at the front of the box shaped case 10 or, within a drawer 12.

Documents 6 are stacked on the hopper part 1. The document 6 is transported by the document transport part 2, turned over by the document turn-over part 4 after passing the image reader and/or forming part 3, and ejected within the stacker part 5. The ejected documents 6 are stacked within the stacker part 5.

Figure 4:
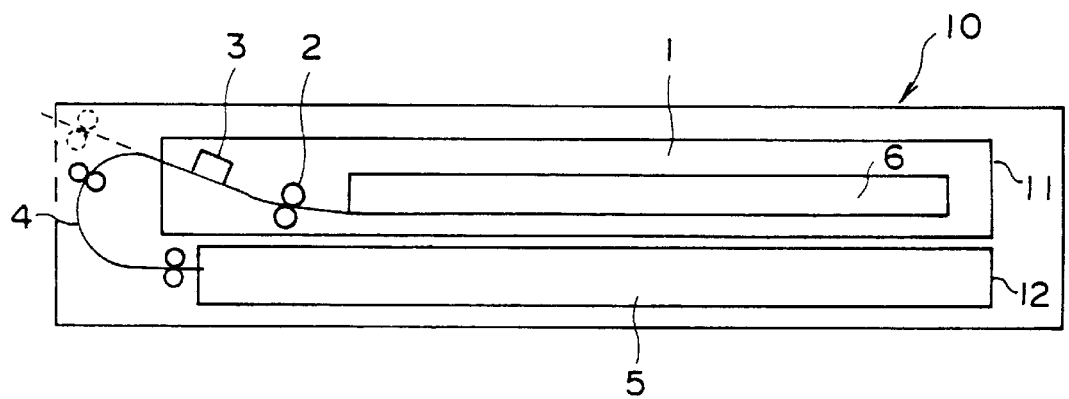
FIG. 4 is a cross sectional view of the front of an apparatus for explaining the operating principle of the apparatus according to the present invention.

For the sake of convenience, the document transport part 2 and the image reader and/or forming part 3 are provided in the hopper part 1 in FIG. 4. However, if the hopper part 1 is provided within the drawer 11, it is sufficient for at least the documents 6 to be stacked within the drawer 11, and the document transport part 2 and the image reader and/or forming part 3 may be fixedly provided within the box shaped case 10 and not within the drawer 11. Embodiments having the image reader part 3 provided within the box shaped case 10 will be described later in conjunction with FIG. 98 et seq. The arrangements of the hopper part 1 and the stacker part 5 may be switched upsidedown as will be described later in conjunction with FIGS. 118 and 119.

In the apparatus according to the present invention, no document input/output part exists at least on top of the apparatus, and the document 6 which is subjected to the image reading or image forming process is ejected within the box shaped case 10. As a result, the operation space for the image reading and image forming processes can be accommodated within the box shaped case 10, and it is possible to place things on top of the apparatus. In addition, it is possible to effectively utilize not only the space on top of the apparatus but also the spaces at the front and back and on the right and left of the apparatus. For example, since there is no part that projects from the side of the apparatus, the restrictions for the set-up location of the apparatus are reduced, and it is possible to reduce the required office space or the like to set up the apparatus.

Figure 5:
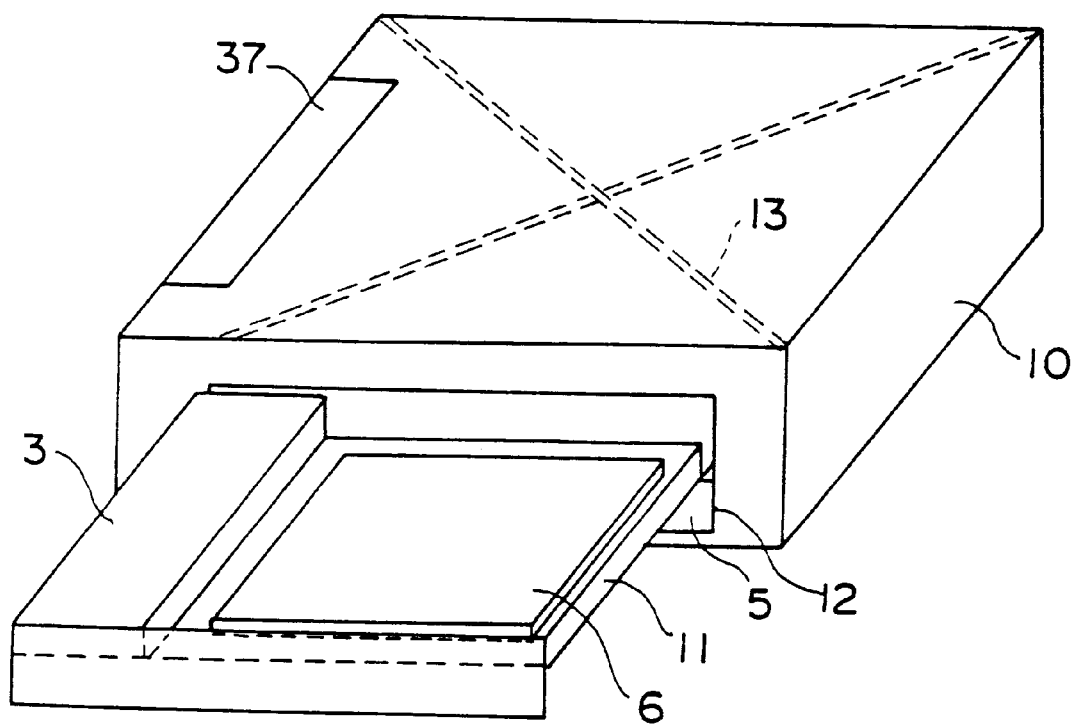
FIG. 5 is a perspective view showing a first embodiment of the apparatus according to the present invention.
Figure 6:
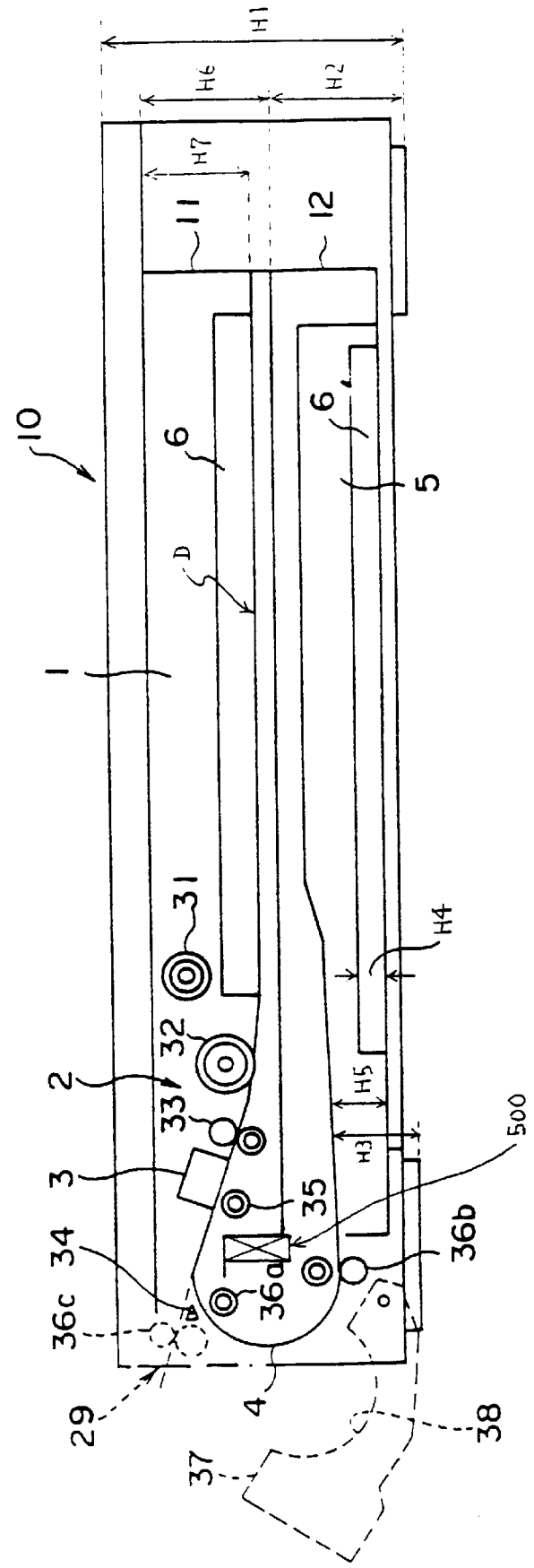
FIG. 6 is a cross sectional view showing the front of the first and second embodiments.

Next, a description will be given of a first embodiment of the apparatus according to the present invention, by referring to FIGS. 5 and 6. FIG. 5 is a perspective view of the first embodiment, and FIG. 6 is a cross sectional view of the first embodiment. In FIGS. 5 and 6, those parts which are the same as those corresponding parts in FIG. 4 are designated by the same reference numerals, and a description thereof will be omitted. In this embodiment, the present invention is applied to the image reading apparatus.

In FIG. 5, this embodiment of the apparatus is a front open type having the drawer 11, and the front of the apparatus is open with the hopper part 1 provided in the upper level and the stacker part 5 provided in the lower level. The image reader part 3 and the hopper part 1 are integrally provided in the drawer 11. A cross 13 on the top surface of the box shaped case 10 is an example of a cross-shaped beam for reinforcing the top of the apparatus.

In addition, in FIG. 6, the document transport part 2 shown in FIG. 4 is formed by a paper supply roller 31, a separation roller 32, a feed roller 33 and a platen roller 35 in this embodiment. Furthermore, the document turn-over part 4 is formed by a sheet guide 38 for turning over the document 6 and eject rollers 36a and 36b.

In a case where the hopper part 1 is provided in the upper level and the stacker part 5 is provided in the lower level, a height H1 of the apparatus shown in FIG. 6 should desirably be kept low so that the eve point will not become too high when a display of a personal computer is placed on top of the apparatus. On the other hand, although the feature becomes obtainable by the hopper part 1 provided in the upper level, a height H2 of the lower end of the drawer 11 should desirably be set high so as not to hit a keyboard which is placed in front of the apparatus in the case where the hopper part 1 is constructed so that the drawer 11 or the like slides to the front. For example, a maximum height of the keyboard placed on a desk is 50 mm from the key top to the desk top, and in this case, the height H2 of the lower end of the drawer 11 of the apparatus is set to 55 mm, for example, by taking into account a slight margin.

On the other hand, a height H3 of an eject opening of the stacker part 1 of the apparatus should desirably be set high so as to increase the amount of the read documents 6 that can be stacked within the stacker part 5. For example, when a height H4 of the documents 6 that can be stacked within the stacker part 5 is set to 20 mm, a height H5 is set to approximately 30 mm, for example, by taking into account a slight margin. The height H3 is determined by adding the thickness of the frame bottom portion and the height of the base leg to the height H5.

A height H6 of the hopper part 1 should desirably set small for the purposes of reducing the overbearing effect of the hopper part 1 which slides to the front and to reduce the height of the apparatus as a whole. However, the reduction of the height H6 should not interfere with the mounting of the paper supply roller 31, the separation roller 32, the reader part 3, and a driving system and a driving motor which are not shown in the apparatus. The thickness of the hopper part 1 is determined in such a manner. In addition, a height H7 of a document loading portion D loaded with the documents 6 should desirably be set large so that a large amount of the documents 6 can be stacked.

If a transport route is extended directly to the side from the document loading portion D of the hopper part 1 provided at the position which is as low as possible, and a sideways U-shaped document transport path is simply extended via the reader part 3 at the height H3 of the eject opening to the stacker part 5 which is provided at a position which is as high as possible, the radius of curvature of the turn-over part becomes small. As a result, with respect to the documents 6 and sheets which are transported in this apparatus, it becomes impossible to guarantee the transport or the transport accuracy for a thick sheet because of the bending resistance or the like. Hence, in FIG. 6, the transport route is bent upwards from the document loading portion D towards the feed roller 33, the reader part 3 and the platen roller 35 from a vicinity of where the document 6 passes the paper supply roller 31 and the separation roller 32. In addition, with the height of the hopper part 1 maintained, the position of the entrance to the document turn-over part 4 which makes the U-turn is shifted upwards, so that the radius of curvature of the document transport path is increased.

In FIG. 6, a slide rail 500 (also existing on the opposite end but not shown) is provided for a case where the hopper part 1 takes the form of the drawer 11. This slide rail 500 shown is a linear ball slide bearing, for example, and a larger load may be applied when mounted in a manner extending vertically as shown compared to a case where the bearing is mounted in a manner extending horizontally. The route from the document loading portion D of the hopper part 1 to the U-turn entrance is realized by avoiding the slide rail, and the simultaneous existence of the route and the slide rail is made possible. By employing such an arrangement, it becomes possible to realize a low height of 100 mm, for example, for the apparatus as a whole.

Figure 7:
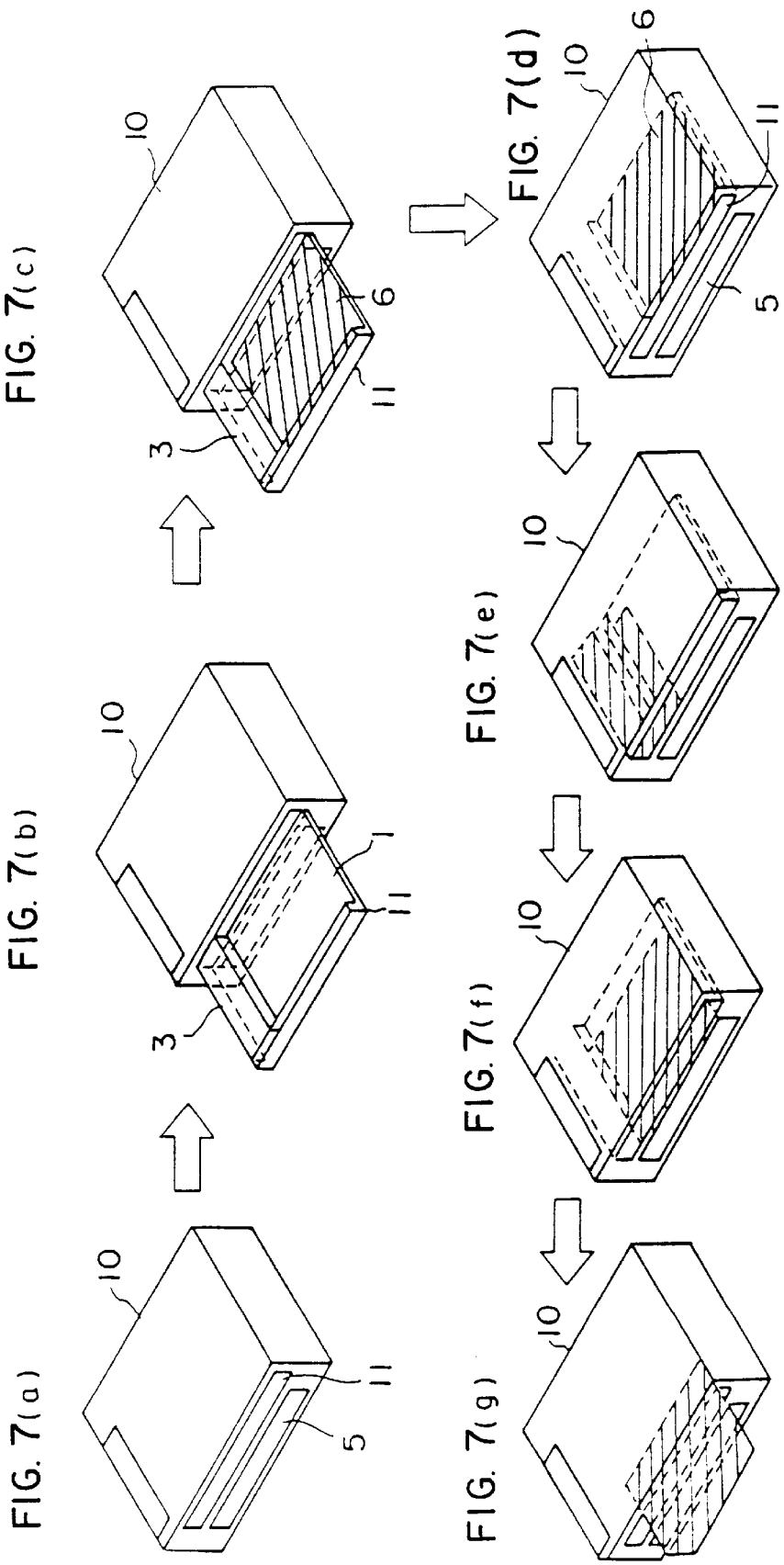
FIGS. 7(a) through 7(g) are diagrams for explaining the image read operation of the first embodiment.

Next, a description will be given of an image reading operation of this embodiment, by referring to FIG. 7.

FIG. 7(a) shows a standby state of the apparatus, and the drawer 11 of the hopper part 1 is closed in this state. FIG. 7(b) shows a state where the drawer 11 of the hopper part 1 is pulled out to set or load the documents 6. In addition, FIG. 7(c) shows a state where a plurality of documents 6 is loaded on the hopper part 1. FIG. 7(d) shows a state where the loading of the documents 6 has ended and the drawer 11 of the hopper part 1 is closed.

In this state, the reading of the documents 6 is started. In other words, the documents 6 stacked in the hopper part 1 are first taken in by the paper supply roller 31. This paper supply roller 31 is lifted upwards by a solenoid which is not shown, for example, and a current to the solenoid is turned OFF upon receipt of a read start signal. Responsive thereto, the paper supply roller 31 moves down by its own weight to hold down the documents 6. Then, the paper supply roller 31 rotates to start a paper supply operation with respect to the documents 6. The documents 6 which are supplied by the paper supply roller 31 is separated one document 6 at a time by the separation roller 32, and is fed by the feed roller 33.

The document 6 which is supplied in this manner is read by the image reader part 3 while being held by the platen roller 35, and is supplied to the eject roller 36a. In this state, the document 6 is turned over by a U-shaped sheet guide 38 of the document turn-over part 4. The turned over document 6 is supplied to the eject roller 36b. FIG. 7(e) shows a state during the read operation where the document 6 is pinched between the eject rollers 36a and 36b.

The read document 6 is further supplied by the eject roller 36b and the read operation ends when the document 6 is completely ejected to the stacker part 5. This state corresponds to a read completed state shown in FIG. 7(f). After the reading of the first document 6 ends, the paper supply roller 31 continues to supply the next document 6, and the read operation is continued by repeating the above described operation.

When the reading of all of the documents 6 ends, the documents 6 are removed from the stacker part 5. When removing the documents 6, it is unnecessary to provide a space such as that required when pulling out the drawer 11, because the front of the stacker part 5 is open. Hence, the process of removing the documents 6 can be made within a narrower space compared to the drawer 11. FIG. 7(g) shows a state where the documents 6 are removed from the stacker part 5.

The documents 6 in the hopper part 1 are read and supplied to the stacker part 5 by the above procedure. Hence, the reading of the documents 6 can be made completely within the box shaped case 10, and the operation from the outside the case 10 is only necessary when setting the documents 6 and when removing the documents 6. As a result, it is possible to effectively utilize the surrounding space of the case 10.

In general, it is extremely convenient if the display and the printer which are often used can be set up closeby when setting up a system which is easy and convenient to use. However, since such equipments are relatively heavy, it is necessary to reinforce the box shaped case 10 in order to place such equipments on top of this embodiment of the apparatus.

The reinforcing of the box shaped case 10 is not only necessary at the top but also at the side. For this reinforcement, it is possible to use a strong material for the side portions and the top portion of the box shaped case 10 such as reinforced plastic and steel. Alternatively, it is possible to increase the strength by using supports, beams and the like. By taking such measures, it becomes possible to place on top of the apparatus a heavy object such as the display. As a result, it is possible to efficiently utilize the office space. In addition, the method of reinforcing the box shaped case 10 is of course not limited to the above, and it is possible to take other measures such as increasing the thickness of the material used and using a wave-shaped material. The reinforcement itself of the box shaped case 10 may be realized by the known technique employed in audio equipment and the like.

Next, a description-will be given of embodiments of the reinforcing structures at the top of the apparatus, by referring to FIGS. 8 through 12.

Figure 8:
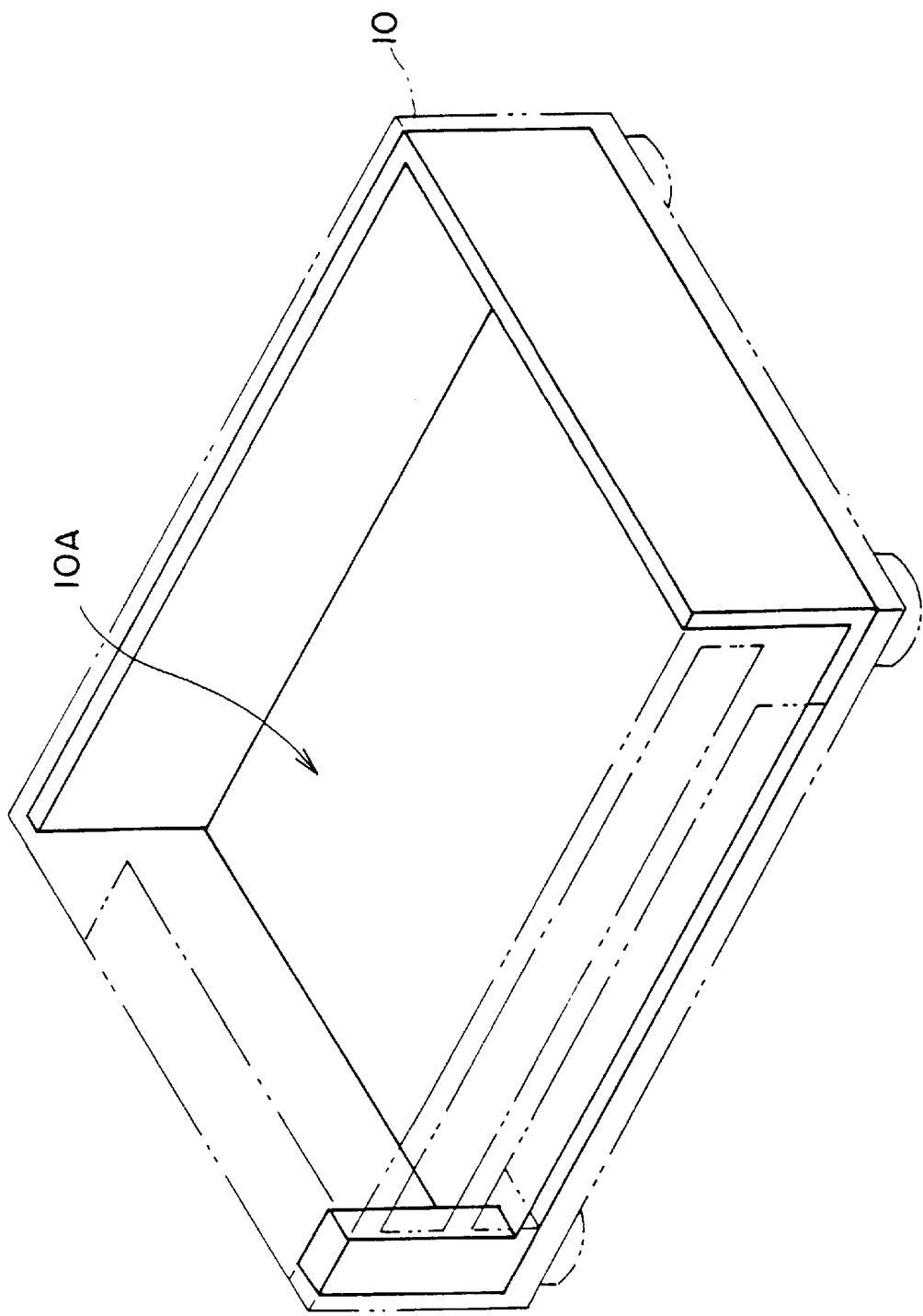
FIGS. 8 through 12 respectively are perspective views for explaining embodiments of a top reinforcing structure of the first embodiment.

According to the reinforcing structure shown in FIG. 8, a chassis 10A of the box shaped case 10 has a shape indicated by a bold line. For example, the chassis 10A is formed by plastic mold, aluminum die-cast, sheet metal pressing and the like.

Figure 9:
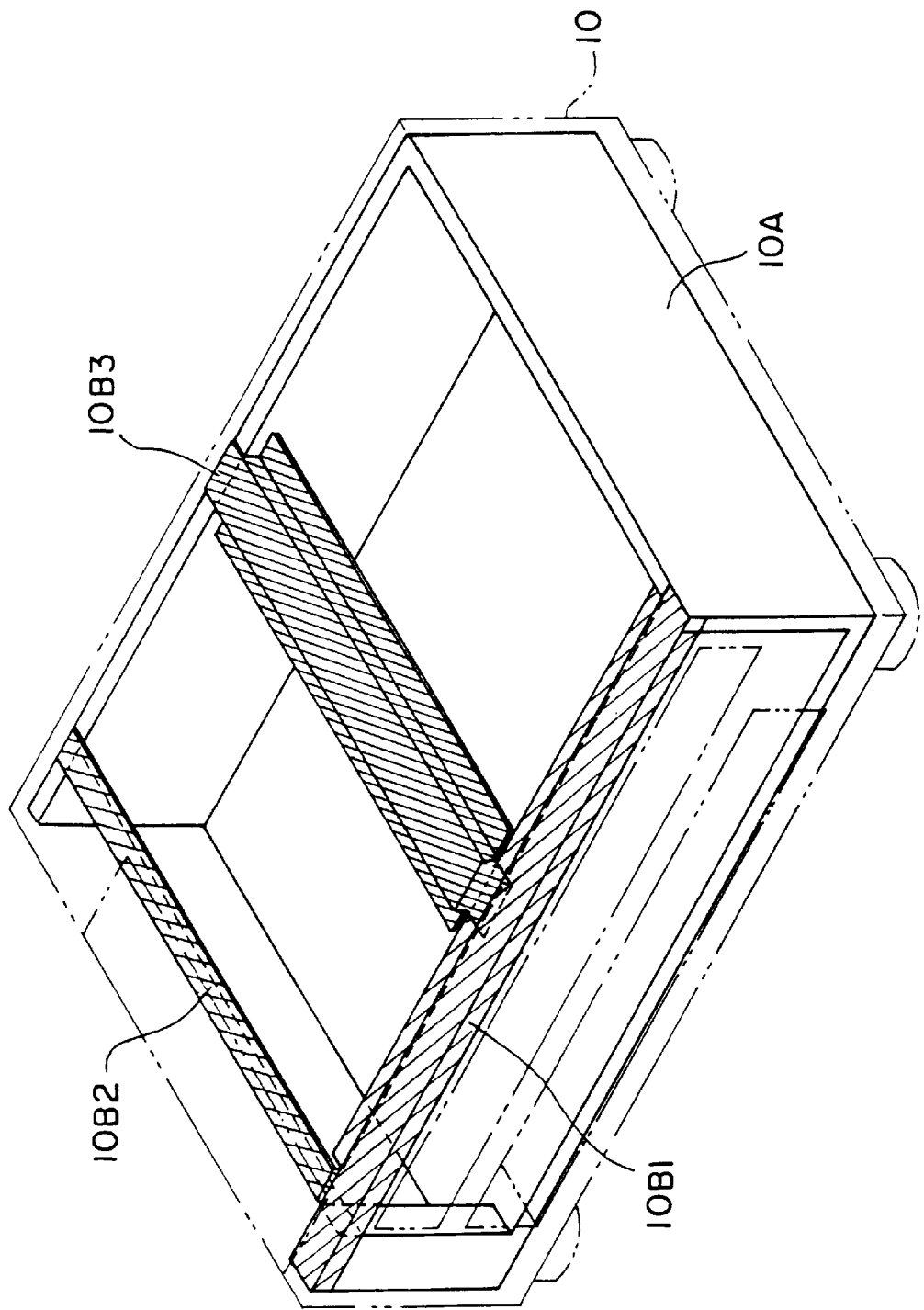

In the reinforcing structure shown in FIG. 9, 3 stays 10B1, 10B2 and 10B3 indicated by the hatching are provided above the chassis 10A which is similar to that shown in FIG. 8. Hence, it is possible to rigidly support a top plate which is not shown by the stays 10B1, 10B2 and 10B3.

Figure 10:
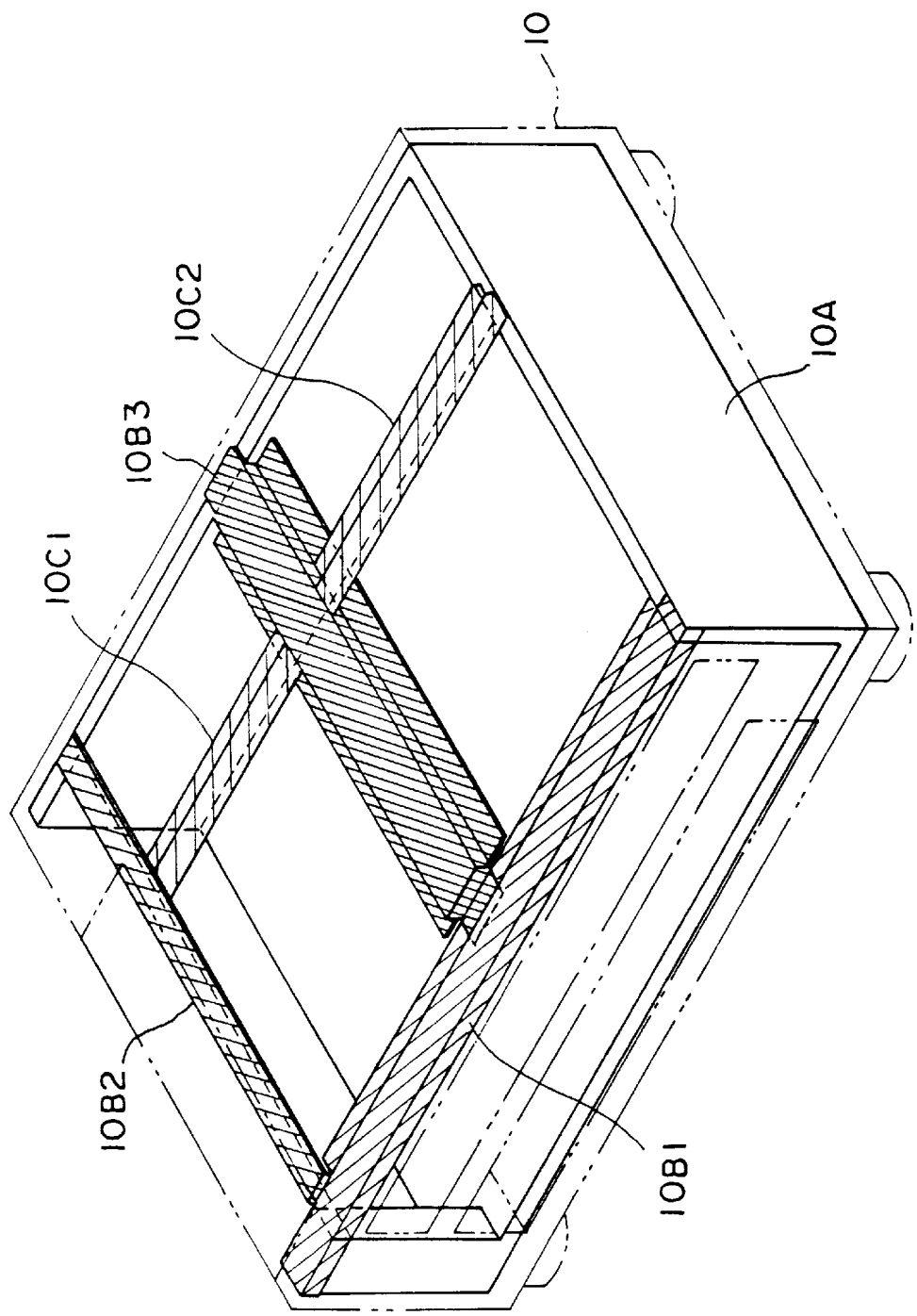

According to the reinforcing structure shown in FIG. 10, 2 stays 10C1 and 10C2 indicated by the hatching are provided in addition to the structure shown in FIG. 9. Thus, it is possible to reinforce the rear part of the box shaped case 10.

Figure 11:
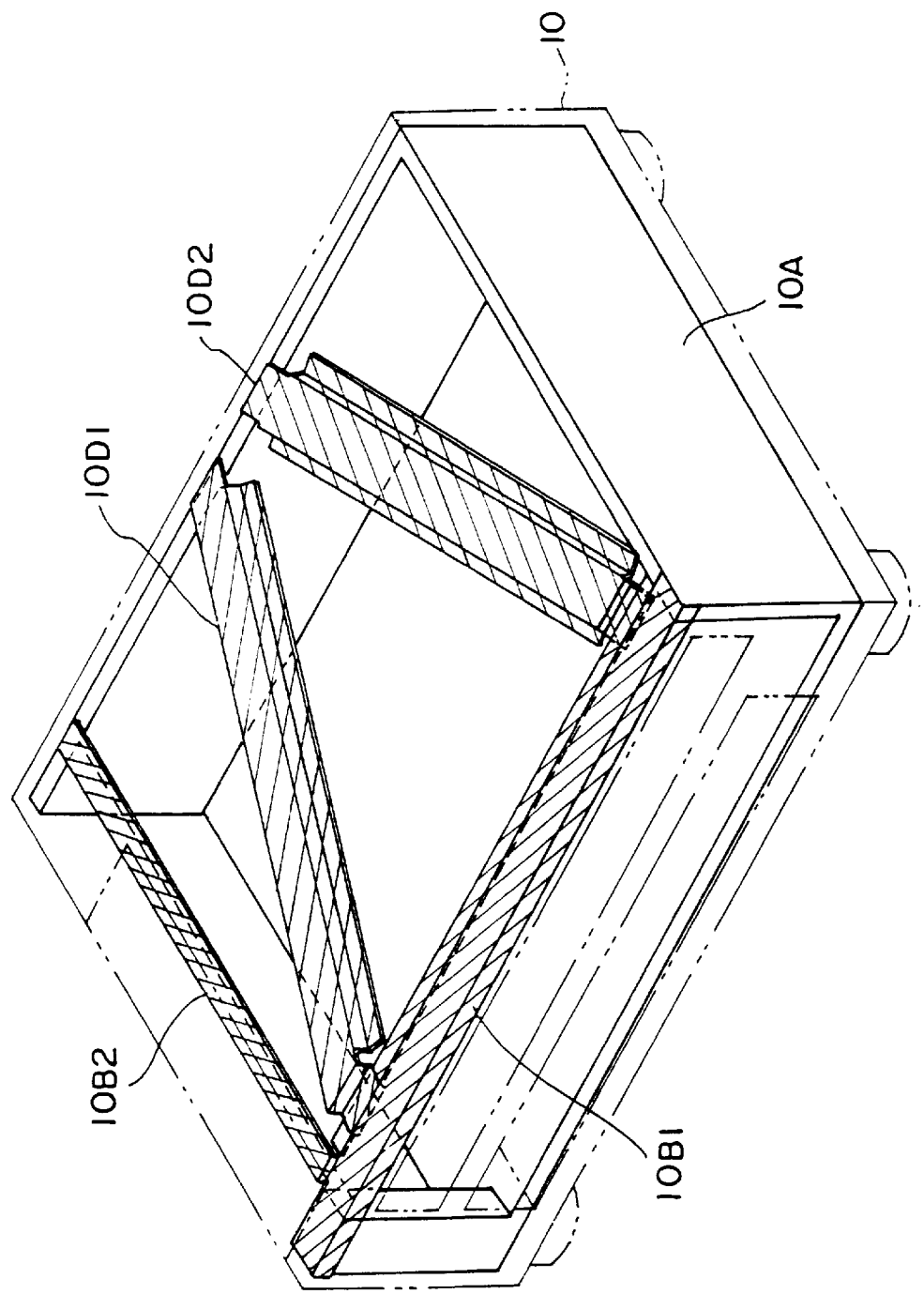

In the reinforcing structure shown in FIG. 11, 2 obliquely arranged stays 10D1 and 10D2 indicated by the hatching are provided in addition to the stays 10B1 and 10B2 shown in FIG. 9.

Figure 12:
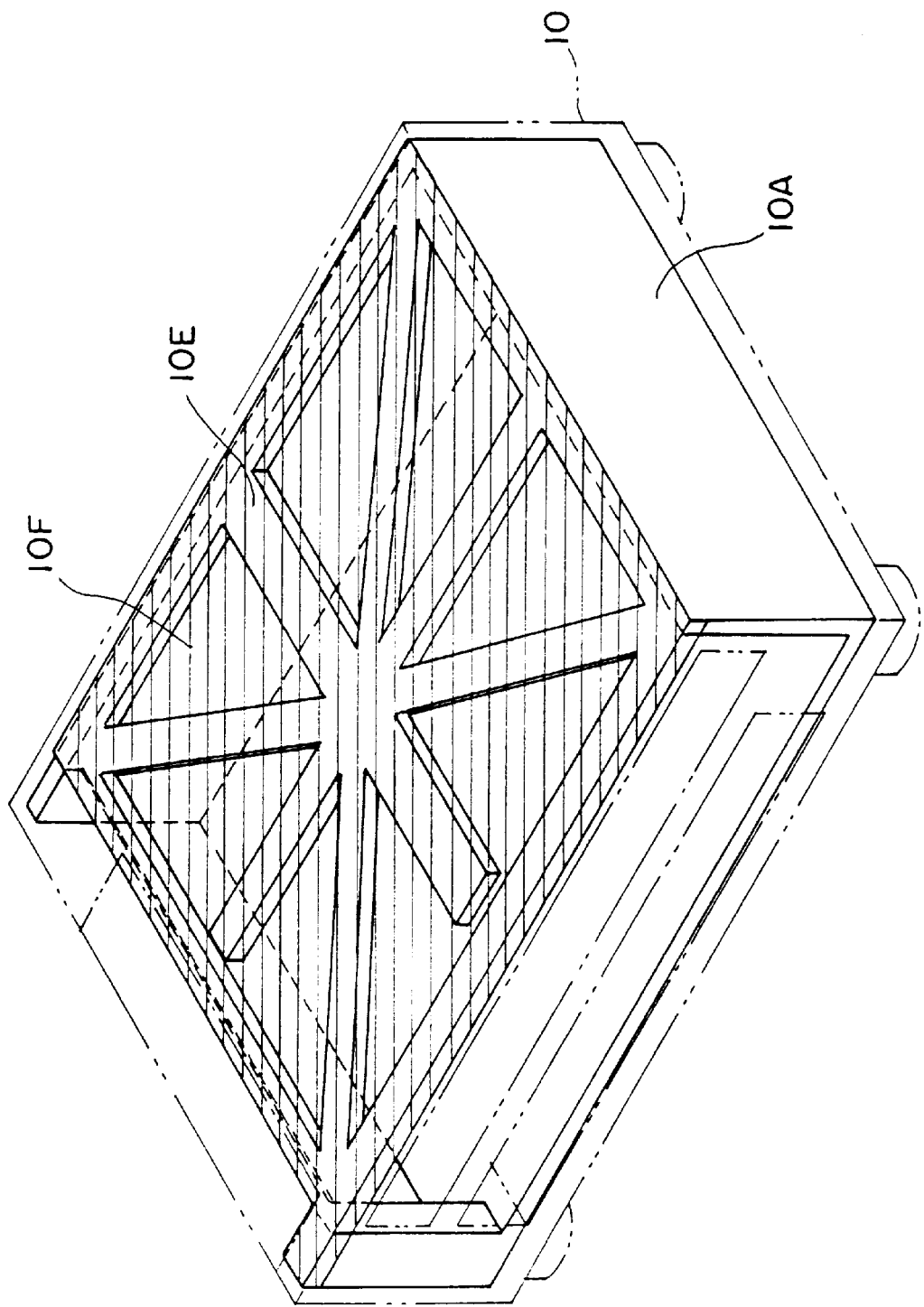

According to the reinforcing structure shown in FIG. 12, a radially provided stay 10E and a panel 10F which forms the top plate are integrally provided by press molding a single plate.

FIGS. 13 through 16 respective are perspective views for explaining the usages of the first embodiment.

Figure 13:
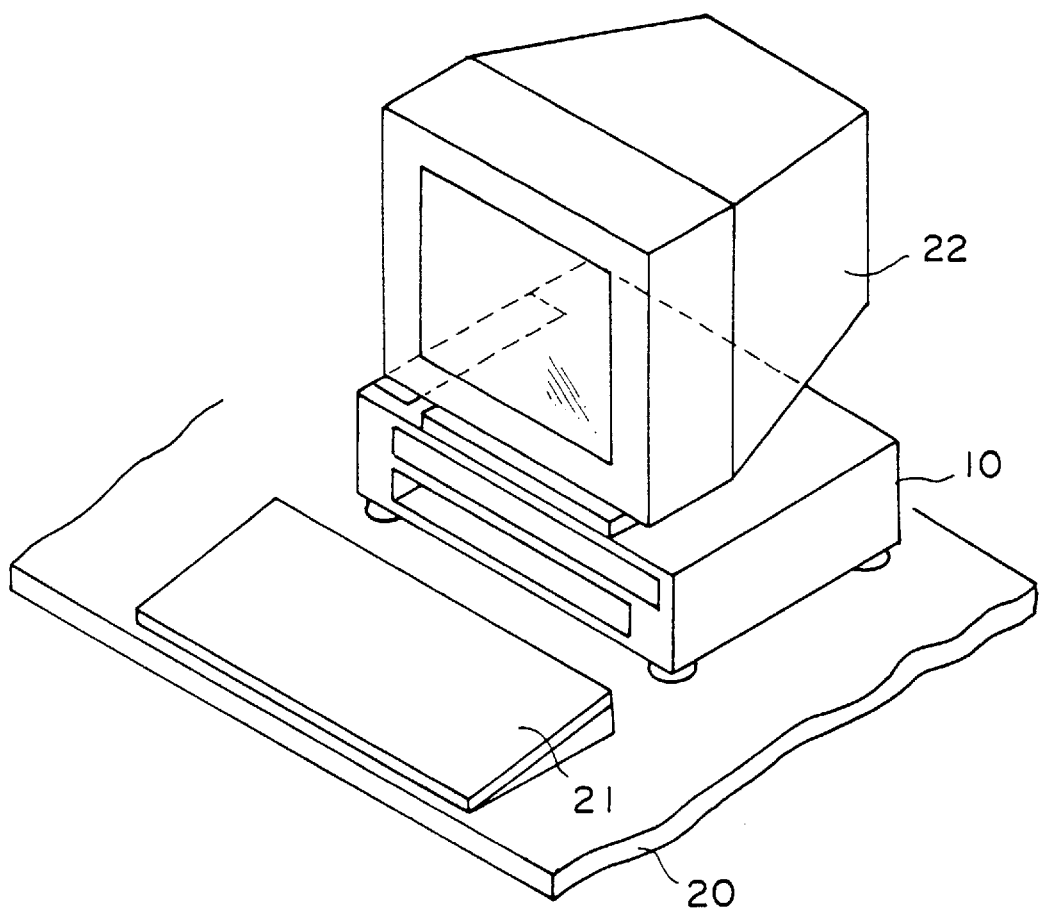
FIGS. 13 through 16 respectively are perspective views for explaining usages of the first embodiment.

In the usage shown in FIG. 13, the box shaped case 10 and a keyboard 21 are placed on a desk 20, and a display 22 is placed on the box shaped case 10.

Figure 14:
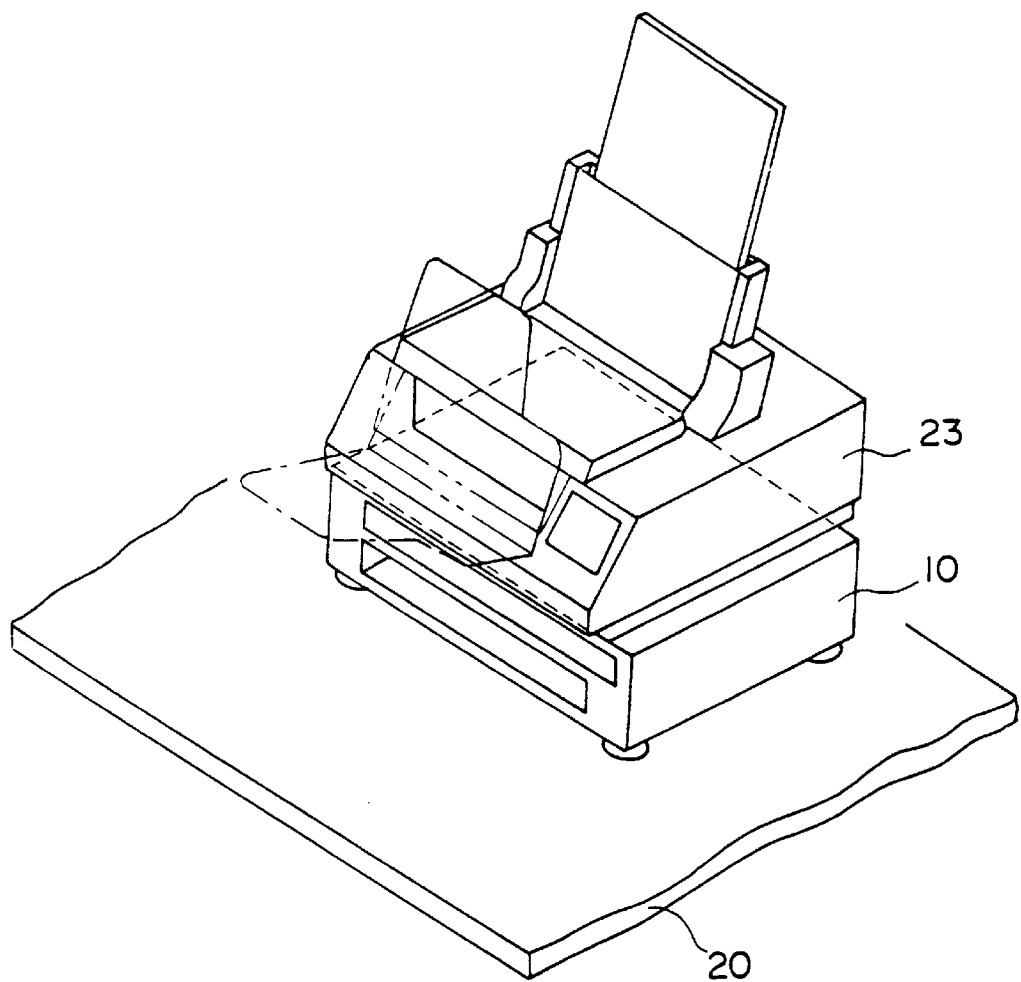

In the usage shown in FIG. 14, the box shaped case 10 is placed on the desk 20, and a printer 23 is placed on the box shaped case 10.

Figure 15:
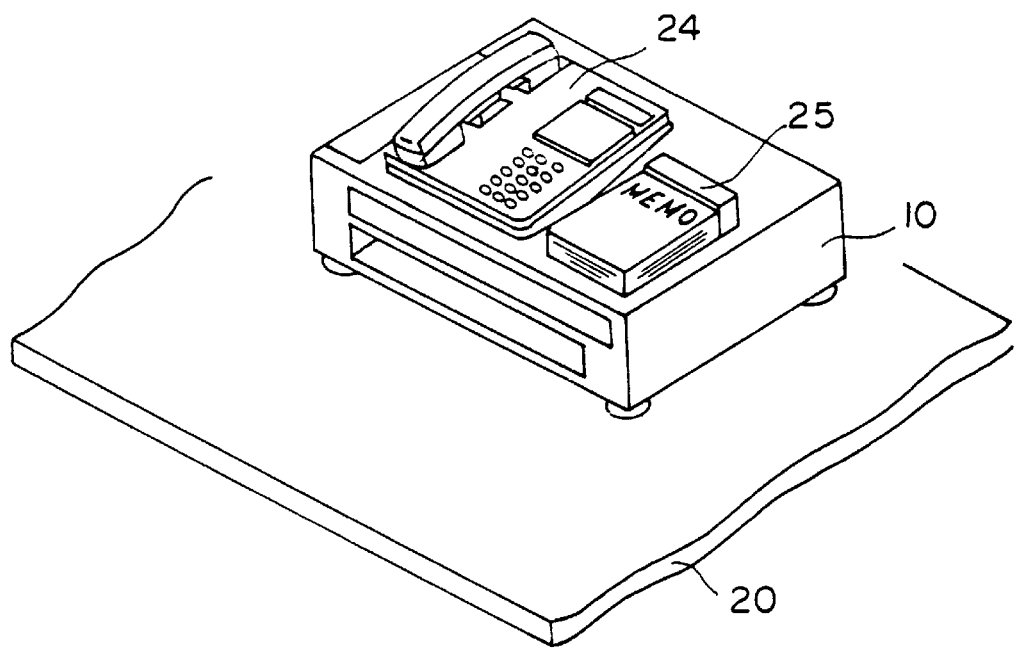

In the usage shown in FIG. 15, the box shaped case 10 is placed on the desk 20, and a telephone set 24 and a memo 25 for taking notes are placed on the box shaped case 10.

Figure 16:
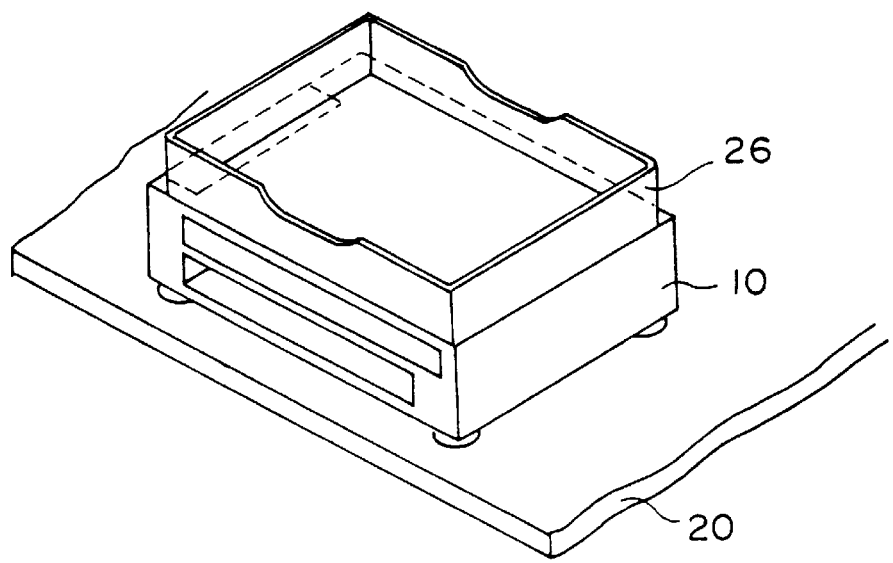

In the usage shown in FIG. 16, the box shaped case 10 is placed on the desk 20, and a document accommodating box 26 is placed on the box shaped case 10.

As is clear from FIGS. 13 through 16, it is possible to place a relatively heavy object such as the display on top of the box shaped case 10, that is, on top of the apparatus, and this makes it extremely convenient from the point of view of reducing the required space. In addition, even though the object is placed on top of the apparatus, it is possible to use the apparatus in this state as it is.

The size of the image reading apparatus can be set appropriately by taking into account the user's usage and the environmental conditions, such as making the apparatus compatible with the A4 size paper or the B4 size paper.

Next, a description will be given of a case where both the hopper part 1 and the stacker part 5 have the open front structure, and the hopper part 1 is arranged in the upper level and the stacker part 5 is arranged in the lower level of the apparatus.

In this case, since the hopper part 1 is located at the upper level of the box shaped case 10, the setting of the documents onto the hopper part 1 and the inspection and maintenance of the image reader part 3 can be easily made without being interfered by the keyboard or the like at the front of the apparatus.

Next, a description will be given of a case where the hopper part 1 and the stacker part 5 both have the open front structure, and the stacker part 5 is arranged in the upper level and the hopper part 1 is arranged in the lower level of the apparatus.

In this case, because the read documents 6 are stacked at the stacker part 5 and it is necessary to stably stack the documents 6 regardless of the amount, it is desirable that the stacker part 5 is located at a high position of the eject opening for the document 6. In other words, in order to process a large amount of documents 6, the eject roller 36b must be arranged at a position which is as high as possible provided that the space permits.

On the other hand, the documents 6 are read in the hopper part 1. In order to positively read a large amount of documents 6 up to the last page, it is necessary for the supply opening for the document 6 to be located at a low position and that the paper supply roller 31 is movable to a low position. Accordingly, when the stacker part 5 is arranged in the upper level and the hopper part 1 is arranged in the lower level, the supply opening for the document 6 must be located at the low position and the eject opening for the read document 6 must be located at the high position. As a result, it is possible to make the radius of curvature of the document turn-over part 4 large, and there are advantages in that the paper supply can be made smoothly and that it is possible to more easily cope with thick document sheets.

Next, a description will be given of the merits of making the hopper part 1 have the drawer structure.

When the entire image reading apparatus is accommodated within the box shaped case 10, the operation space for setting and removing the documents 6 is limited to within the box shaped case 10 and is inconvenient in that the space is small. For this reason, if the hopper part 1 has the drawer structure as shown in FIG. 5, it is possible to pull out the drawer 11 to handle the documents when necessary and it is convenient in that a large operation region can be used.

When the drawer 11 has the image reader part 3 provided integrally as shown in FIG. 5, the inspection and maintenance of the image reader part 3 and the action necessary when a jam occurs can also be made by pulling out the drawer 11. Hence, the apparatus can be operated with extreme ease and the operation characteristic is improved. The drawer 11 may be pulled out manually or automatically by electrical means.

Next, a description will be given of a second embodiment of the apparatus according to the present invention by referring to FIG. 6. According to this second embodiment, the document 6 can be ejected to the side of the apparatus, and the side of the apparatus may be opened for maintenance and the like.

In this embodiment, an eject roller 36c is provided at a position indicated by a dotted line in FIG. 6 on the side of a side cover 37, so that the read document 6 can be ejected directly via an eject opening 29 on the side of the box shaped case 10. The eject opening 29 opens to the side cover 37. Hence, the document 6 which is thick or the like will not be bent at the document turn-over part 4, and is prevented from being damaged because the document 6 can be obtained in the straightly advancing state. For example, a roller which confronts the eject roller 36c is driven.

In a state where the side cover 37 is closed, the document 6 is not ejected prom the eject opening 29. In addition, in a state where the side cover 37 is open, the document is ejected from an extension of the transport path.

In this embodiment, it is desirable to provide a wedge shaped member 34, for example, so that the document is smoothly distributed to the stacker part 5 below or to the eject opening on the side.

In addition, the side cover 37 indicated by the dotted line in FIG. 6 can freely be opened and closed as shown. This side cover 37 is provided to facilitate the removal of the document 6 when the jam occurs and when attending to the maintenance.

Furthermore, the ejection of the document 6 is selectable between the stacker part 5 below and the eject opening 29 on the side of the apparatus depending on the needs. When ejecting the document 6 via the eject opening 29, the side cover 37 is opened. Accordingly, the side cover 37 is used in common for removing the jam and for selectively ejecting the document 6 via the eject opening 29.

Moreover, depending on the usage, only the hopper part 1 needs to be provided within the box shaped case 10 and the apparatus can be made thin if the ejection of the document 6 is restricted to the side. In this case, it is convenient if the stacker part 5 is detachably provided to the side of the apparatus depending on the needs.

For example, various variations are possible, such as providing a door at the opening, providing the drawer for one part and making the other part the opening, providing the opening on the side of the apparatus, and independently providing the openings of the hopper part 1 and the stacker part 5 on the front, rear, right or left of the apparatus.

Figure 17:
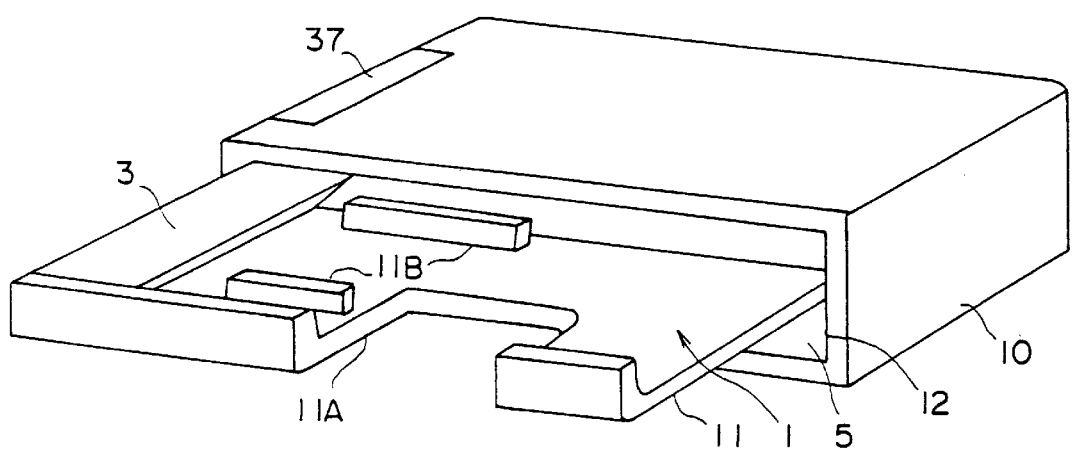
FIG. 17 is a perspective view showing a third embodiment of the apparatus according to the present invention.

FIG. 17 shows a third embodiment of the apparatus according to the present invention. In FIG. 17 and the figures which follow, those parts which are the same as those corresponding parts in FIGS. 5 through 7 are designated by the same reference numerals, and a description thereof will be omitted.

In this embodiment, at least one cutout 11A is formed in the drawer 11. The cutout 11A is provided at an arbitrary position of the drawer 11 corresponding to the front of the box shaped case 10, so that the documents 6 ejected to the stacker part 5 can be removed with more ease in the closed state of the drawer 11. Hence, even if the box shaped case 10 is thin, it is possible to easily remove the documents 6 within the stacker part 5. A paper guide 11B is adjustable to suit the size of the documents 6.

Figure 18:
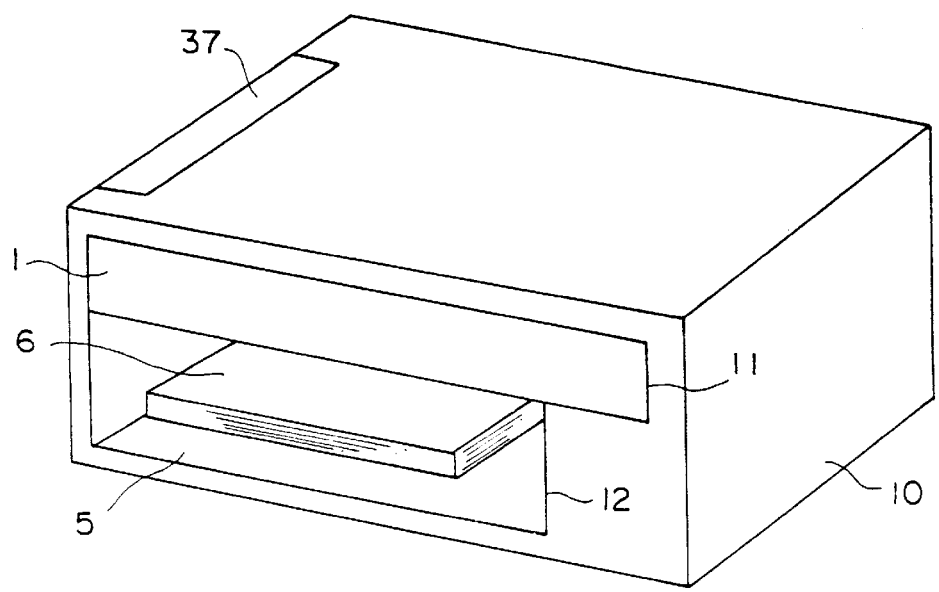
FIG. 18 is a perspective view showing a fourth embodiment of the apparatus according to the present invention.

FIG. 18 shows a fourth embodiment of the apparatus according to the present invention.

In this embodiment, the height of the opening 12 is large compared to the thickness of the drawer 11. Hence, it is possible to more easily remove the documents 6 ejected to the stacker part 5 in the closed state of the drawer 11.

Figure 19:
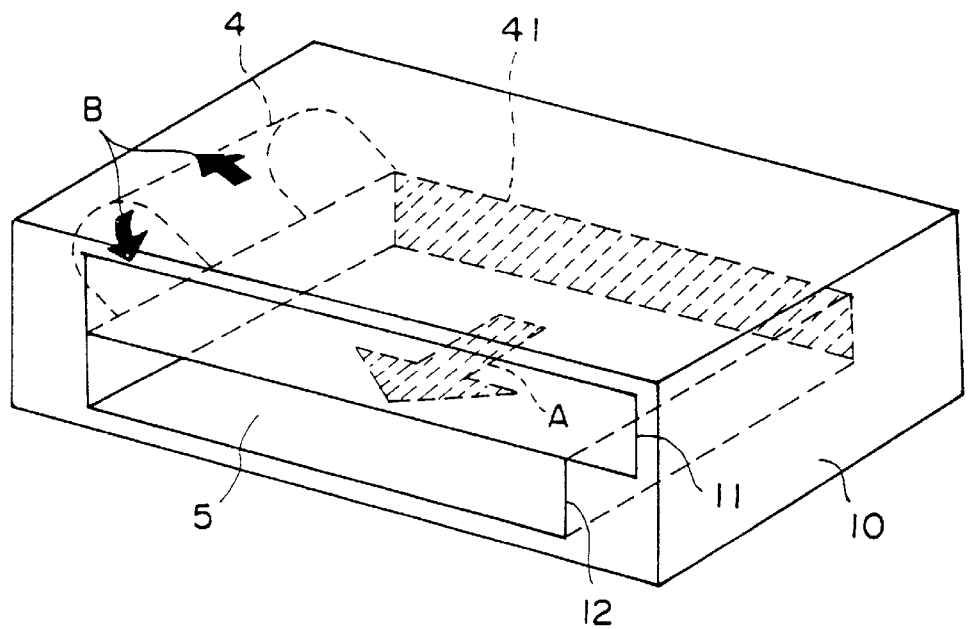
FIG. 19 is a perspective view for explaining the operating principle of a fifth embodiment of the apparatus according to the present invention.

FIG. 19 is a diagram for explaining the operating principle of a fifth embodiment of the apparatus according to the present invention.

In this embodiment, an eject member 41 is provided on the rear of the apparatus behind the stacker part 5. The eject member 41 moves in an arrow direction A to eject the documents 6 ejected to the stacker 5 in the arrow direction A, so as to facilitate the removal of the documents 6. In FIG. 19, an arrow B indicates the transport direction of the document 6 in the turn-over part 4.

Figure 20:
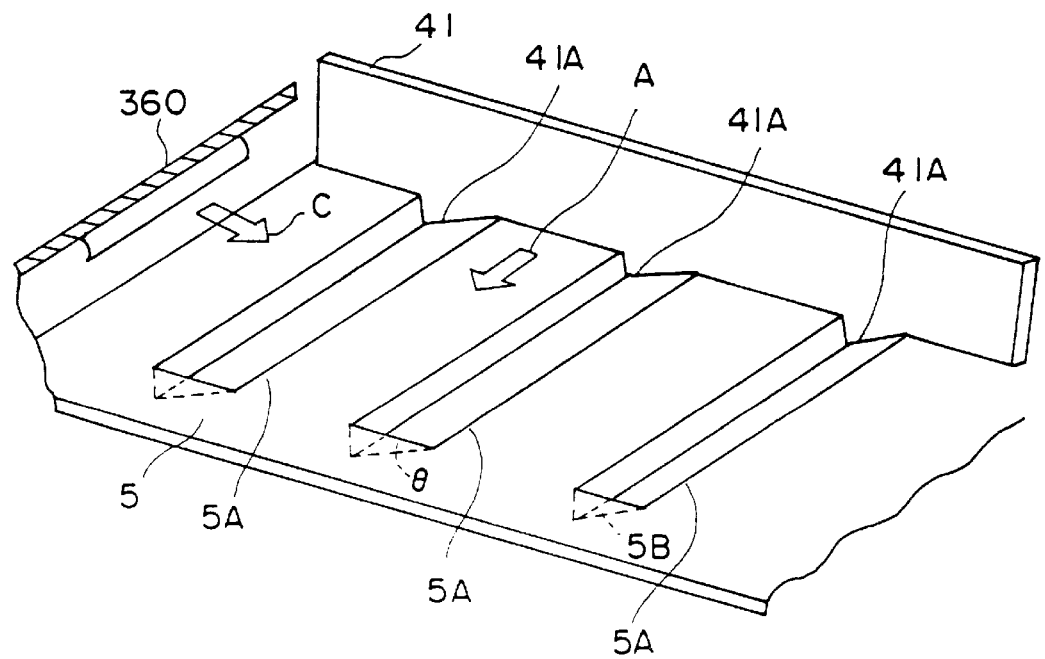
FIG. 20 is a perspective view showing an important part of a first embodiment of an eject member.

FIG. 20 shows an important part of a first embodiment of the eject member 41. In FIG. 20, the eject member 41 has projecting parts 41A having a shape corresponding to the shape of grooves 5A provided in the stacker part 5. The groove 5A includes a sloping part 5B which functions both as a guide for guiding the movement of the eject member 41 in the arrow direction A and as a guide for smoothening the movement of the document 6 in an eject direction C when the document 6 is ejected into the stacker part 5 via the eject roller 36b and an eject opening 360. An inclination angle O of this sloping part 5B is 5° to 30°, for example. Since the eject member 41 has the projecting part 41A, it is possible to positively eject the document 6 in the direction A, down to the last document in a stack. The length of the eject member 41 in the horizontal direction (direction C) need not necessarily match the maximum length of the document 6, and may match the minimum length of the document 6, for example. In other words, the length of the eject member 41 does not need to extend along the entire length of the stacker part 5 in the direction C.

Figure 21:
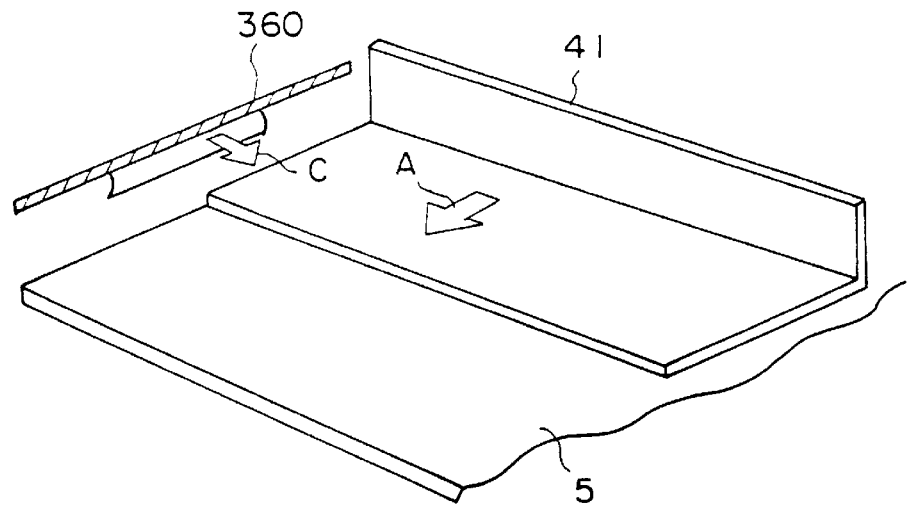
FIG. 21 is a perspective view showing an important part of a second embodiment of the eject member.

FIG. 21 shows an important part of a second embodiment of the eject member 41. In FIG. 21, the eject member 41 has an L-shaped cross section. Accordingly, a part of the document 6 which is ejected to the stacker part 5 rests on a bottom plate portion of the eject member 41. The length of the eject member 41 in the direction C may be set similarly to the case shown in FIG. 20.

Figure 22:
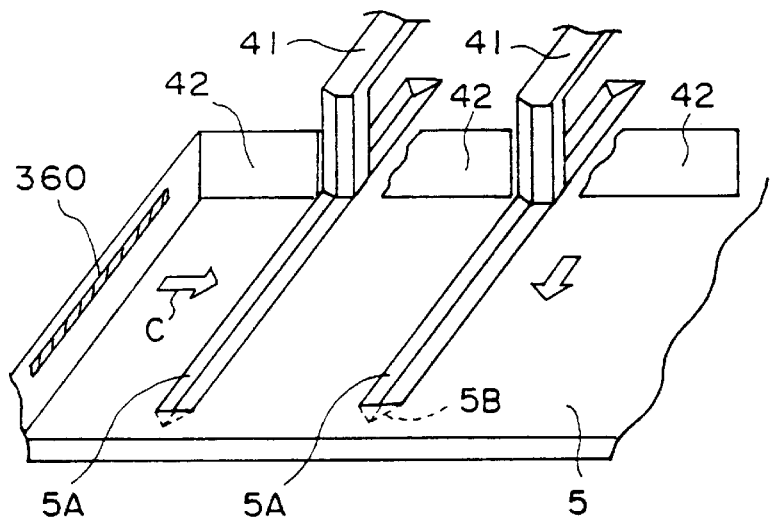
FIG. 22 is a perspective view showing an important part of a third embodiment of the eject member.
Figure 23:
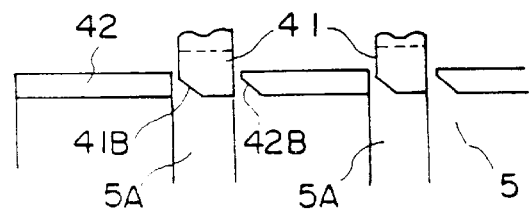
FIG. 23 is a plane view showing an important part of a third embodiment of the eject member.
Figure 24F:
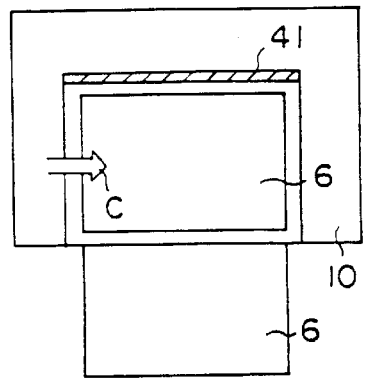
FIGS. 24(a) through 24(f) respectively are plan views for explaining the document eject operation of the fifth embodiment.
Figure 24A:
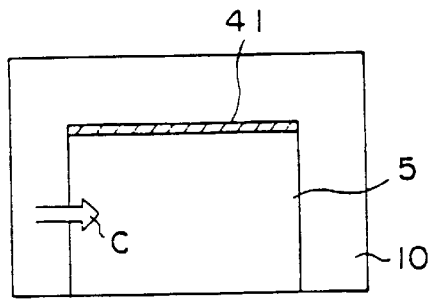
Figure 24E:
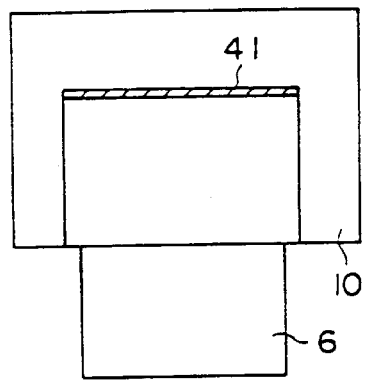
Figure 24B:
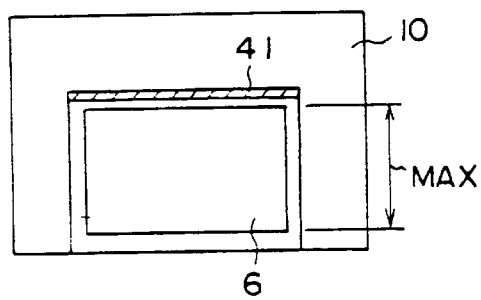
Figure 24D:
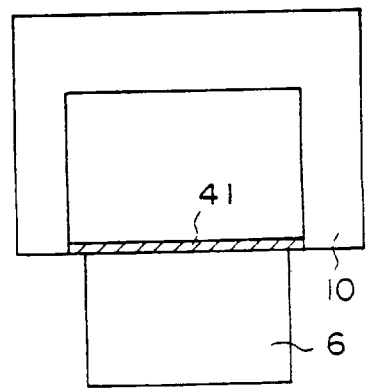
Figure 24C:
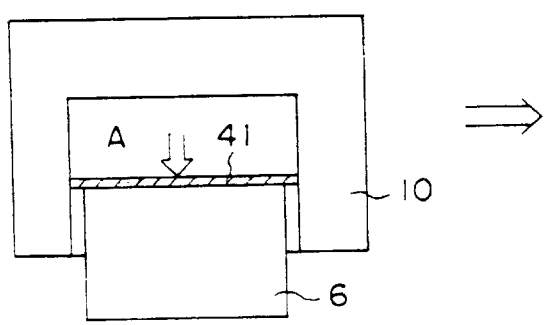
Figure 25A:
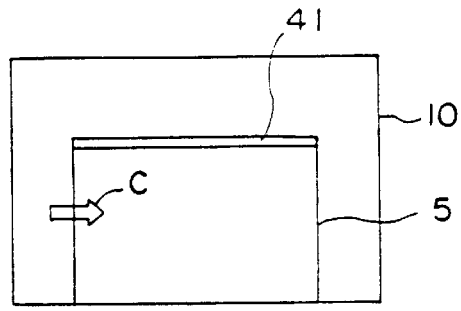
FIGS. 25(a) through 25(e) respectively are plan views for explaining a moving quantity of the eject member of the fifth embodiment.
Figure 25B:
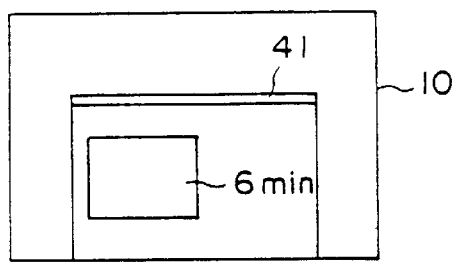
Figure 25C:
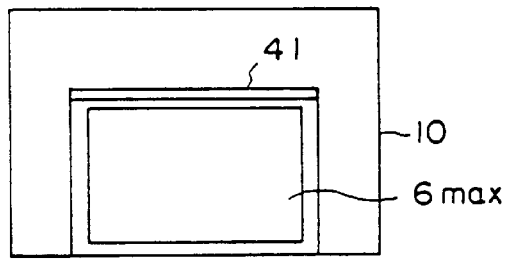
Figure 25D:
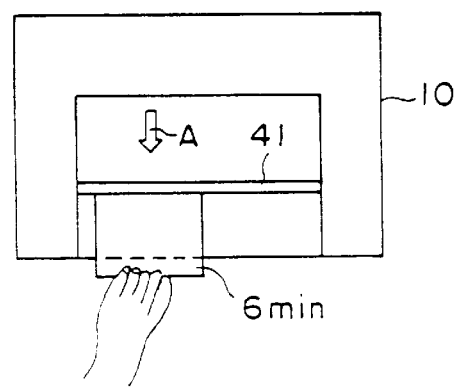
Figure 25E:
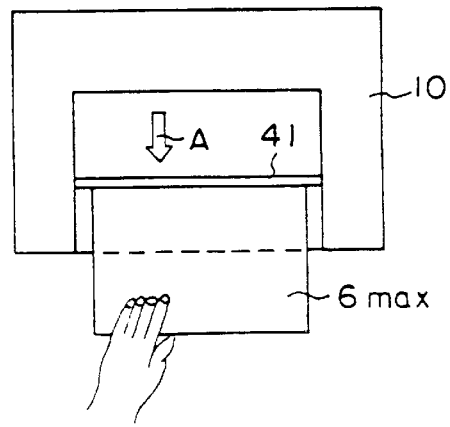

FIG. 22 shows an important part of a third embodiment of the eject member 41. In addition, FIG. 23 shows a plan view of an important part of this eject member 41. The eject member 41 is made up of one or a plurality of arms which is movable in the direction A via one or a plurality of openings in a fixed wall 42. Each arm moves along the groove 5A which is provided in the stacker part 5. Sloping parts 41B and 42B are respectively formed on the arm and the fixed wall 42 as shown in FIG. 23, so that the document 6 which is ejected in the direction C can smoothly move in the direction C even when the document 6 makes contact with the tip end of the arm or the edge forming the opening in the fixed wall 42.

FIG. 24 is a diagram for explaining a document eject operation of the fifth embodiment. When one or a plurality of documents 6 are ejected in the direction C to the stacker part 5 in a standby state shown in FIG. 24($a$), the documents 6 are placed within the stacker part 5 as shown in FIG. 24($b$). A maximum width of the document 6 used is indicated by MAX. Thereafter, when the eject member 41 moves in the direction A as shown in FIG. 24($c$), the document 6 is ejected to a position shown in FIG. 24($d$). Next, the eject member 41 returns to the original position shown in FIG. 24($e$), and it becomes possible to eject the next document 6 to within the stacker part 5 as shown in FIG. 24($f$). Hence, the document 6 which is ejected from the stacker part 5 is ejected to a position that does not interfere with the document 6 which is next ejected to the stacker part 5.

The size of the document 6 is not necessarily limited to one kind. In other words, when a document $6_{min}$ is used, of a minimum size and is ejected to the stacker part 5 in the standby state shown in FIG. 25($a$), a state shown in FIG. 25($b$) is obtained. In addition, when a document $6_{max}$ is used, of a maximum size, and is ejected to the stacker part 5, a state shown in FIG. 25($c$) is obtained. When it is assumed that the next document 6 is not ejected to the stacker part 5 until the document 6 already ejected to the stacker part 5 is removed, it is sufficient for a moving quantity of the eject member 41 in the direction A to be set such that the document 6 is pushed out in the direction A to a position that would at least enable easy removal of the document 6 even in the case of the document $6_{min}$ having the minimum size. FIGS. 25($d$) and 25($e$) respectively show the documents $6_{min}$ and $6_{max}$ which are ejected from the stacker part 5 by minimum moving quantities.

Next, a description will be given of a driving method for the eject member 41. The eject member 41 may be moved manually or, by use of a driving source such as a motor and a plunger.

Figure 26:
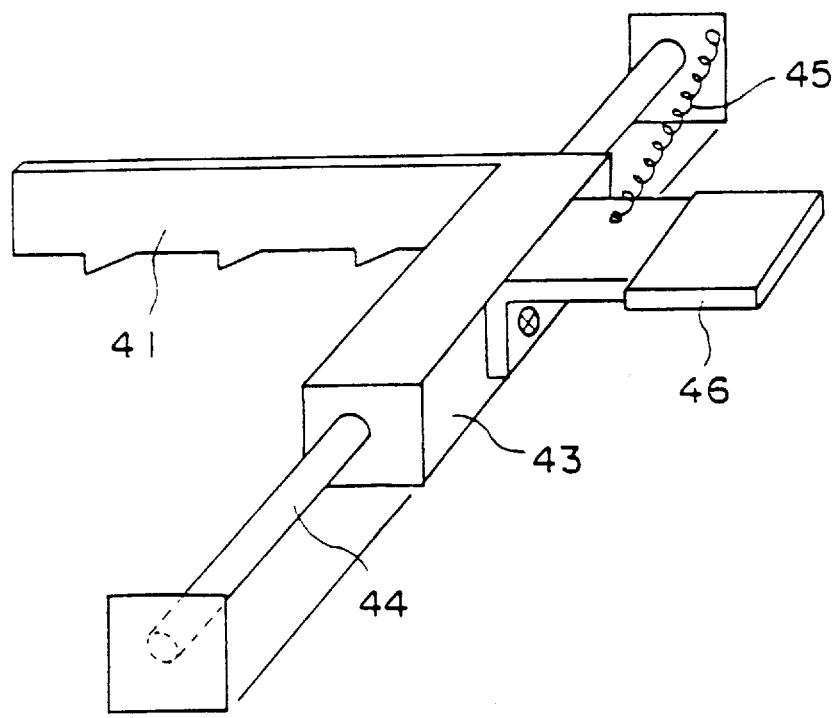
FIG. 26 is a perspective view showing an important part of a first embodiment of a driving mechanism of the eject member.

FIG. 26 shows an important part of a first embodiment of a driving mechanism for the eject member 41. In FIG. 26, the eject member 41 is connected to a slider 43, and the slider 43 is slidable along a guide shaft 44. A handle 46 is connected to the slider 43, and a coil spring 45 is provided between the handle 46 and an inner wall on the rear of the box shaped case 10. The coil spring 45 normally urges the handle 46 towards the rear of the box shaped case 10. However, it is possible to omit the coil spring 45.

Figure 27A:
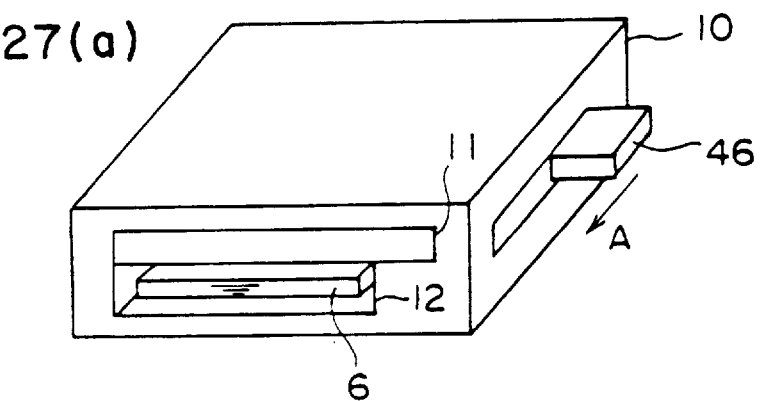
FIGS. 27(a) and 27(b) respectively are perspective views for explaining the operation of a first embodiment of a driving mechanism.
Figure 27B:
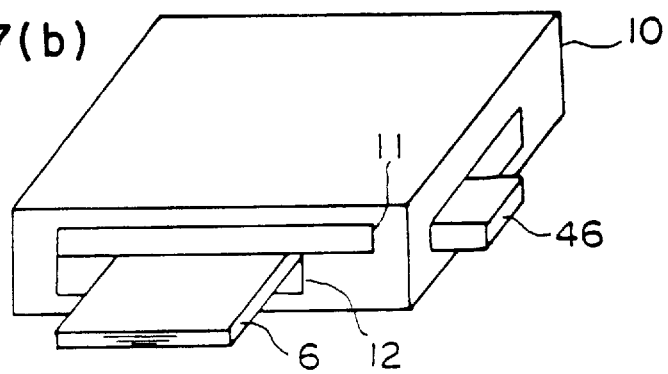

FIG. 27 is a diagram for explaining the operation of the first embodiment of the driving mechanism. When the handle 46 is moved in the direction A in a state where the document 6 is ejected to within the stacker part 5 as shown in FIG. 27($a$), the eject member 41 is moved in the direction A, and the document 6 is ejected via the opening 12 as shown in FIG. 27($b$).

The handle 46 may be constructed to connect to the slider 43 and to project via the opening 12 in the direction A. In addition, the shape of the handle 46 is of course not limited to that shown in FIG. 26.

Figure 28:
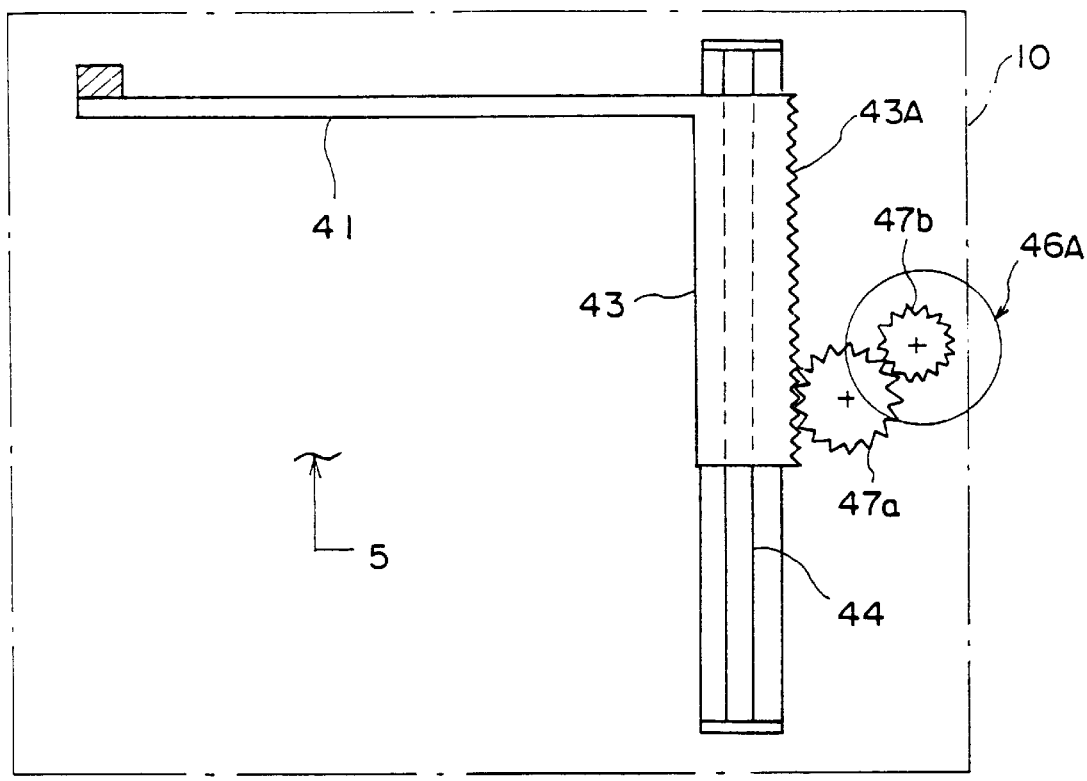
FIG. 28 is a plan view showing an important part of a second embodiment of the driving mechanism of the eject member.

FIG. 28 shows an important part of a second embodiment of the driving mechanism for the eject member 41. In FIG. 28, those parts which are the same as those corresponding parts in FIG. 26 are designated by the same reference numerals, and a description thereof will be omitted. In FIG. 28, a rack 43A is provided on the slider 43. In addition, a disk shaped handle 46A is linked to the rack 43A via a gear 47b and a pinion 47a. Hence, it is possible to move the eject member 41 towards the front and the rear of the box shaped case 10 by turning the handle 46A.

Figure 29:
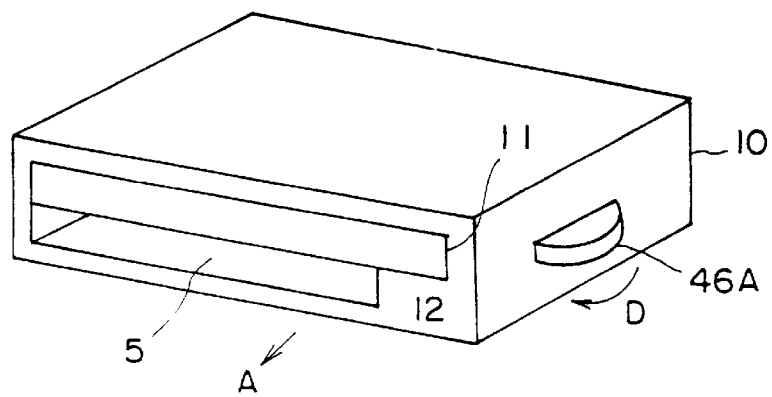
FIG. 29 is a perspective view for explaining the operation of the second embodiment of the driving mechanism.

FIG. 29 is a diagram for explaining the operation of the second embodiment of the driving mechanism. In FIG. 29, the document 6 within the stacker part 5 is ejected in the direction A by turning the handle 46A in an arrow direction D.

Figure 30:
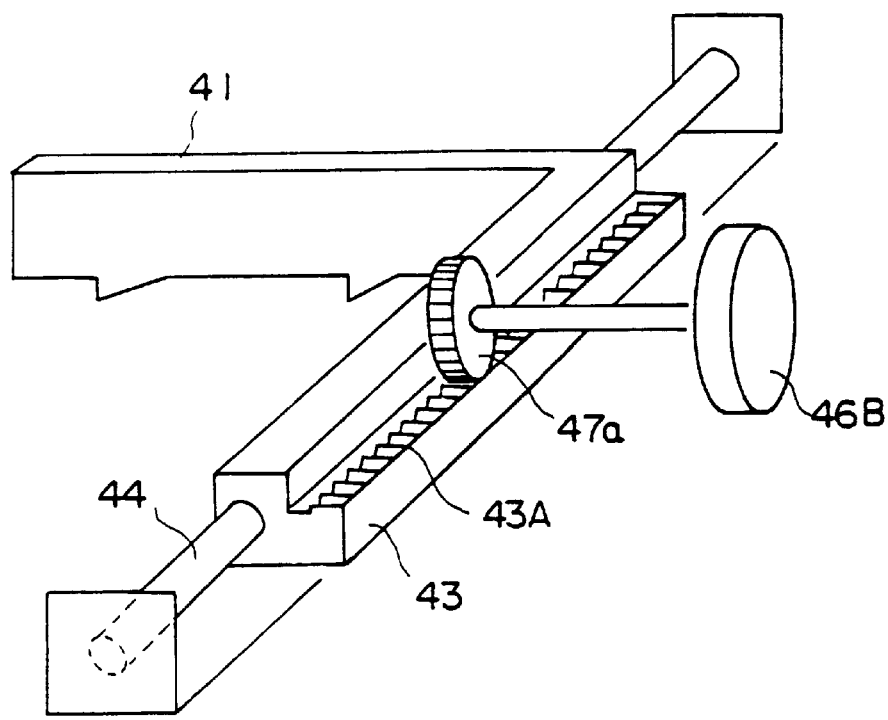
FIG. 30 is a perspective view showing an important part of a third embodiment of the driving mechanism of the eject member.

FIG. 30 shows an important part of a third embodiment of the driving mechanism for the eject member 41. In FIG. 30, those parts which are the same as those corresponding parts in FIG. 28 are designated by the same reference numerals, and a description thereof will be omitted. In FIG. 30, a disk shaped handle 46B is linked to the rack 43A via the pinion 47a. Accordingly, it is possible to move the eject member 41 towards the front and the rear of the box shaped case 10 by turning the handle 46B.

Figure 31:
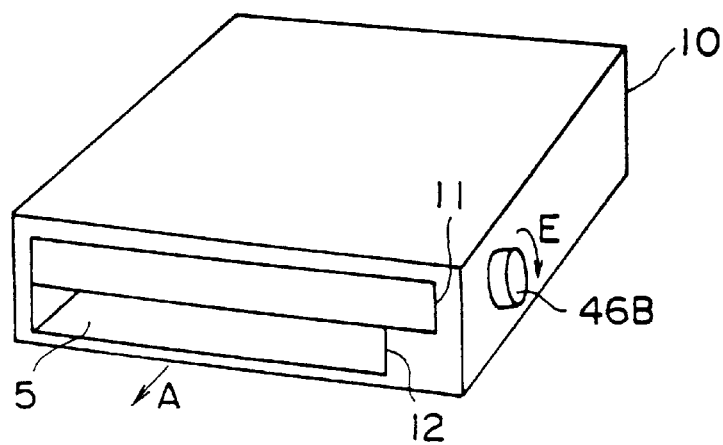
FIG. 31 is a perspective view for explaining the operation of the third embodiment of the driving mechanism.

FIG. 31 is a diagram for explaining the operation of the third embodiment of the driving mechanism. In FIG. 31, the document 6 within the stacker part 5 is ejected in the direction A by turning the handle 46B in an arrow direction E.

Figure 32:
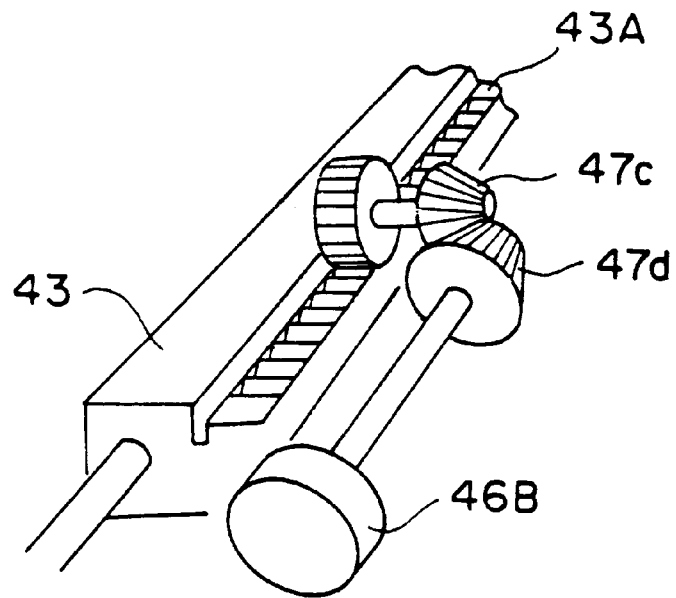
FIG. 32 is a perspective view showing an important part of a fourth embodiment of the driving mechanism of the eject member.

FIG. 32 shows an important part of a fourth embodiment of the driving mechanism for the eject member 41. In FIG. 32, those parts which are the same as those corresponding parts in FIG. 28 are designated by the same reference numerals, and a description thereof will be omitted. In FIG. 32, the disk shaped handle 46B is linked to the rack 43A via bevel gears 47c and 47d. Hence, it is possible to move the eject member 41 towards the front and the rear of the box shaped case 10 by turning the handle 46B.

Figure 33:
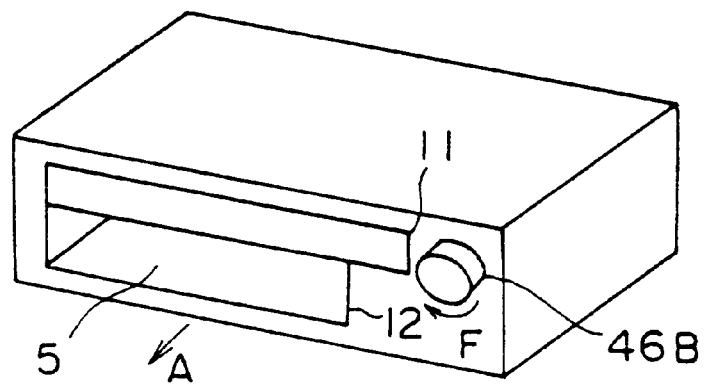
FIG. 33 is a perspective view for explaining the operation of the fourth embodiment of the driving mechanism.

FIG. 33 is a diagram for explaining the operation of the fourth embodiment of the driving mechanism. In FIG. 33, the document 6 within the stacker part 5 is ejected in the direction A by turning the handle 46B in an arrow direction F.

Of course, the shape of the handle 46B is not limited to those shown in FIGS. 31 and 33.

Figure 34:
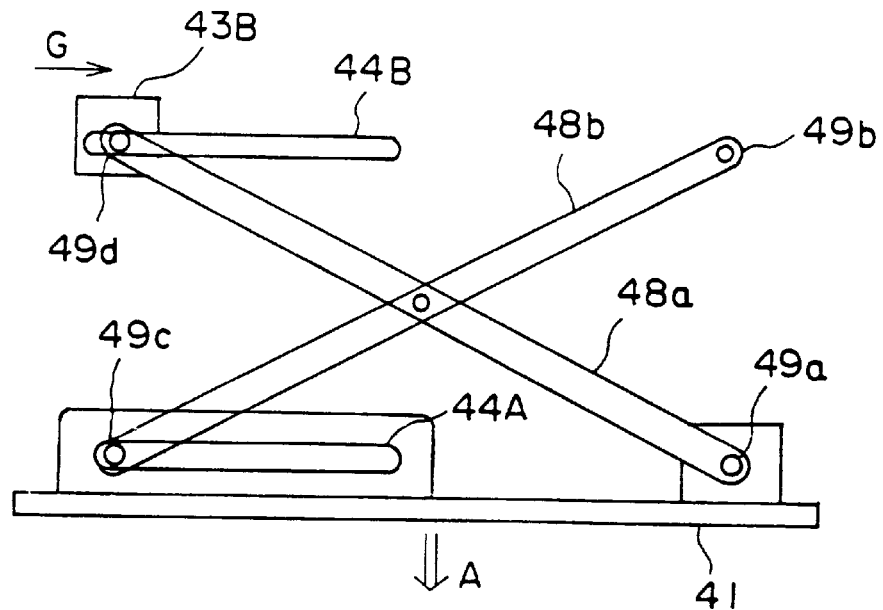
FIG. 34 is a plan view showing an important part of a fifth embodiment of the driving mechanism of the eject member.

FIG. 34 shows an important part of a fifth embodiment of the driving mechanism for the eject member 41. The driving mechanism generally includes links 48a and 48b, pins 49a through 49d, a slider 43B, and guide grooves 44A and 44B. The pins 49a and 49b are slidable along the corresponding guide grooves 44A and 44B. Accordingly, when the slider 43B is slid in an arrow direction G, the eject member 41 moves in the direction A, and it is possible to eject the document 6 within the stacker part 5 in the same direction A. Although the illustration thereof will be omitted, a handle which connects to the slider 43B may be provided so as to project from the left side of the box shaped case 10. In this case, it is possible to eject the document 6 within the stacker part 5 in the direction A by pushing this handle in the direction G.

The driving mechanisms for the eject member 41 described above are respectively constructed to be manually operated. However, it is possible to operate these driving mechanisms by a driving source such as a motor and a plunger. Although the illustration thereof will be omitted, the driving mechanisms shown in FIGS. 26 and 34 may be driven by a plunger. In addition, the driving mechanisms shown in FIGS. 28 and 30 may be driven by a motor.

Next, a description will be given of typical driving mechanisms for the eject member 41 driven by a motor, by referring to FIGS. 35 through 37.

Figure 35:
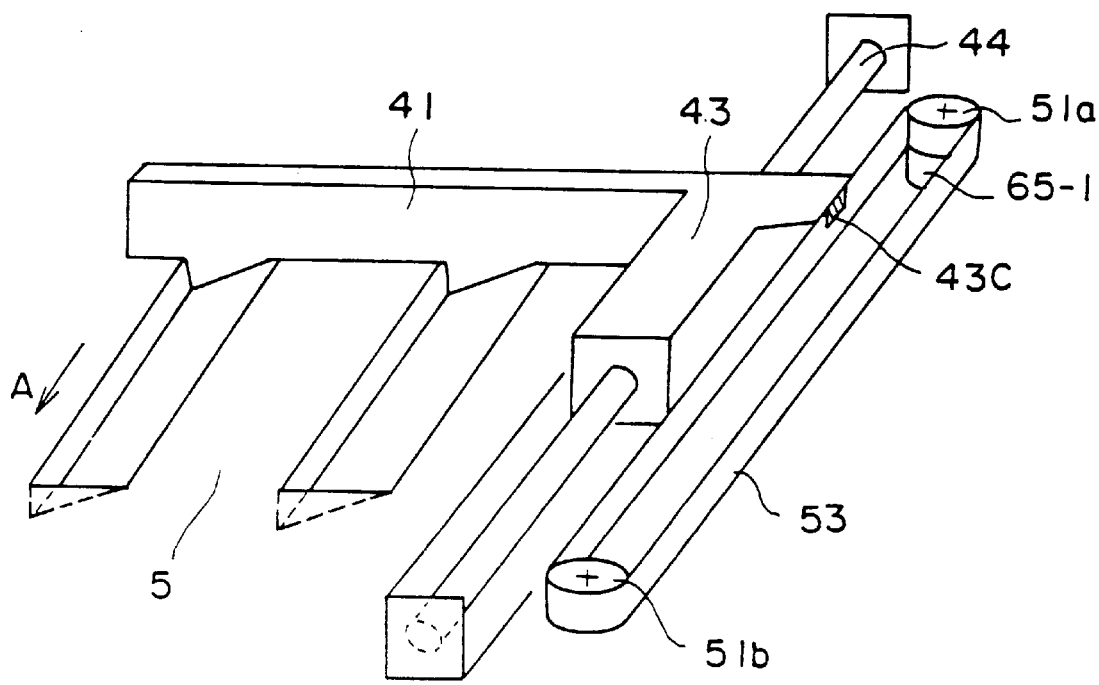
FIG. 35 is a perspective view showing an important part of a sixth embodiment of the driving mechanism of the eject member.

FIG. 35 shows an important part of a sixth embodiment of the driving mechanism for the eject member 41. In FIG. 35, those parts which are the same as those corresponding parts in FIG. 26 are designated by the same reference numerals, and a description thereof will be omitted. In FIG. 35, a belt 53 is provided across a pair of pulleys 51a and 51b, and this belt 53 is connected to the slider 43 at a connecting part 43c. When the pulley 51a is rotated by a motor 65-1, the belt 53 is driven and the eject member 41 moves in the direction A.

Figure 36:
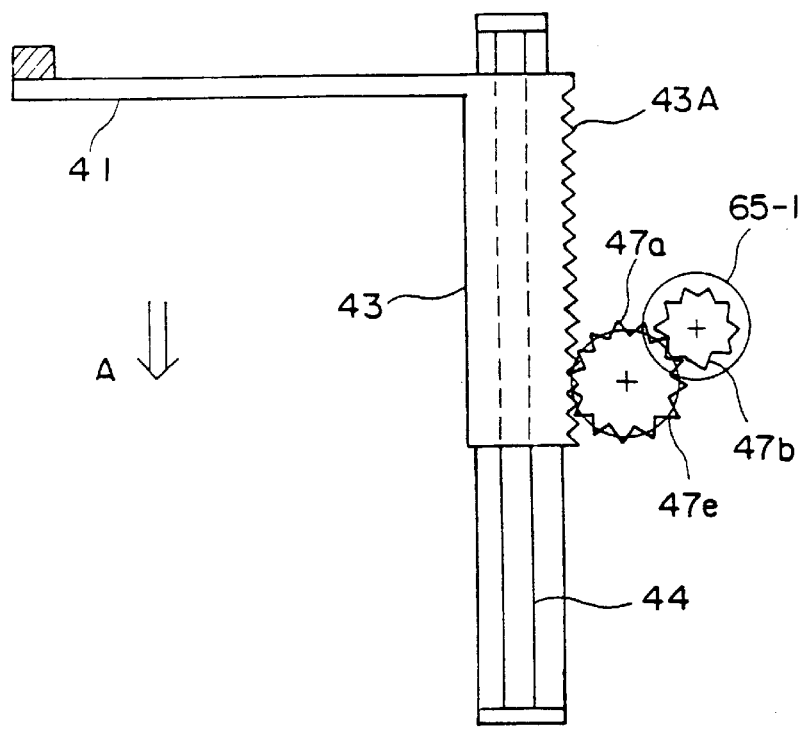
FIG. 36 is a plan view showing an important part of a seventh embodiment of the driving mechanism of the eject member.

FIG. 36 shows an important part of a seventh embodiment of the driving mechanism for the eject member 41. In FIG. 36, those parts which are the same as those corresponding parts in FIG. 28 are designated by the same reference numerals, and a description thereof will be omitted. In FIG. 36, a speed-reducing gear 47b is rotated by the motor 65-1, and the slider 43 is driven via a speed-reducing gear 47e, the pinion 47a and the rack 43A.

Figure 37:
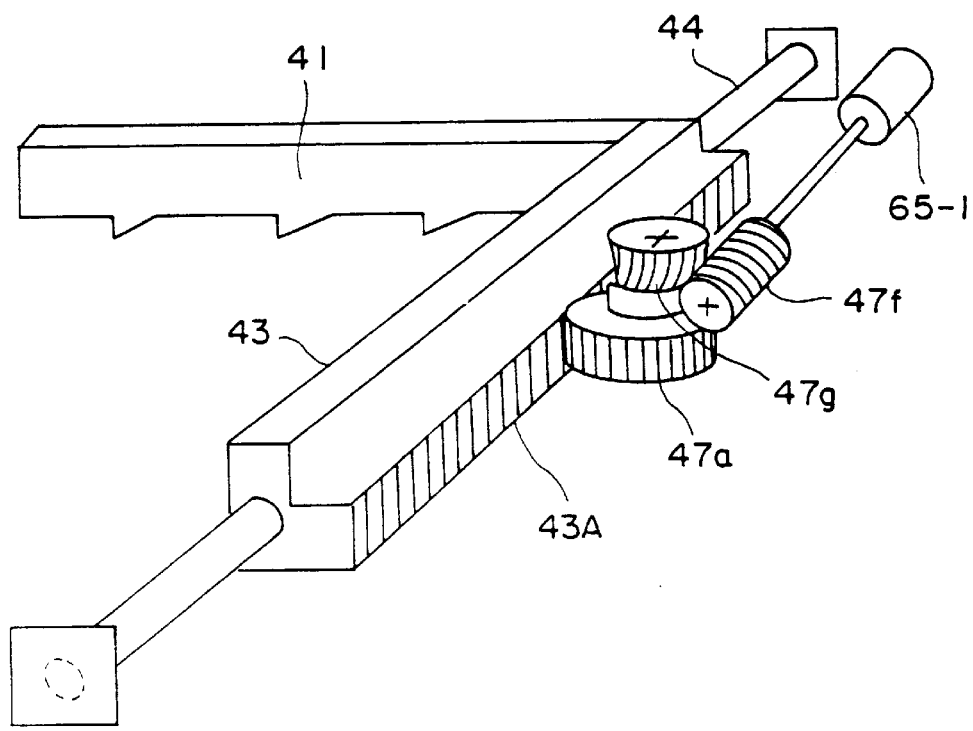
FIG. 37 is a perspective view showing an important part of an eighth embodiment of the driving mechanism of the eject member.

FIG. 37 shows an important part of an eighth embodiment of the driving mechanism for the eject member. In FIG. 37, those parts which are the same as those corresponding parts in FIG. 28 are designated by the same reference numerals, and a description thereof will be omitted. In FIG. 37, a worm gear 47f is rotated by the motor 65-1, and the slider 43 is driven via a worm wheel 47g, the pinion 47a and the rack 43A. In this case, since the worm gear 47f and the worm wheel 47g are provided, the eject member 41 moves only when the motor 65-1 rotates, and the eject member 41 will not move unexpectedly.

Figure 38A:
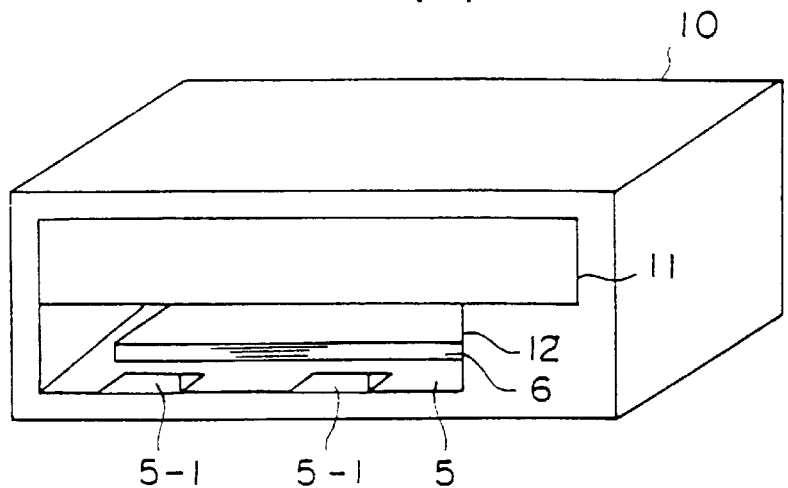
FIGS. 38(a) and 38(b) respectively are perspective views for explaining a first embodiment of a stacker part.
Figure 38B:
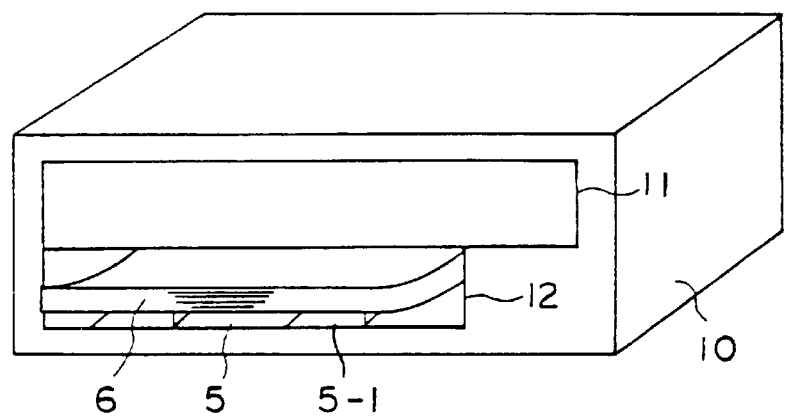

Next, a description will be given of a first embodiment of the stacker part 5, by referring to FIG. 38. In this embodiment, a pair of sloping guides 5-1 is provided on the side of the stacker part 5 provided with the opening 12 as shown in FIG. 38(a). Hence, when the document 6 is ejected from the stacker part 5, the tip end of the document 6 is raised slightly upwards by the sloping guides 5-1 as shown in FIG. 38(b), so that the document 6 may be removed with ease.

Figure 39:
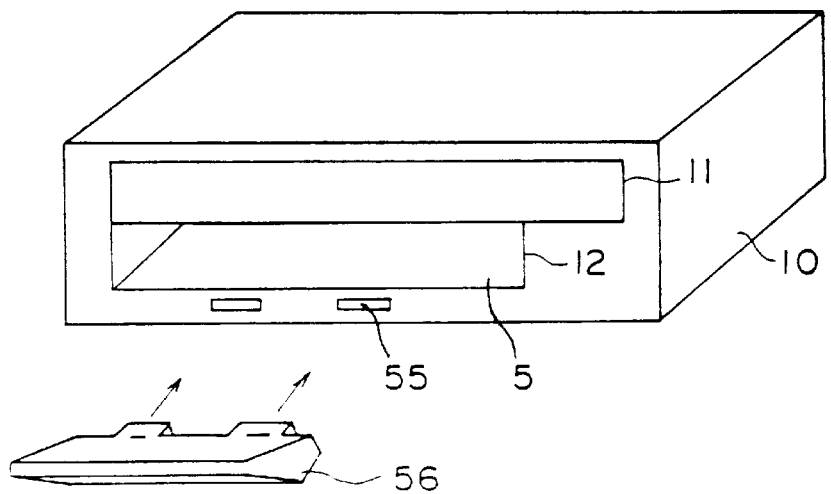
FIG. 39 is a perspective view for explaining a second embodiment of the stacker part.

FIG. 39 shows a second embodiment of the stacker part 5. In this embodiment, a sloping guide 56 is detachably provided with respect to holes 55 on the front lower portion of the box shaped case 10. In a state where the sloping guide 56 is attached to the box shaped case 10, the tip end of the document 6 is raised slightly upwards by the sloping guide 56 in FIG. 39 when the document is ejected from the stacker part 5, so that the document 6 may be removed with ease.

Figure 40A:
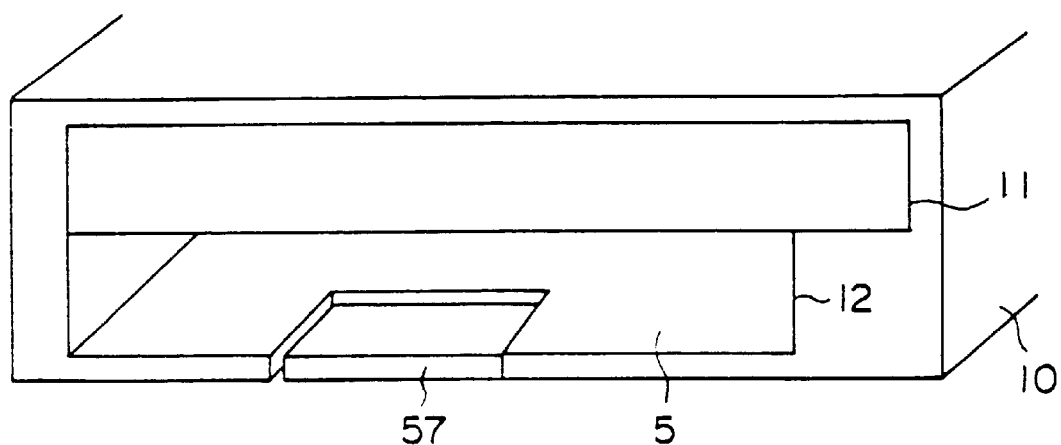
FIGS. 40(a) and 40(b) respectively are perspective views for explaining a third embodiment of the stacker part.
Figure 40B:
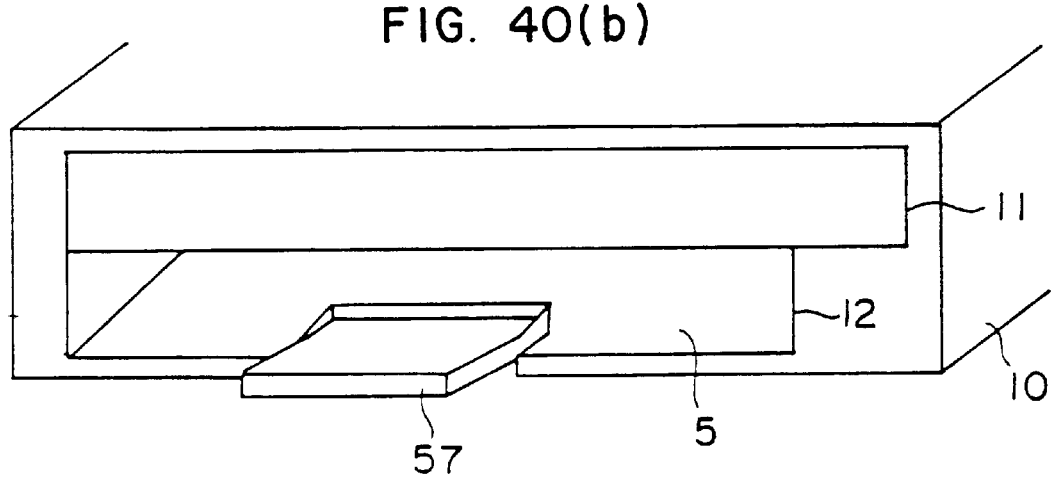

FIG. 40 shows a third embodiment of the stacker part 5. In this embodiment, a sloping guide 57 is pivottably supported as shown in FIG. 40(a). When the sloping guide 57 is pulled to the front and lifted, it assumes a state shown in FIG. 40(b). When the document 6 is ejected from the stacker part 5 in this state of the sloping guide 57, the tip end of the document 6 is raised slightly upwards in FIG. 40(b), so that the document 6 may be removed with ease.

Figure 41:
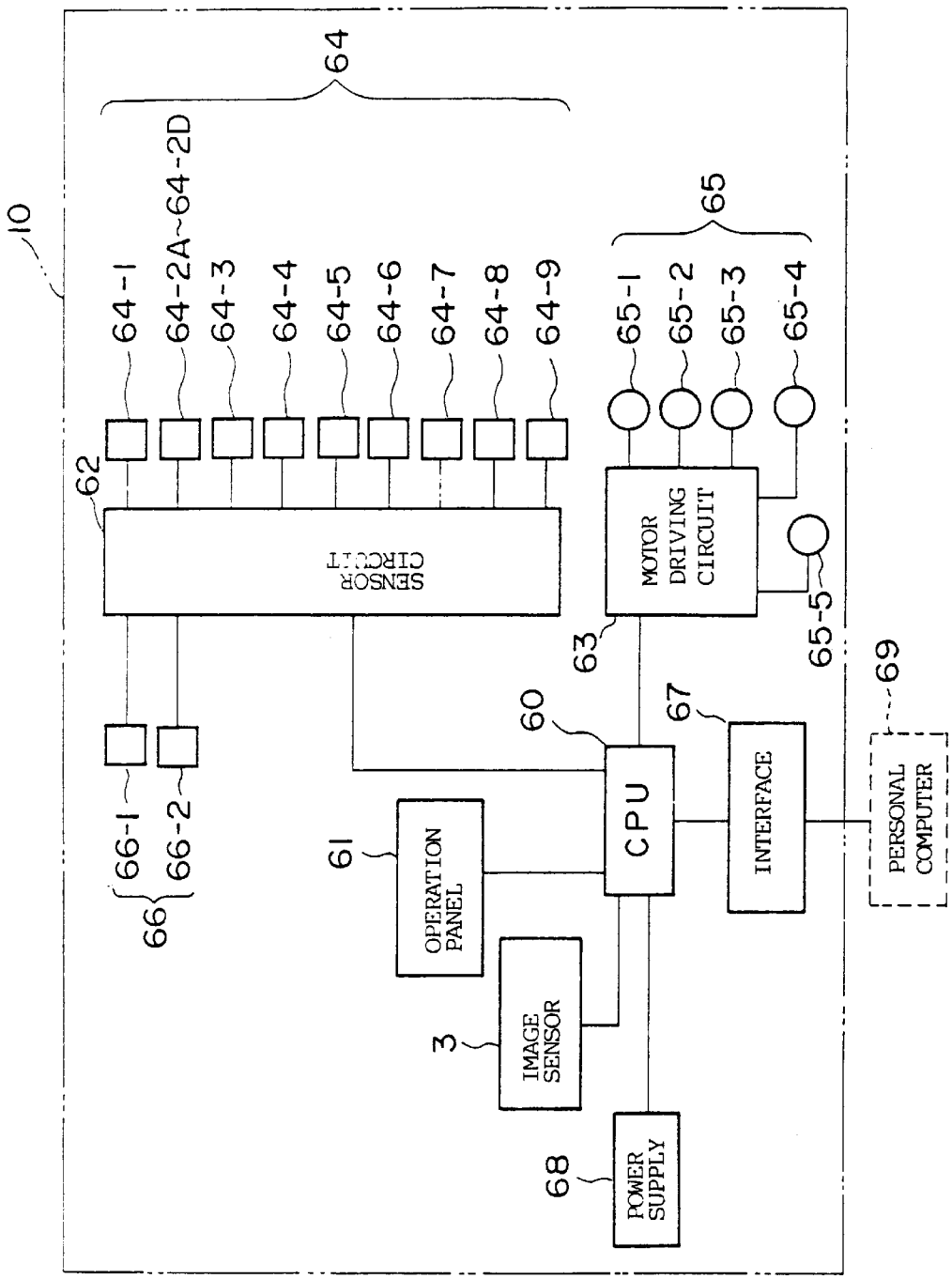
FIG. 41 is a system block diagram showing a fifth embodiment of the apparatus according to the present invention.

FIG. 41 is a system block diagram showing the fifth embodiment of the apparatus according to the present invention. The apparatus shown in FIG. 41 includes a central processing unit (CPU) 60, the image reader part 3 such as an image sensor, an operation panel 61 including various switches, a sensor circuit 62, a motor driving circuit 63, a sensor group 64, a motor group 65, a sensor group 66, an interface 67, and a power supply 68 for supplying a power supply voltage to various parts of the apparatus, which are connected as shown. The CPU 60 processes image data from the image sensor 3, and also controls the motor group 65 and the like via the motor driving circuit 63 based on detection signals from the sensor groups 64 and 66 obtained via the sensor circuit 62. The CPU 60 is coupled to a personal computer 69, for example, via the interface 67. The power supply 68 may of course be an external power supply.

Figure 42:
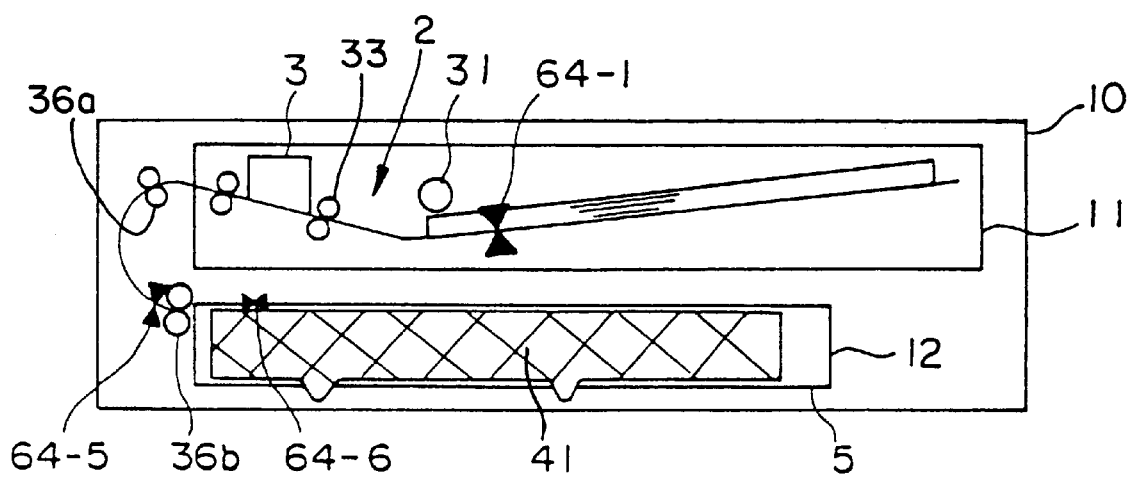
FIG. 42 is a cross sectional view for explaining positions of main sensors.

FIG. 42 is a cross sectional view showing locations of a hopper empty sensor 64-1, a paper eject sensor 64-5 and a stacker full sensor 64-6 within the sensor group 64. In FIG. 42, those parts which are the same as those corresponding parts in FIG. 6 are designated by the same reference numerals, and a description thereof will be omitted. The hoper empty sensor 64-1 outputs a detection signal when no more documents 6 exist within the hopper part 1. The paper eject sensor 64-5 outputs a detection signal when it is detected that the document 6 has been ejected from the eject roller 36*b* into the stacker part 5. In addition, the stacker full sensor 64-6 outputs a detection signal when it is detected that the amount of the documents 6 within the stacker part 6 has exceeded a tolerable amount.

Next, a description will be given of the operation of the CPU 60 of this embodiment, by referring to a flow chart shown in FIG. 43.

Figure 43A:
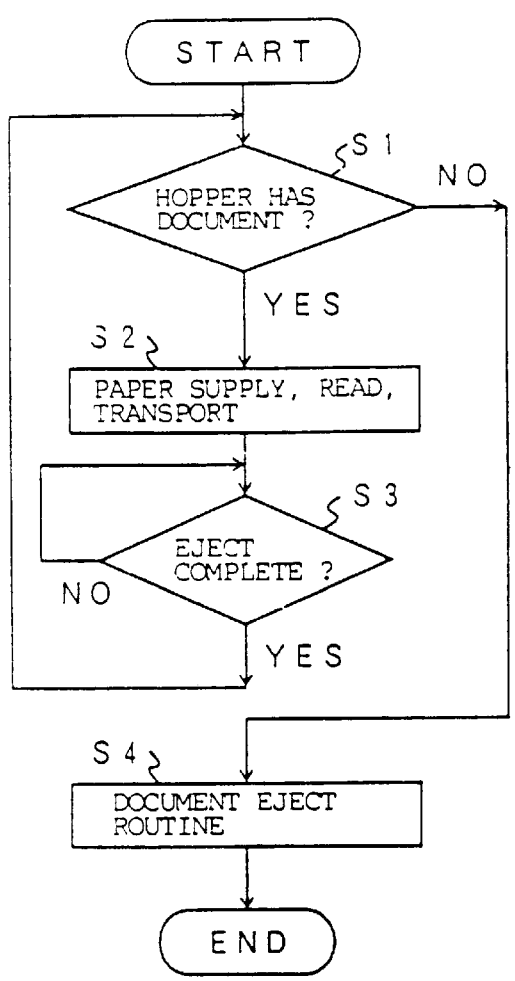
FIGS. 43(a), 43(b) and 43(c) respectively are flow charts for explaining the operation of a CPU.
Figure 43C:
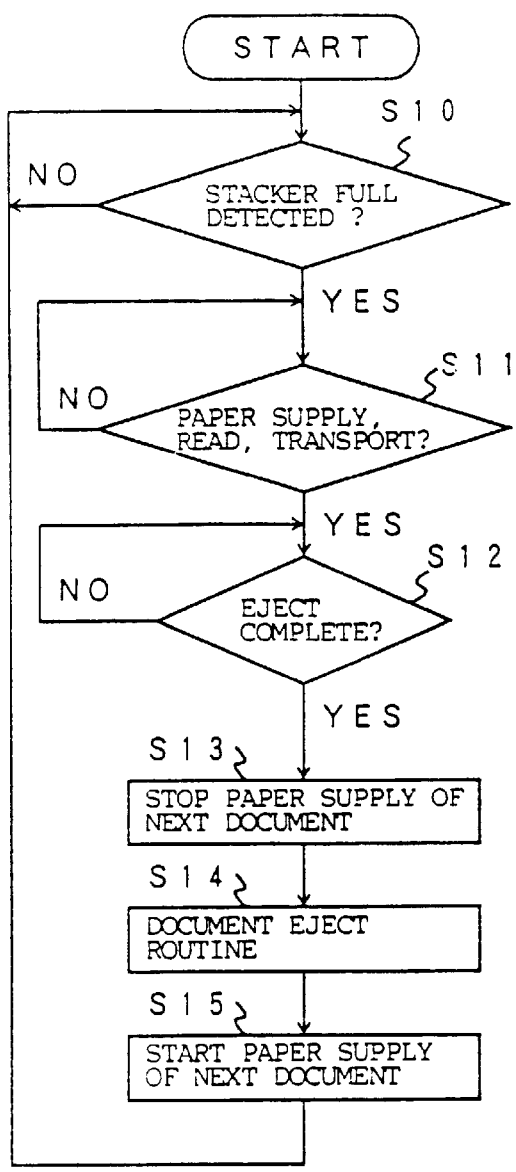

FIG. 43(*a*) shows a hopper empty detection routine of the CPU 60. A step S1 decides whether or not the document 6 exists in the hopper part 1, based on the output signal of the hopper empty sensor 64-1. When the decision result in the step S1 is YES, a step S2 carries out processes such as supplying the document 6 by the paper supply roller 31, reading the document 6 by the image reader part 3, and transporting the document 6 by the document transport part 2. Next, a step S3 decides whether or not the ejection of the document 6 by the eject rollers 36*a*, 36*b*, or the like has been completed, based on the output signal of the paper eject sensor 64-5, and the process returns to the step S1 when the decision result in the step S3 is YES. On the other hand, when the decision result in the step S1 is NO, a step S4 carries out a document eject routine, and the process ends thereafter.

FIG. 43(*b*) shows the document eject routine of the step S4. A step S4-1 carries out an operation of ejecting the document 6 from the stacker part 5 for one cycle. More particularly, the CPU 60 drives and controls the motor 65-1 via the motor driving circuit 63, and moves the eject member 41 in the direction A.

FIG. 43(*c*) shows a stacker full detection routine. A step S10 decides whether or not the amount of documents 6 within the stacker part 5 exceeds a tolerable amount, based on the output signal of the stacker full sensor 64-6. When the decision result in the step S10 is YES, a step S11 decides whether or not the supply, read and transport of the documents 6 are being carried out. When the decision result in the step S11 is YES, a step S12 decides whether or not the ejection of the document 6 by the eject rollers 36*a*, 36*b*, or the like, has been completed, based on the output signal of the paper eject sensor 64-5, and the process advances to a step S13 when the decision result is YES. The step S13 stops the supply of the next document 6, and a step S14 carries out the document eject routine shown in FIG. 43(*b*). Thereafter, after the document 6 within the stacker part 5 is removed, a step S15 starts the supply of the next document 6, and the process returns to the step S10.

After the document 6 within the stacker part 5 is ejected by moving the eject member 41, the eject member 41 must be returned to the original position (home position) by moving the eject member 41 in a direction opposite to the direction A. Otherwise, it is not possible to eject the next document 6 within the stacker part 5.

Figure 44:
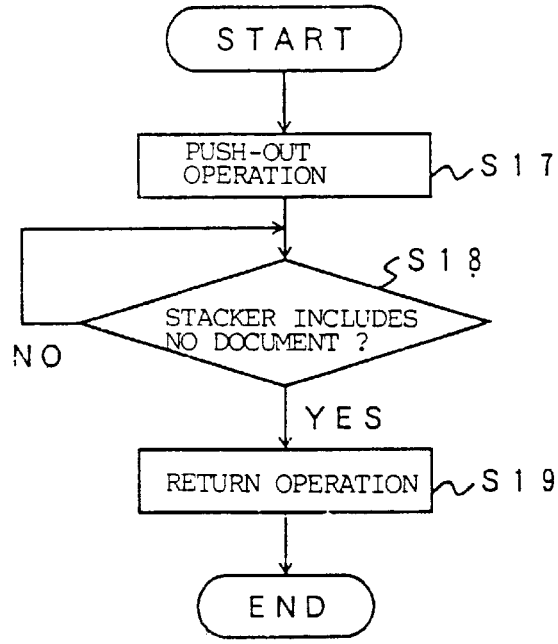
FIG. 44 is a flow chart for explaining the control operation of the eject member.

FIG. 44 shows a control routine of the eject member 41. A step S17 drives and controls the motor 65-1 via the motor driving circuit 63, so as to carry out a "push-out operation" which moves the eject member 41 in the direction A. A step S18 decides whether or not the document 6 remains within the stacker part 5, based on the output signal of the stacker full sensor 64-6. When the decision result in the step S18 is YES, a step S19 drives and controls the motor 65-1 via the motor driving circuit 63 so as to carry out a "return operation" which moves the eject member 41 in the direction opposite to the direction A, and the process ends.

Figure 45:
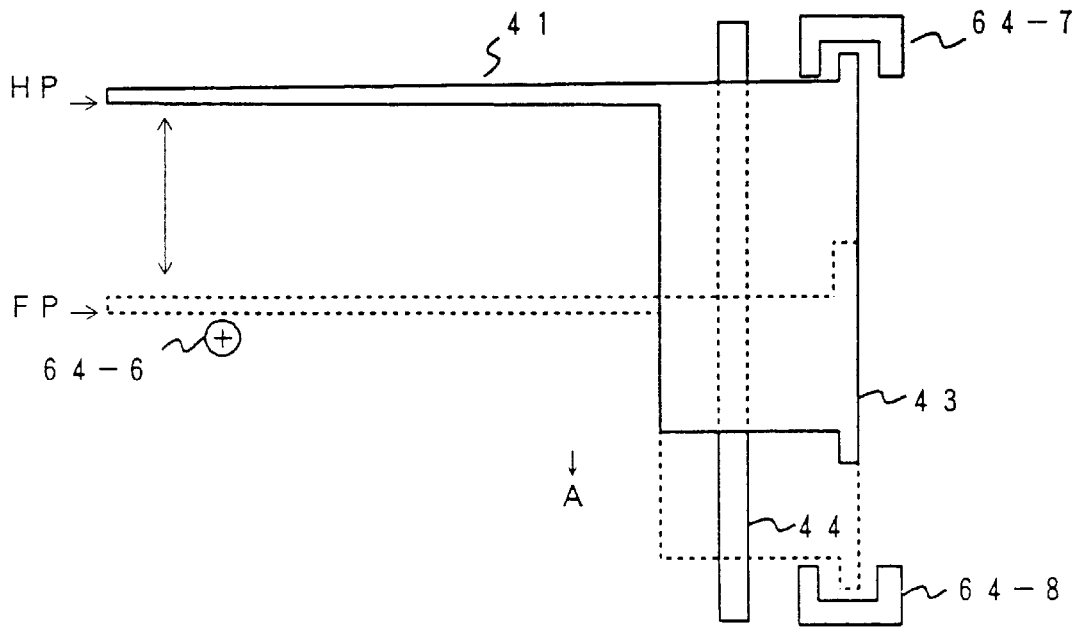
FIG. 45 is a plan view for explaining set-up positions of the sensors.
Figure 46:
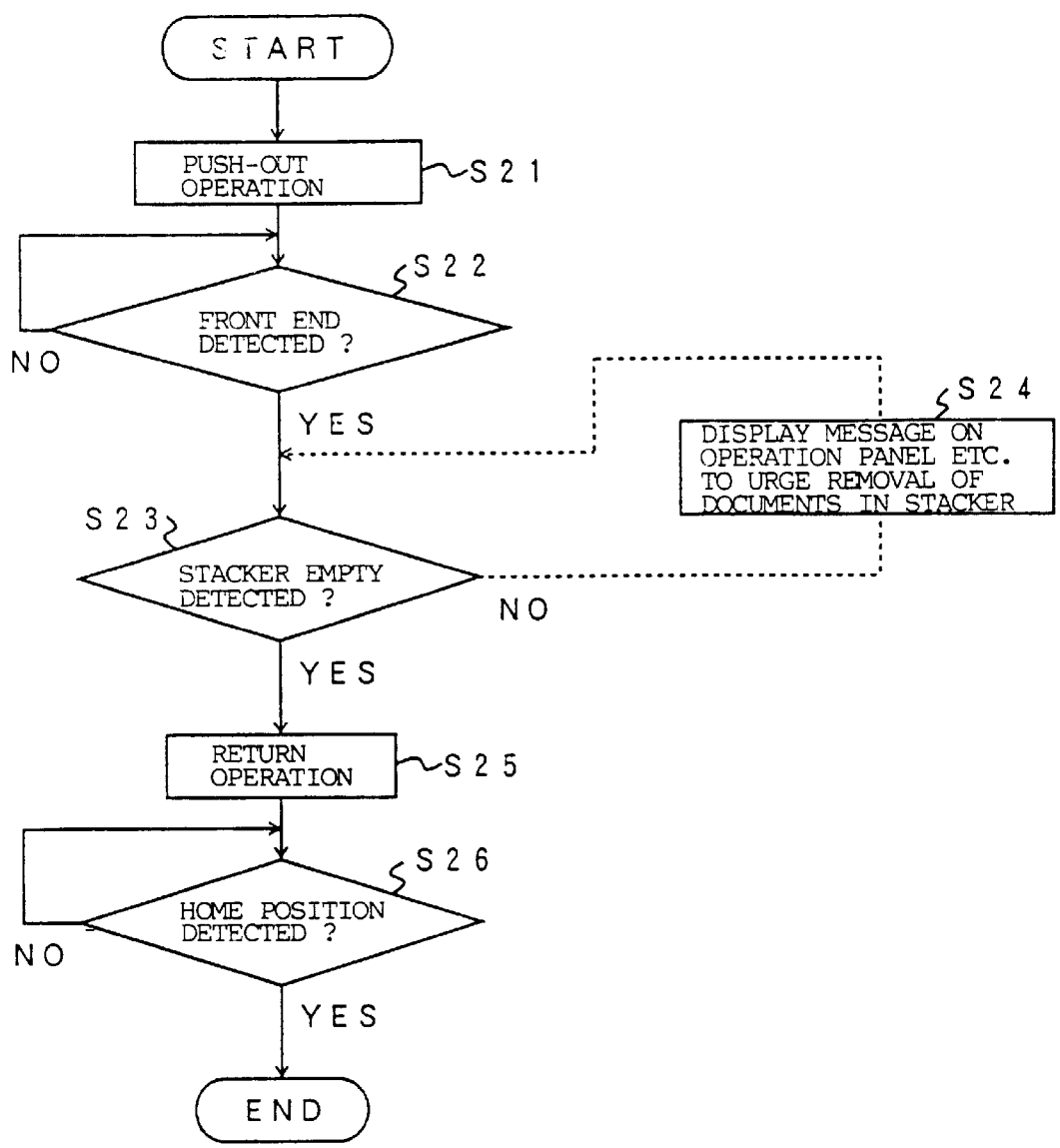
FIG. 46 is a flow chart for explaining the control operation of the eject member in more detail.

Next, a detailed description will be given of the set up positions of the sensors and the control of the eject member. FIG. 45 is a diagram for explaining the set up positions of the stacker full sensor 64-6, a home position sensor 64-7, and a front end sensor 64-8. FIG. 46 is a flow chart for explaining a control operation for the eject member 41. In FIG. 45, those parts which are the same as those corresponding parts in FIG. 36 are designated by the same reference numerals, and a description thereof will be omitted. The stacker full sensor 64-6, the home position sensor 64-7 and the front end sensor 64-8 are respectively made up of photointerrupters or the like.

In FIG. 46, a step S21 carries out the "push-out operation". In other words, the eject member 41 is moved in the direction A from a home position HP shown in FIG. 45 by driving and controlling the motor 65-1 via the motor driving circuit 63. When the eject member 41 moves to a front end position FP indicated by a dotted line in FIG. 45, a detection signal is output from the front end sensor 64-8. Accordingly, a step S22 decides whether or not the eject member 41 has moved to the front end position FP, based on the output signal of the front end sensor 64-8.

When the decision result in the step S22 is YES, a step S23 decides whether or not the document 6 within the stacker part 5 is removed and the stacker part 5 is in a vacant (empty) state, based on the output signal of the stacker full sensor 64-6. When the decision result in the step S23 is NO, a step S24 outputs a message to the operation panel 61 to urge the operator to remove the document 6 ejected from the stacker part 5, and the process returns to the step S23. The step S24 may be omitted.

When the decision result in the step S23 is YES, a step S25 carries out the "return operation". In other words, the eject member 41 is moved in the direction opposite to the direction A from the front end position FP shown in FIG. 45, by driving and controlling the motor 65-1 via the motor driving circuit 63. When the eject member 41 moves to the home position HP, a detection signal is output from the home position sensor 64-7. Accordingly, a step S26 decides whether or not the eject member 41 has moved to the home position HP, based on the output signal of the home position sensor 64-7. The process shown in FIG. 46 ends when the decision result in the step S26 becomes YES.

It is desirable that the size of the document 6 used in the apparatus is not fixed, and that various sizes can be used. Hence, a description will be given of the operation for a case where the amount of the document 6 ejected from the stacker part 5, that is, the amount of the document 6 projecting from the opening 12, can always be kept constant, regardless of the different sizes of the documents 6 used. When the amount of the document 6 projecting from the opening 12 is kept constant regardless of the size of the document 6, it is always possible to easily remove the document. Further, it is possible to prevent an inconvenient situation where the document 6 ejected from the stacker part 5 may fall from the apparatus.

Figure 47:
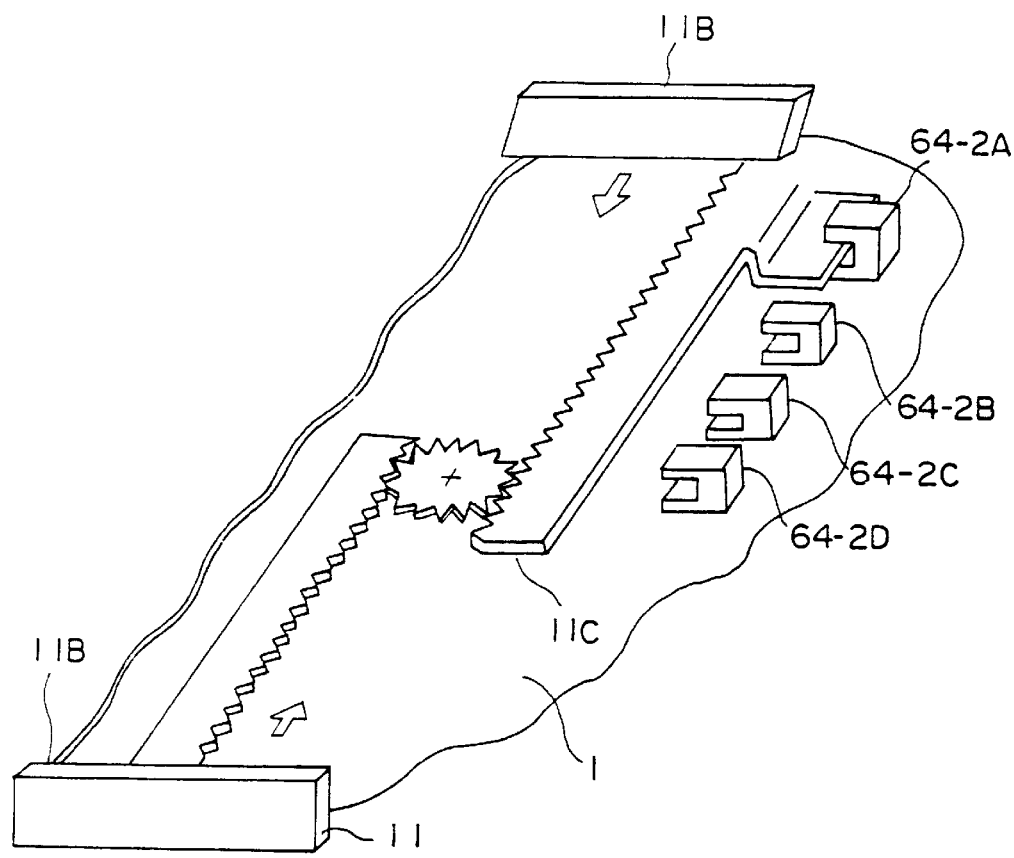
FIG. 47 is a perspective view for explaining the paper width detection.

FIG. 47 is a diagram for explaining a detection of the paper width, and in FIG. 47, those parts which are the same as those corresponding parts in FIG. 17 are designated by the same reference numerals, and a description thereof will be omitted. The paper guides 11B are slidable in the arrow directions in FIG. 47 depending on the size of the document 6, by a guide mechanism 11C which is made up of racks and gears. Paper width sensors 64-2A through 64-2D which are made up of photointerrupters or the like detect a portion of the guide mechanism 11C, so that the paper width of the document 6 can be detected.

Figure 48:
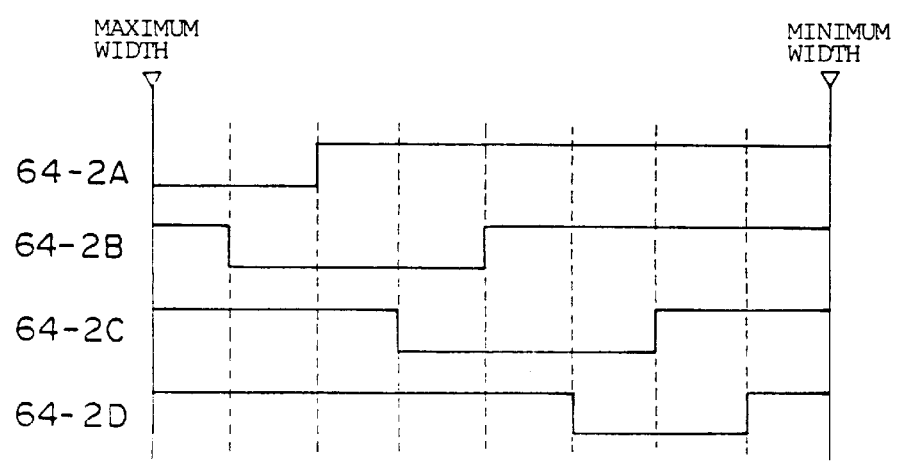
FIG. 48 is a time chart for explaining the output of a paper width sensor.

FIG. 48 is a time chart showing outputs of the paper width sensors 64-2A through 64-2D. In FIG. 48, the left end corresponds to the maximum width of the paper, and the right end corresponds to the minimum width of the paper. The CPU 60 shown in FIG. 41 receives the outputs of the paper width sensors 64-2A through 64-2D via the sensor circuit 62, and detects the paper width of the document 6 being used, based on these outputs. In addition, the CPU 60 controls the moving quantity of the eject member 41 depending on the detected paper width, so that the push-out quantity of the document 6 ejected from the stacker part 5 is kept constant.

Figure 49:
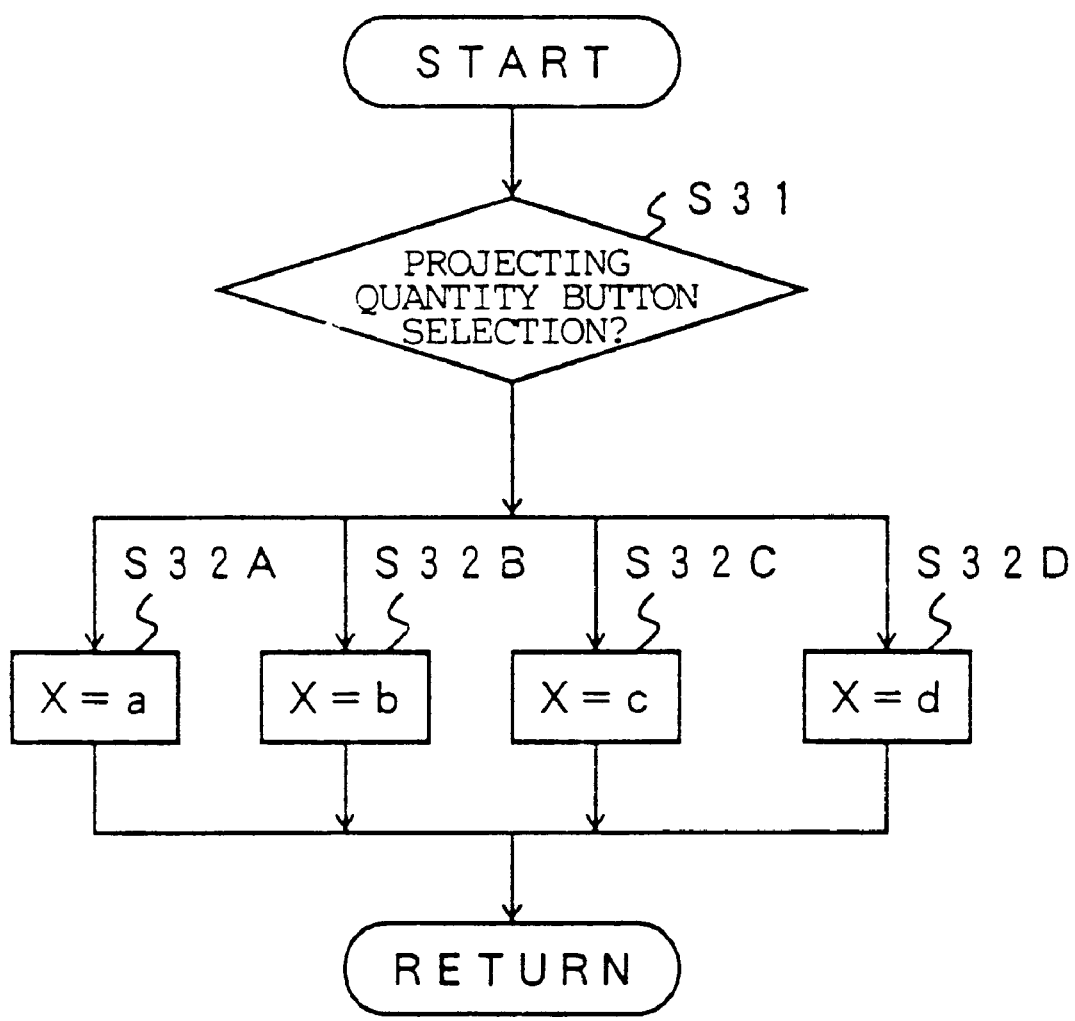
FIG. 49 is a flow chart for explaining a paper projecting quantity setting routine.

FIG. 49 is a flow chart for explaining a paper projecting quantity setting routine. In FIG. 49, a step S31 decides which projecting quantity setting button of the operation panel 61 has been pushed. When a first button is pushed, a step S32A sets a projecting quantity X of the document 6 from the opening 12 to a. When a second button is pushed, a step S32B sets the projecting quantity X of the document 6 from the opening 12 to b. When a third button is pushed, a step S32C sets the projecting quantity X of the document 6 from the opening 12 to c. In addition, when a fourth button is pushed, a step S32D sets the projecting quantity X of the document 6 from the opening 12 to d.

Figure 50:
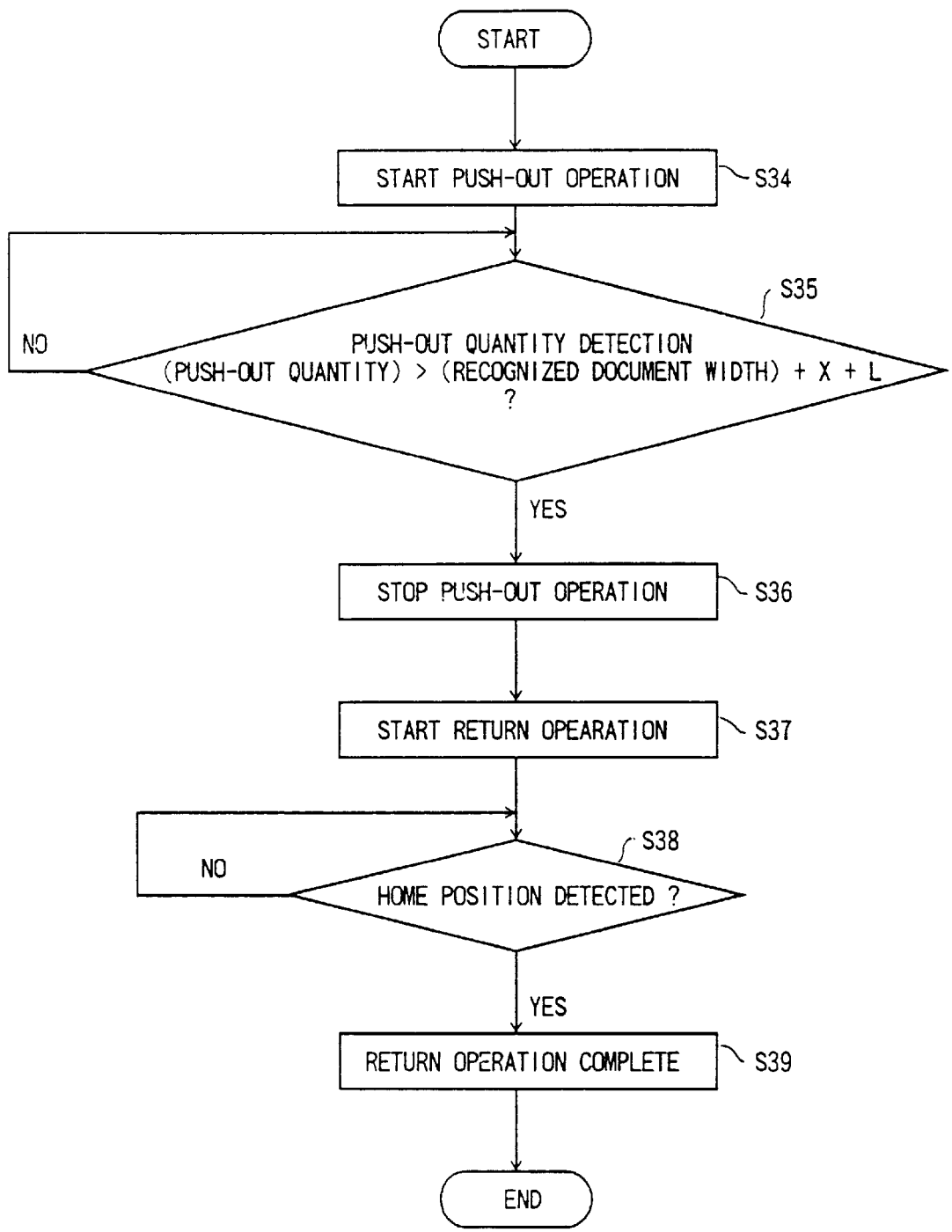
FIG. 50 is a flow chart for explaining a paper push-out operation.
Figure 51:
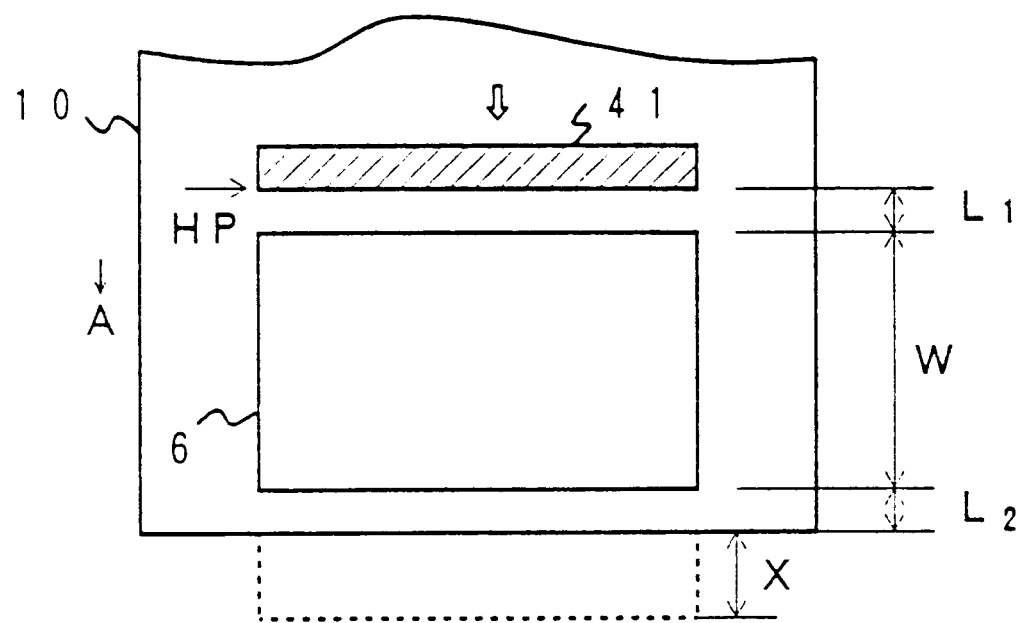
FIG. 51 is a plan view for explaining a document push-out quantity.

FIG. 50 is a flow chart for explaining a paper push-out operation. A step S34 drives and controls the motor 65-1 via the motor driving circuit 63, so as to move the eject member 41 in the direction A from the home position HP shown in FIG. 45 and to start the paper push-out operation. A step S35 detects a push-out quantity M of the document 6 in the direction A from the moving quantity of the eject member 41, and decides whether or not M>(W+X+L). Here, W denotes the paper width, and this is the paper width of the document 6 detected as described above in conjunction with FIGS. 47 and 48. In addition, X denotes the projecting quantity set in the paper projecting quantity setting routine shown in FIG. 49. Furthermore, L denotes a sum (L=L1+L2) of a distance L1 between the upper edge of the document 6 within the stacker part 5 and the elect member 41 located at the home position HP, and a distance L2 between the lower edge of this document 6 and the front of the box shaped case 10 see FIG. 51. The moving quantity of the eject member 41 may be detected from a driving time of the motor 65-1, for example.

When the decision result in the step S35 is YES, a step S36 stops the motor 65-1 via the motor driving circuit 63 to stop the movement of the eject member 41, and the paper push-out operation is stopped. A step S37 carries out the return operation with respect to the eject member 41, similarly to the step S25 shown in FIG. 46, and a step S38 decides whether or not the eject member 41 has returned to the home position HP, similarly to the step S26 shown in FIG. 46. When the decision result in the step S38 is YES, a step S39 completes the above return operation.

Figure 52:
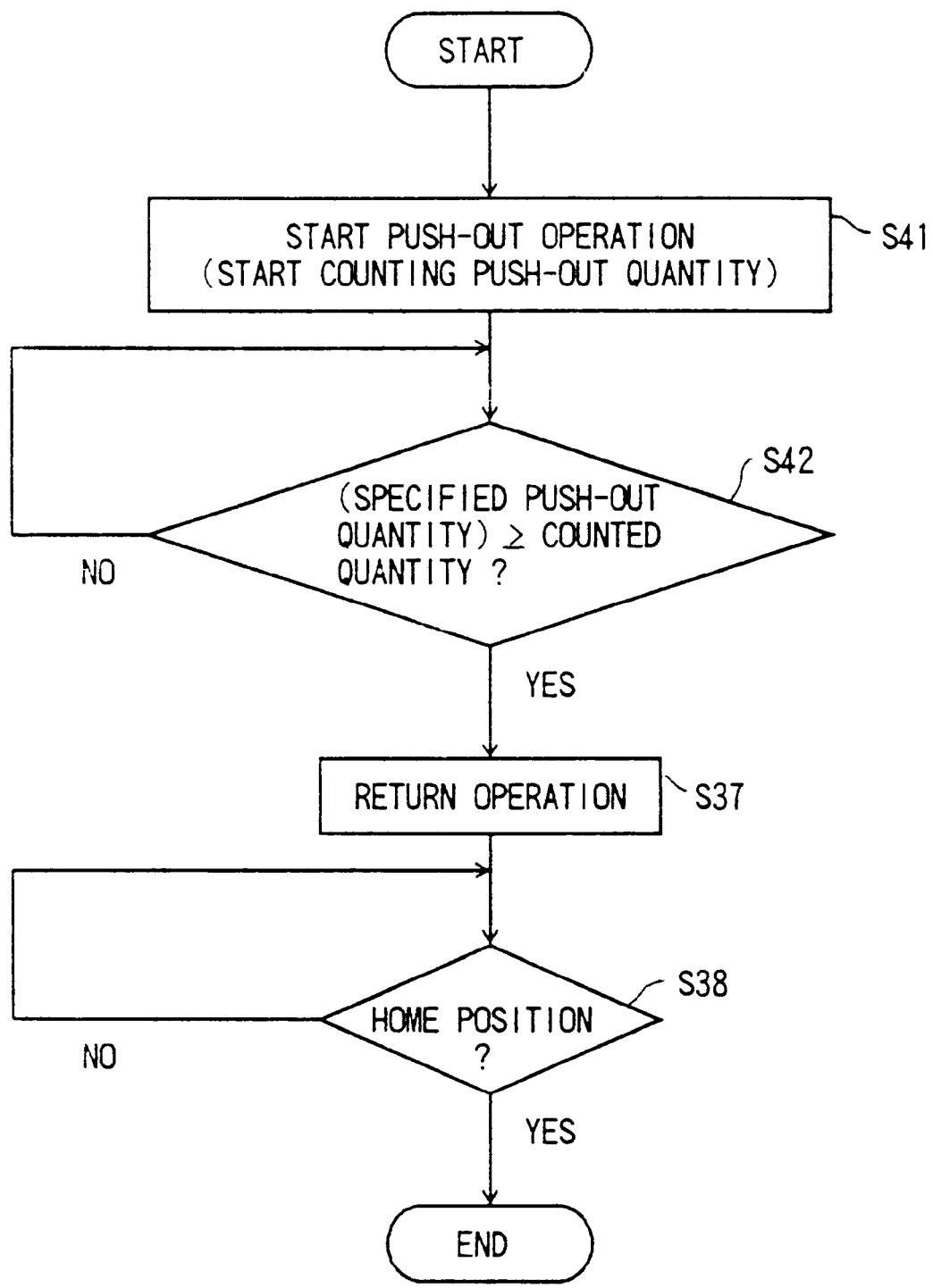
FIG. 52 is a flow chart for explaining a push-out quantity detecting operation.
Figure 53:
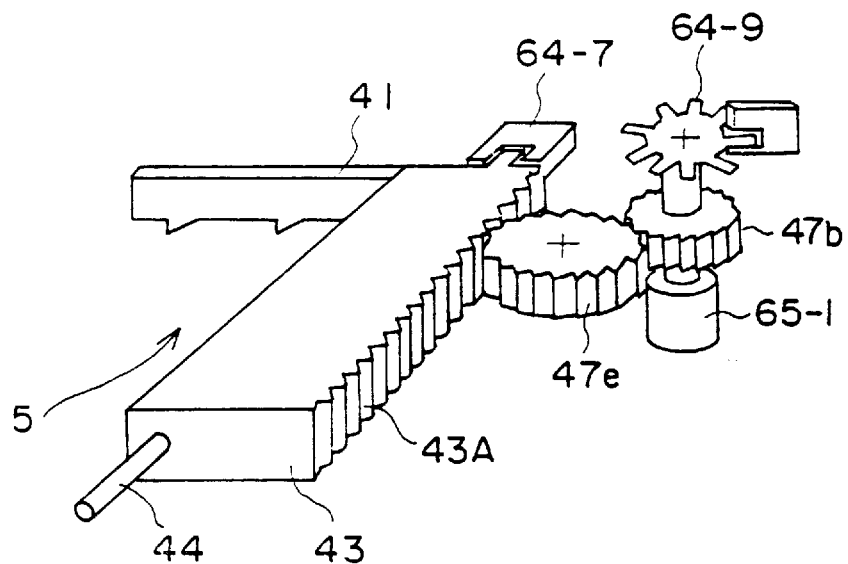
FIG. 53 is a perspective view for explaining the operation of a sensor for detecting the push-out quantity.

Next, a description will be given of an embodiment of an operation of detecting the above push-out quantity M, by referring to FIGS. 52 and 53. FIG. 52 is a flow chart for explaining the operation of detecting the push-out quantity. In addition, FIG. 53 is a diagram for explaining an operation of a sensor 64-9 which is used to detect the push-out quantity M. In FIG. 53, those parts which are the same as those corresponding parts in FIG. 36 are designated by the same reference numerals, and a description thereof will be omitted.

In FIG. 52, a step S41 starts the push-out operation, similarly to the step S34 shown in FIG. 50. The sensor 64-9 shown in FIG. 53 is provided on the shaft of the motor 65-1, and detects the rotation quantity of the motor 65-1. For example, this sensor 64-9 is made up of a photointerrupter (or encoder) which is fixed to the shaft of the motor 65-1, and a photocoupler which outputs a signal having a number of pulses dependent on the rotation quantity of the photointerrupter. Accordingly, when the push-out operation starts, the CPU 60 starts to count the pulses of the output signal of the sensor 64-9. A step S42 decides whether or not the specified push-out quantity M is less than or equal to a predetermined counted value. When the decision result in the step S42 is YES, the eject member 41 has moved the specified push-out quantity M, and the process thus advances to the steps S37 and S38 shown in FIG. 50.

Figure 54:
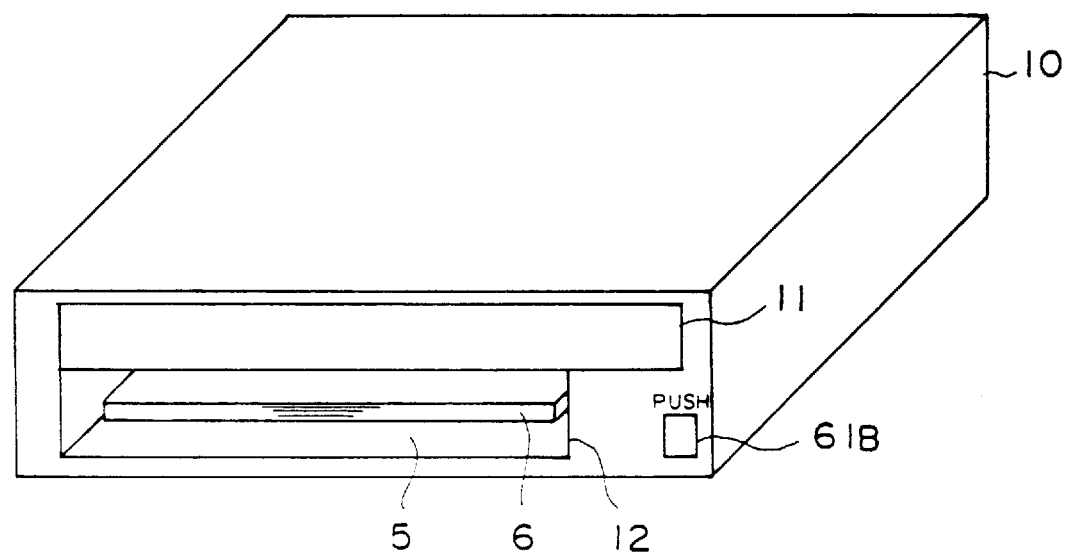
FIG. 54 is a perspective view of the apparatus for explaining the push-out operation responsive to an instruction from an operator.

Next, a description will be given of a push-out operation which is specified by the operator, by referring to FIGS. 54 and 55. FIG. 54 is a perspective view of the fifth embodiment of the apparatus, and shows a push-out button 61B which is provided on the operation panel 61 and is pushed when the operator specifies the push-out operation. In addition, FIG. 55 is a flow chart for explaining the push-out operation specified by the operator.

Figure 55:
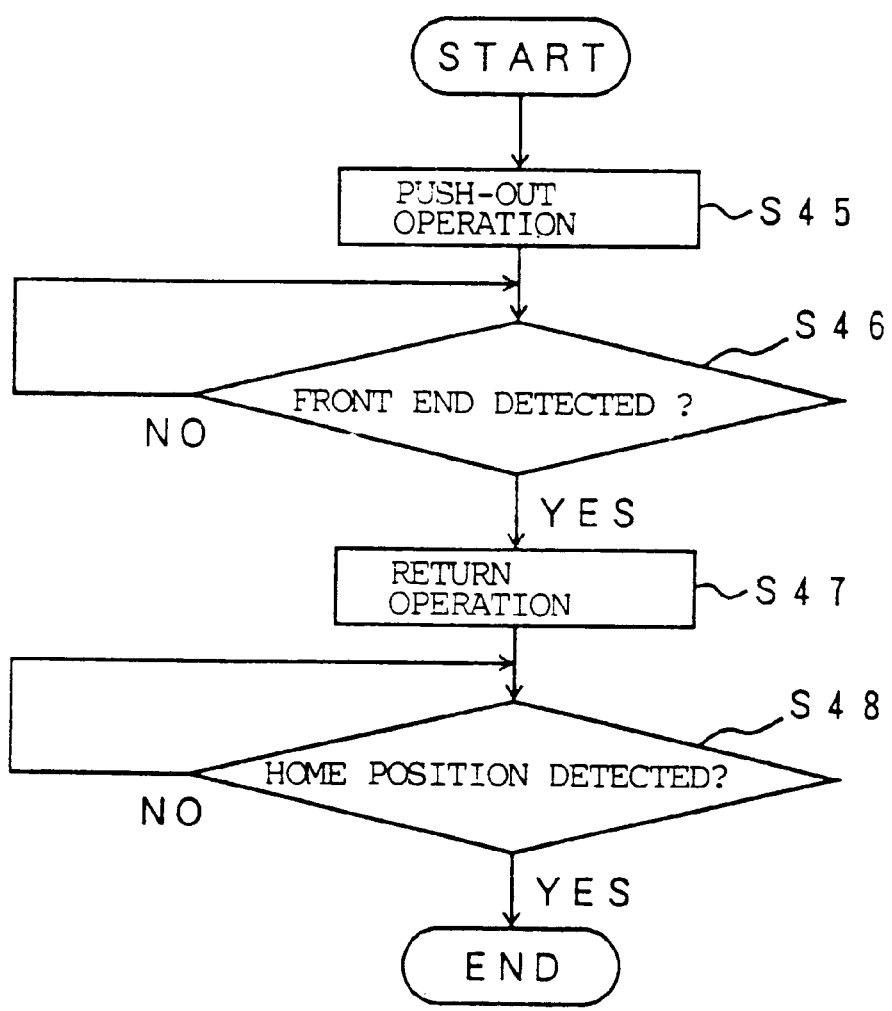
FIG. 55 is a flow chart for explaining the push-out operation responsive to the instruction from the operator.

When the operator pushes the push-out button 61B, a step S45 shown in FIG. 55 starts the push-out operation. A step S46 decides whether or not the eject member 41 has moved to the front end position FP, based on the output signal of the front end sensor 64-8 obtained via the sensor circuit 62. When the decision result in the step S46 is YES, a step S47 starts the return operation. A step S48 decides whether or not the eject member 41 has returned to the home position HP, based on the output signal of the home position sensor 64-7 obtained via the sensor circuit 62. The process ends when the decision result in the step S48 becomes YES.

Figure 56:
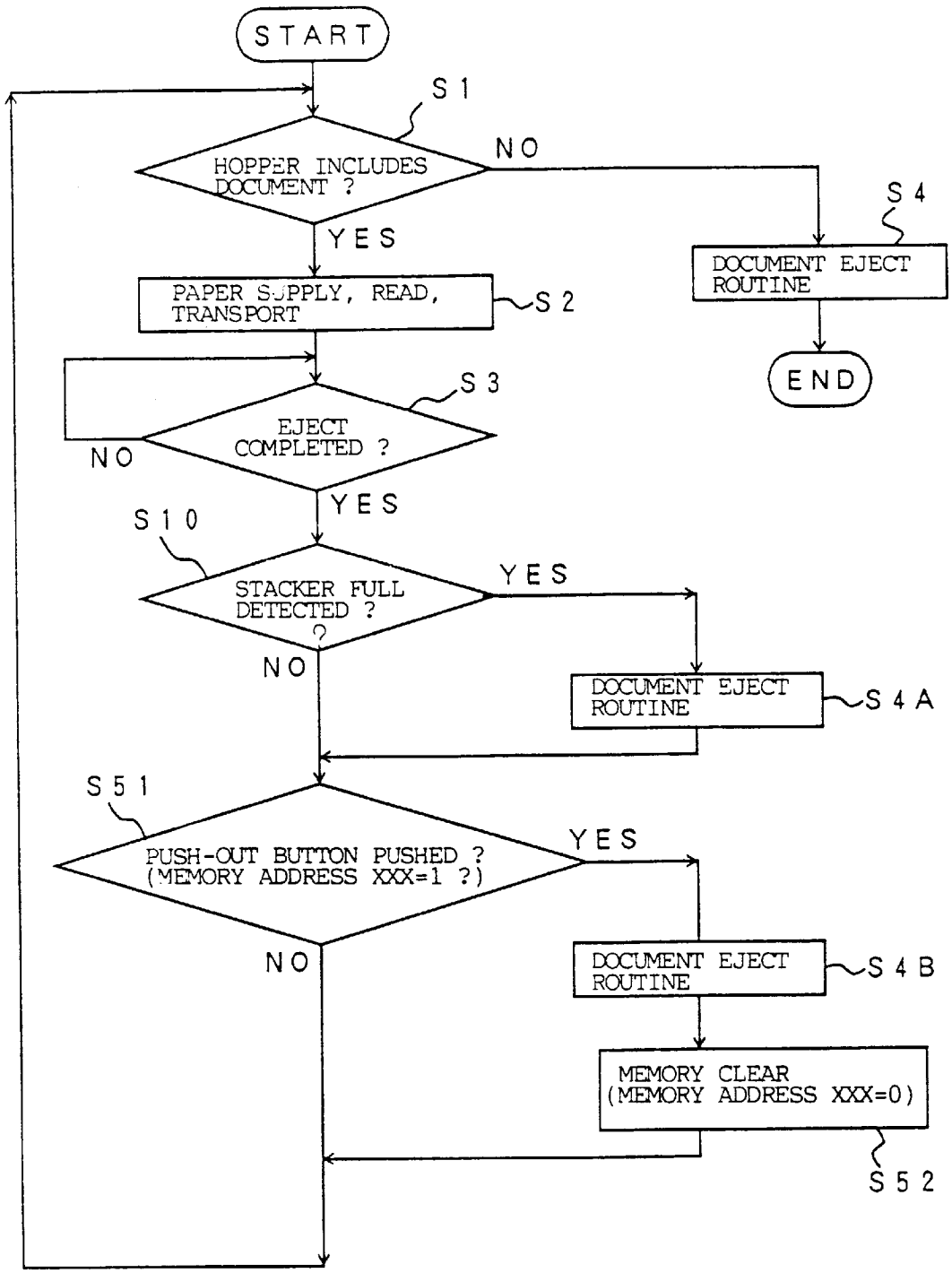
FIG. 56 is a flow chart for explaining an automatic push-out operation.
Figure 57:
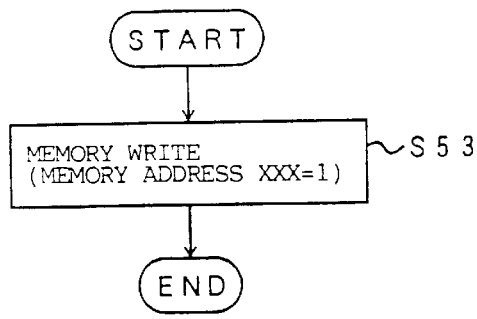
FIG. 57 is a flow chart for explaining an interrupt operation when a push-out button is pushed.

Next, a description will be given of an automatic push-out operation, by referring to flow charts shown in FIGS. 56 and 57. In FIG. 56, those steps which are essentially the same as those corresponding to steps in FIG. 43 are designated by the same reference numerals, and a description thereof will be omitted.

In FIG. 56, when the decision result in the step S3 is YES, the step S10 decides whether or not the amount of documents 6 within the stacker part 5 has exceeded the tolerable amount. When the decision result in the step S10 is YES, a step S4A carries out the same process as the step S4, that is, the eject operation shown in FIG. 43(b). On the other hand, when the decision result in the step S10 is NO or after the step S4A, a step S51 decides whether or not the push-out button 61B has been pushed. As shown in FIG. 57, when the push-out button 61B is pushed, a step S53 sets a memory address XXX of a memory (not shown) of the CPU 60 to "1". Hence, the step S51 can decide whether or not the push-out button 61B has been pushed by deciding whether or not the memory address XXX is "1". When the decision result in the step S51 is NO, the process returns to the step S1.

Figure 43B:
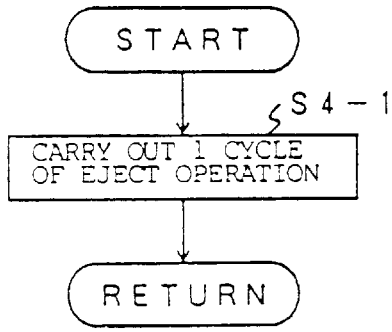

However, when the decision result in the step S51 is YES, a step S4B carries out the same process as the step S4, that is, the eject operation shown in FIG. 43(b). In addition, a step S52 clears the memory address XXX of the CPU 60 to "0". After the step S52, the process returns to the step S1.

Therefore, by the operation shown in FIG. 56, the push-out operation is normally carried out automatically, however, it is also possible to carry out the push-out operation responsive to the instruction from the operator.

Figure 58:
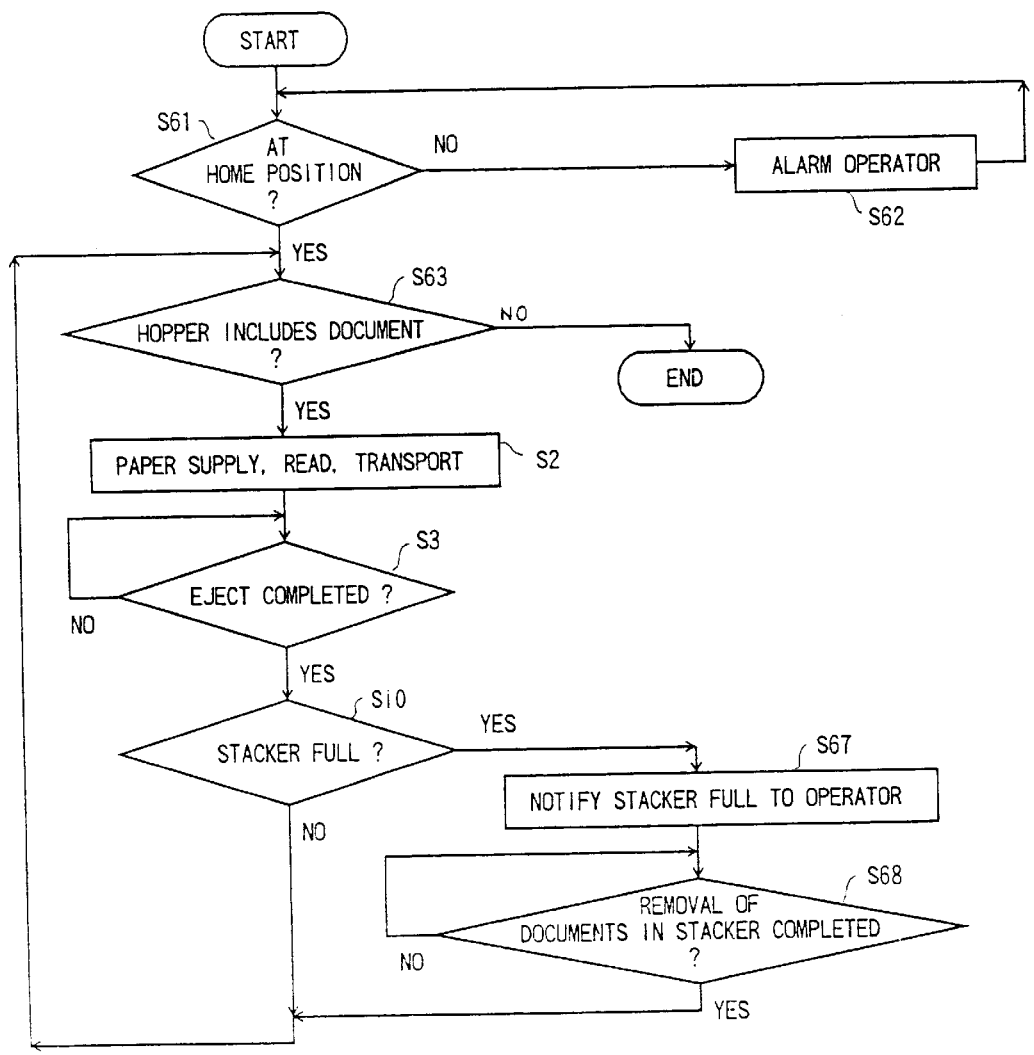
FIG. 58 is a flow chart for explaining an operation when making a manual push-out operation.

Next, a description will be given of the operation of the CPU 60 when the push-out operation is carried out manually as shown in FIGS. 28 and 29, by referring to FIG. 58. In FIG. 58, those steps which are essentially the same as those corresponding steps in FIG. 43 are designated by the same reference numerals, and a description thereof will be omitted.

In FIG. 58, a step S61 decides whether or not the eject member 41 is at the home position HP, based on the output signal of the home position sensor 64-7 obtained via the sensor circuit 62. When the decision result in the step S61 is NO, a step S62 outputs a signal to the operation panel 61 so as to output an alarm to the operator. This alarm may take the form of a display such as turning ON a lamp and the like, sound of a buzzer and the like or, a combination of both. After the step S62, the process returns to the step S61.

On the other hand, when the decision result in the step S61 is YES, a step S63 decides whether or not the document 6 exists within the hopper part 1, based on the output signal of the hopper empty sensor 64-1. When the decision result in the step S63 is NO, the process ends. When the decision result in the step S63 is YES, the steps S2, S3 and S10 are carried out. When the step S10 decides that the amount of documents 6 within the stacker part 5 has exceeded the tolerable amount and the decision result in the step S10 is NO, the process returns to the step S63. However, when the decision result in the step S10 is YES, a step S67 outputs a signal to the operation panel 61, so as to notify the operator that the amount of documents 6 within the stacker part 5 has exceeded the tolerable amount. This notification may be made in the form of a display such as turning ON a lamp and the like, sound of a buzzer and the like or, a combination of both, similarly to the case of the alarm described above. Thereafter, a step S68 decides whether or not the documents 6 ejected from the stacker part 5 have been removed, based on the output signals of the stacker full sensor 64-6 and/or the home position sensor 64-7 and the like. The process returns to the step S63 when the decision result in the step S68 is YES.

In the above described embodiments, the hopper part 1 is provided in the drawer 11. However, the drawer 11 may have a manual structure or a structure which enables switching between the manual and automatic modes. Accordingly, a description will hereunder be given of embodiments of the drawer 11.

Figure 59:
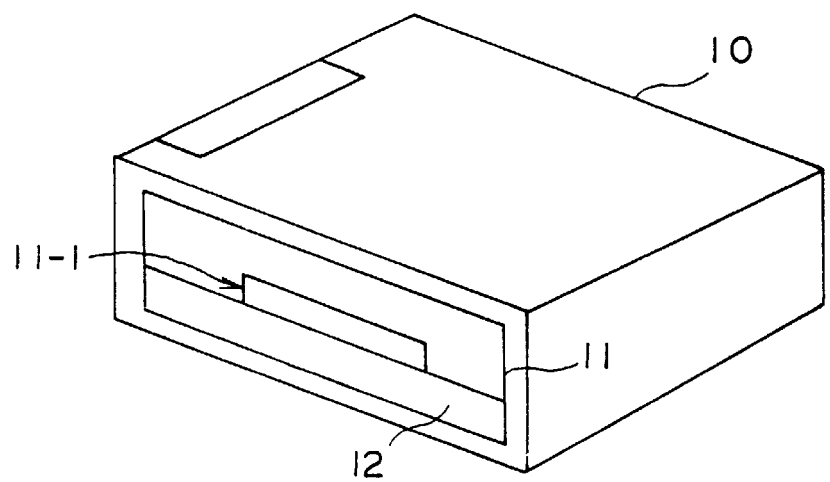
FIG. 59 is a perspective view for explaining a first embodiment of a drawer using a manual system.

FIG. 59 is a perspective view for explaining a first embodiment of the drawer which employs the manual system. As shown in FIG. 59, a handle 11-1 is provided on the drawer 11 at the front of the apparatus.

Figure 60:
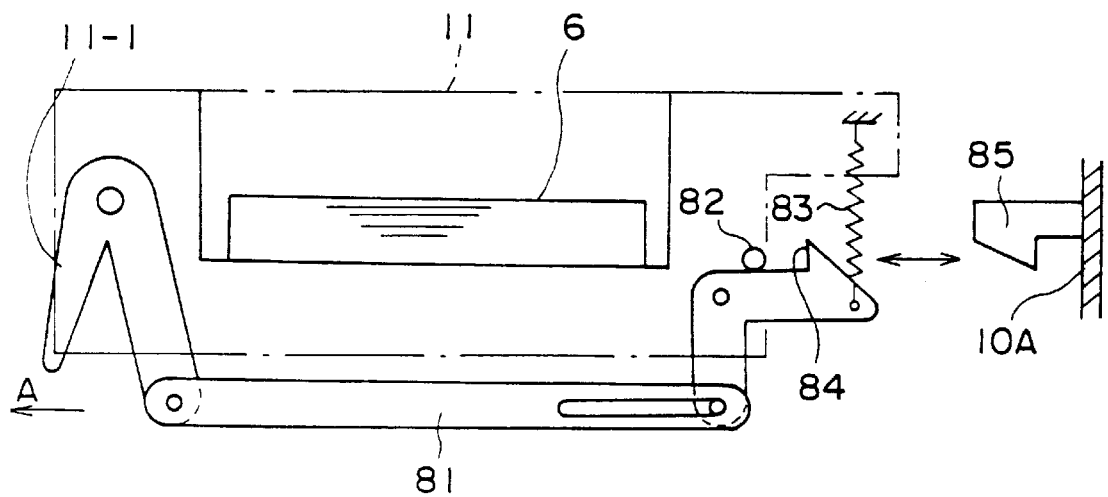
FIG. 60 is a cross sectional view showing an important part of the first embodiment of the drawer using the manual system.

FIG. 60 shows an important part of the first embodiment of the drawer employing the manual system. A mechanism includes a link 81, a stopper 82, a spring 83, engaging parts 84 and 85 and the like which are linked as shown, and the handle 11-1 is linked to this mechanism. In a state where the drawer 11 is closed, the engaging part 84 of the drawer 11 engages the engaging part 85 which is fixed to the chassis 10A, and the drawer will not move in the direction A unless the handle 11-1 is pulled in the direction A. When the handle 11-1 is pulled in the direction A, the engaging part 84 moves downwards in FIG. 60 against the action of the spring 83, thereby disengaging the engaging parts 84 and 85 and making the drawer 11 slidable in the direction A.

Figure 61:
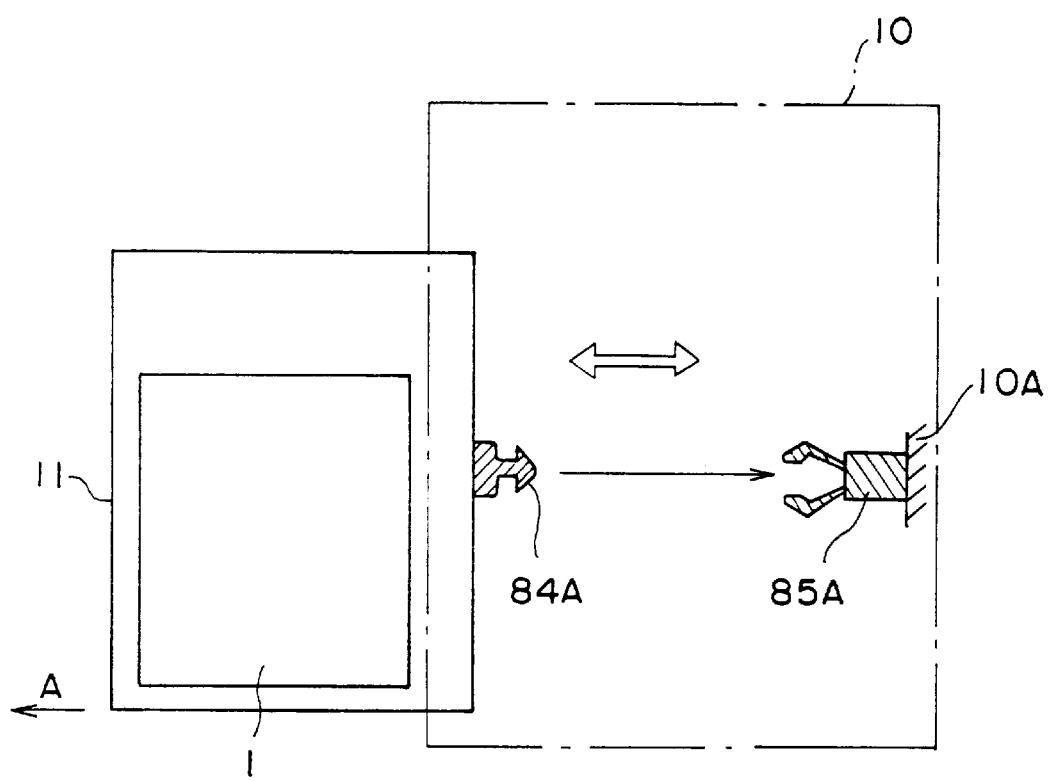
FIG. 61 is a plan view showing an important part of a second embodiment of the drawer using the manual system.

FIG. 61 shows an important part of a second embodiment of the drawer employing the manual system. In this embodiment, no handle or the like is provided on the drawer 11. A striker 84A is fixed to the rear of the drawer 11. A push-latch mechanism 85A is provided on the chassis 10A at a position corresponding to the striker 84A. Hence, when the drawer 11 is pushed in the direction opposite to the direction A, the striker 84A is locked by the push-latch mechanism 85A, and the drawer 11 is locked to the closed state. In this state, when the drawer 11 is pushed again in the direction opposite to the direction A, the push-latch mechanism 85A releases the striker 84A, and it becomes possible to manually slide and open the drawer 11 in the direction A.

Figure 62:
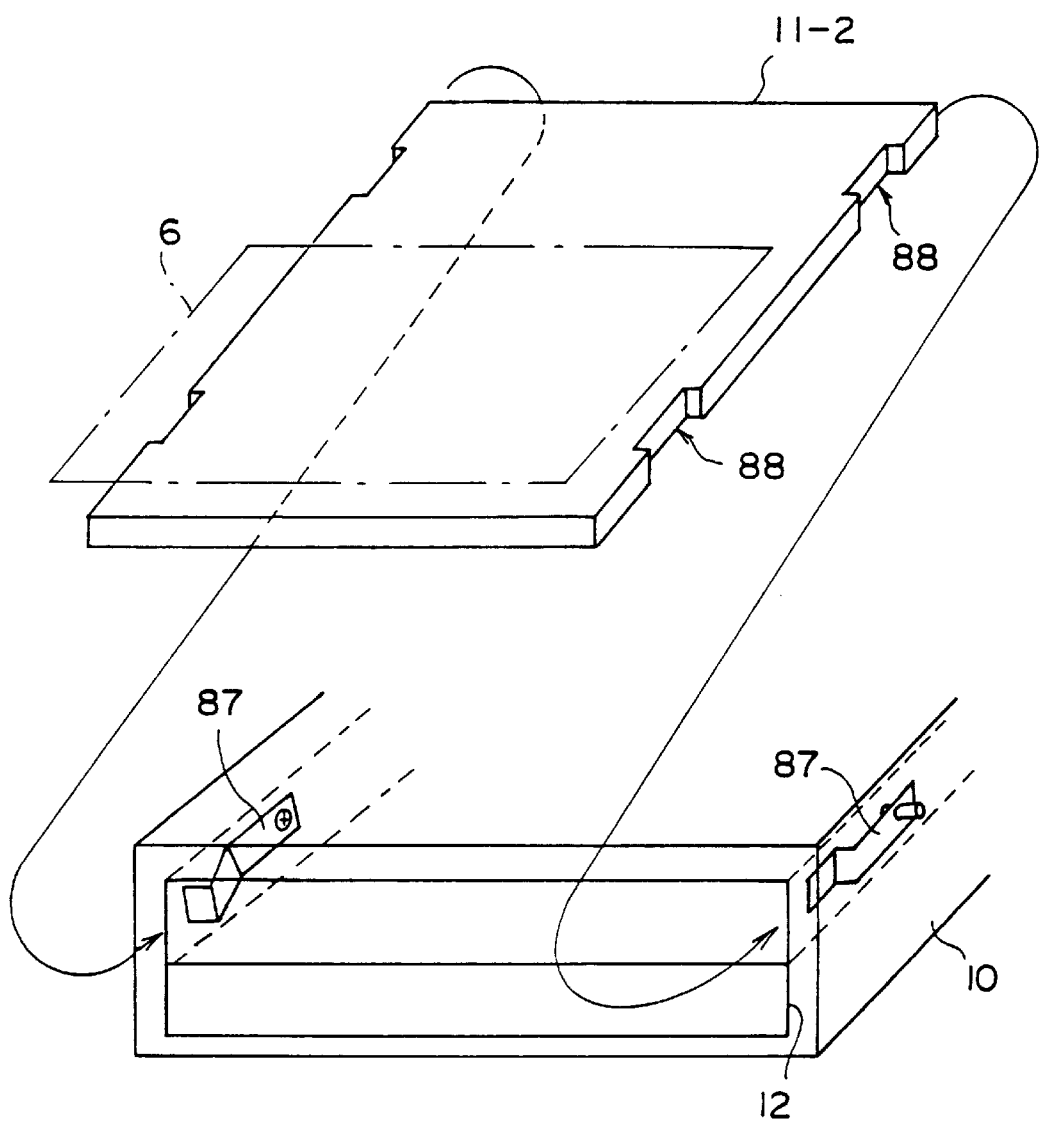
FIG. 62 is a partially disassembled perspective view for explaining a third embodiment of the drawer using the manual system.

FIG. 62 is a partially disassembled perspective view for explaining a third embodiment of the drawer employing the manual system. In this embodiment, only a base 11-2 of the drawer 11 is shown for the sake of convenience, and the illustration of other parts of the drawer 11 is omitted. A pair of recesses 88 is formed on each side surface of the base 11-2. On the other hand, leaf springs 87 are provided on each inner side surface of the box shaped case 10. The height position of the leaf springs 87 matches the height position of the recesses 88 of the base 11-2. Accordingly, when opening and closing the drawer 11, the drawer 11 is provisionally locked at the positions of the recesses 88. In other words, since the drawer 11 is provisionally locked at the two positions, namely, the open state and the closed state, it is possible to prevent unexpected movement of the drawer 11. Next, embodiments of the drawer employing the automatic system will be described.

Figure 63:
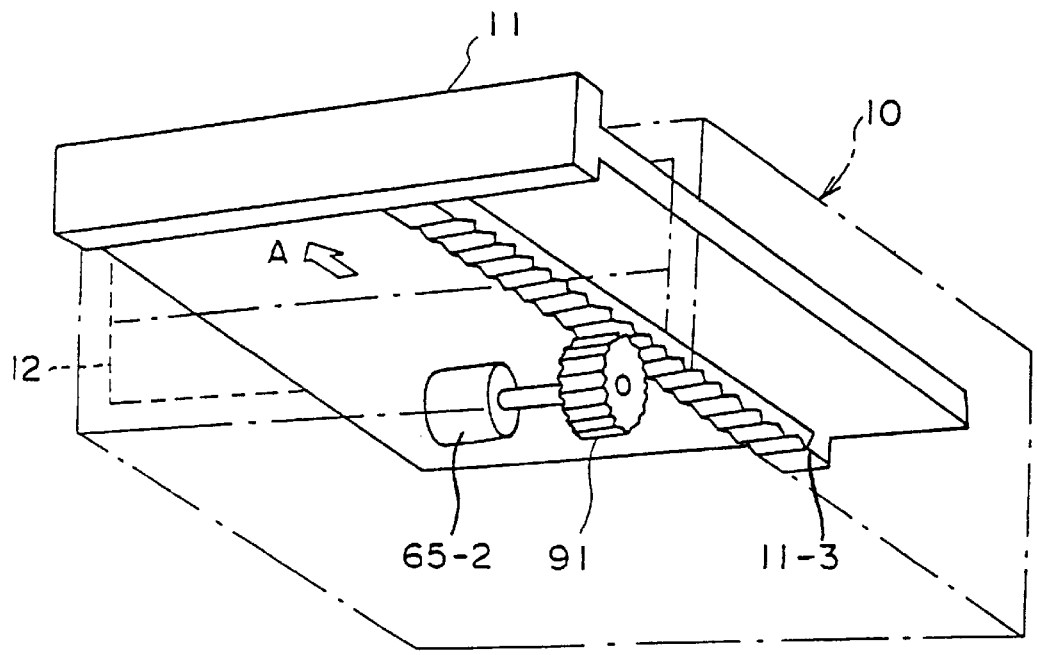
FIG. 63 is a perspective view showing an important part of a first embodiment of a drawer using an automatic system.

FIG. 63 shows an important part of a first embodiment of the drawer employing the automatic system. In this embodiment, a motor 65-2 drives a rack 11-3 of the drawer 11 via a pinion 91. This motor 65-2 is also driven and controlled by the CPU 60 shown in FIG. 41 via the motor driving circuit 63. The position where the rack 11-1 is provided on the drawer 11 and the shape of the rack 11-3 itself are of course not limited to those shown in FIG. 63.

Figure 64:
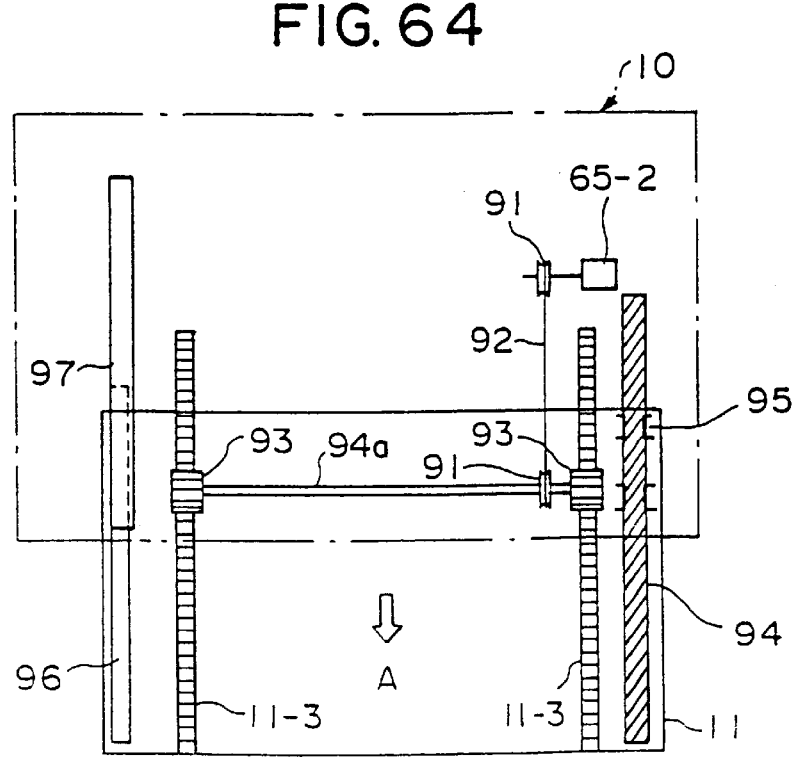
FIG. 64 is a plan view showing an important part of a second embodiment of the drawer using the automatic system.
Figure 65:
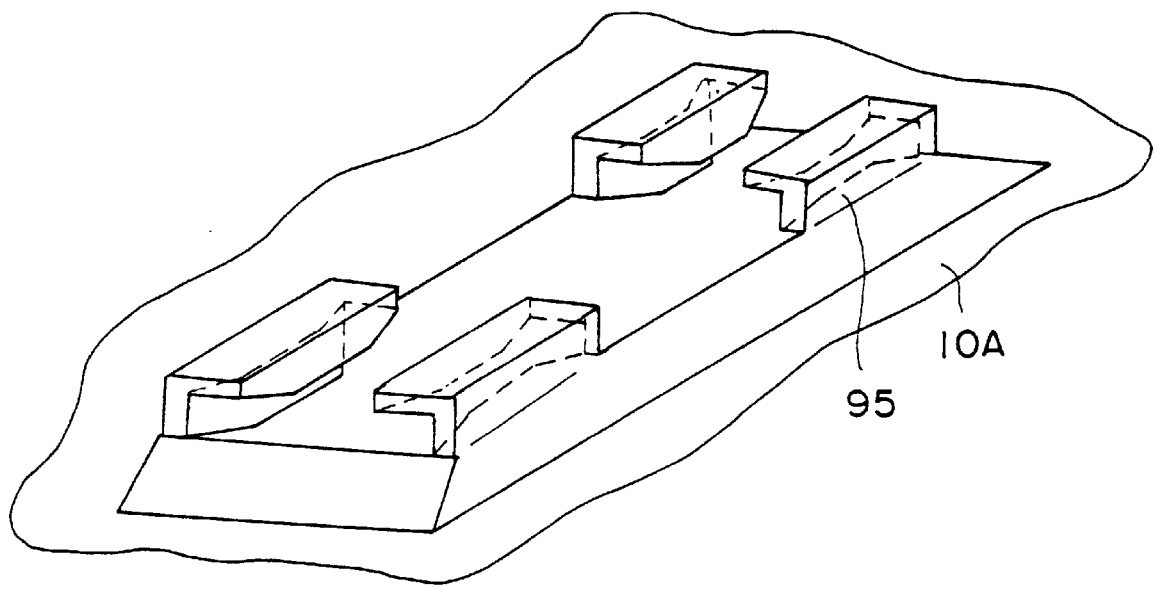
FIG. 65 is a perspective view showing an important part of a drawer guide mechanism.
Figure 66:
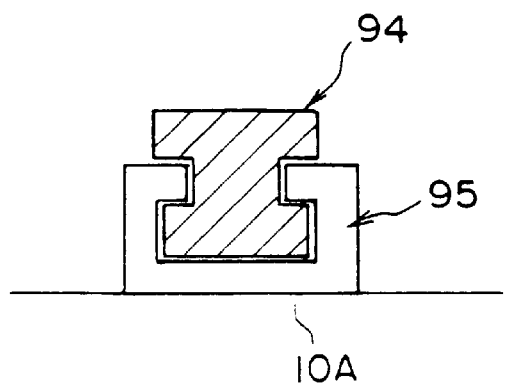
FIG. 66 is a cross sectional view showing an important part of the drawer guide mechanism.

FIG. 64 shows an important part of a second embodiment of the drawer employing the automatic system. In this embodiment, rails 94 and 96 are provided on the drawer 11. In addition, a pair of racks 11-3 is formed on the inside of the rails 94 and 96. The rail 94 is guided by a guide part 95 shown in FIG. 65 which is provided on the chassis 10A. FIG. 66 is a cross sectional view from an arrow direction in FIG. 65, showing the positional relationship of the rail 94 and the guide part 95. On the other hand, the rail 96 is stably guided by a ball slide bearing 97 provided on the chassis 10A. The ball slide bearing 97 can guide the rail 96 with a higher precision compared to the guide part 95. Of course, the guide mechanisms for the drawer 11 are not limited to such, and the same guide mechanism may be provided on both sides of the drawer 11.

The motor 65-2 rotates one pulley 91, and rotates another pulley 91 via a belt 92. This other pulley 91 and pinions 93 are is fixed to a shaft 94a, and thus, both the pinions 93 are rotated by the rotation of this other pulley 91. Hence, the drawer 11 is driven via this other pulley 91, the pinions 93 and the racks 11-3.

Figure 67:
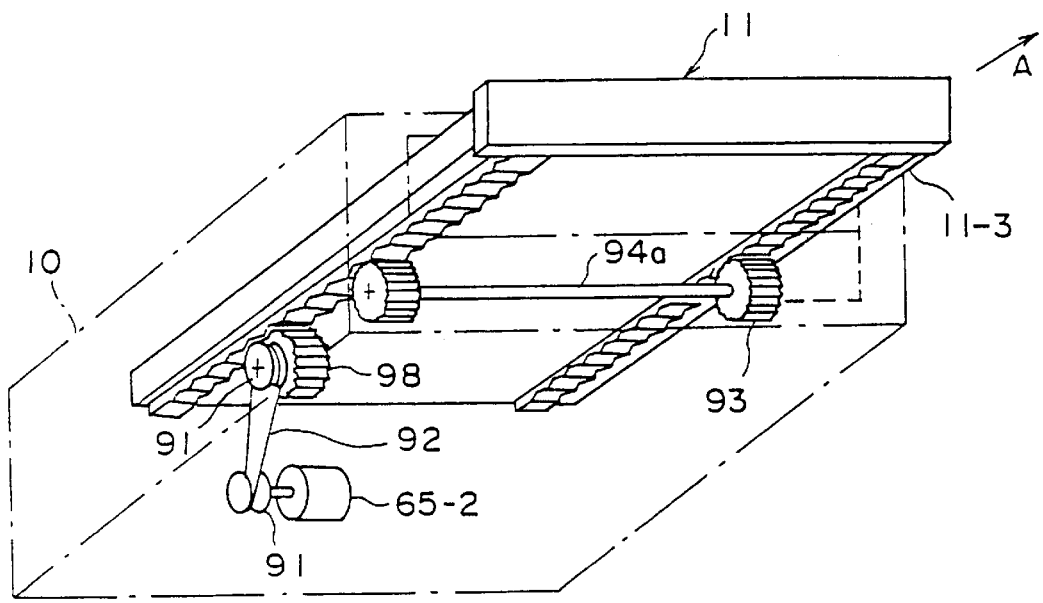
FIG. 67 is a perspective view from the bottom showing an important part of a third embodiment of the drawer using the automatic system.

FIG. 67 shows an important part of a third embodiment of the drawer employing the automatic system. In FIG. 67, those parts which are the same as those corresponding parts in FIG. 64 are designated by the same reference numerals, and a description thereof will be omitted. In this embodiment, the racks 11-3 and the pinions 93 also function as the guide mechanism for the drawer 11. In addition, the pulley 91 directly drives a pinion 98 which meshes one of the racks 11-3, instead of the shaft 94.

Figure 68:
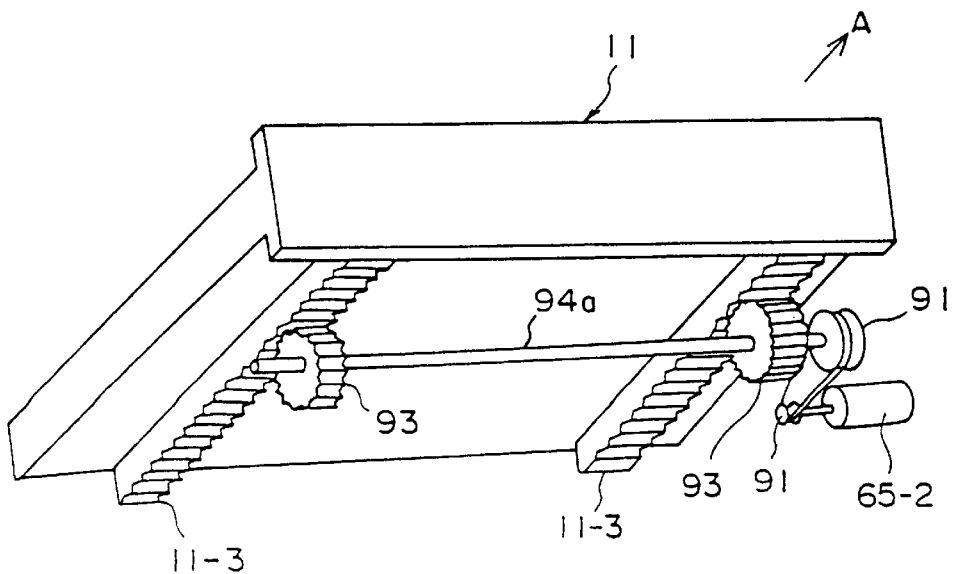
FIG. 68 is a perspective view from the bottom showing an important part of a fourth embodiment of the drawer using the automatic system.

FIG. 68 shows an important part of a fourth embodiment of the drawer employing the automatic system. In FIG. 68, those parts which are the same as those corresponding parts in FIG. 64 are designated by the same reference numerals, and a description thereof will be omitted. In FIG. 64, the pulleys 91 are provided between the pair of pinions 93. However, in this embodiment, the pulley 91 is provided on the outside of one of the pinions 93.

In FIGS. 64, 67 and 68, the pulleys 91 and the belt 92 may of course function as a reduction system for reducing the rotation of the motor 65-2.

Figure 69:
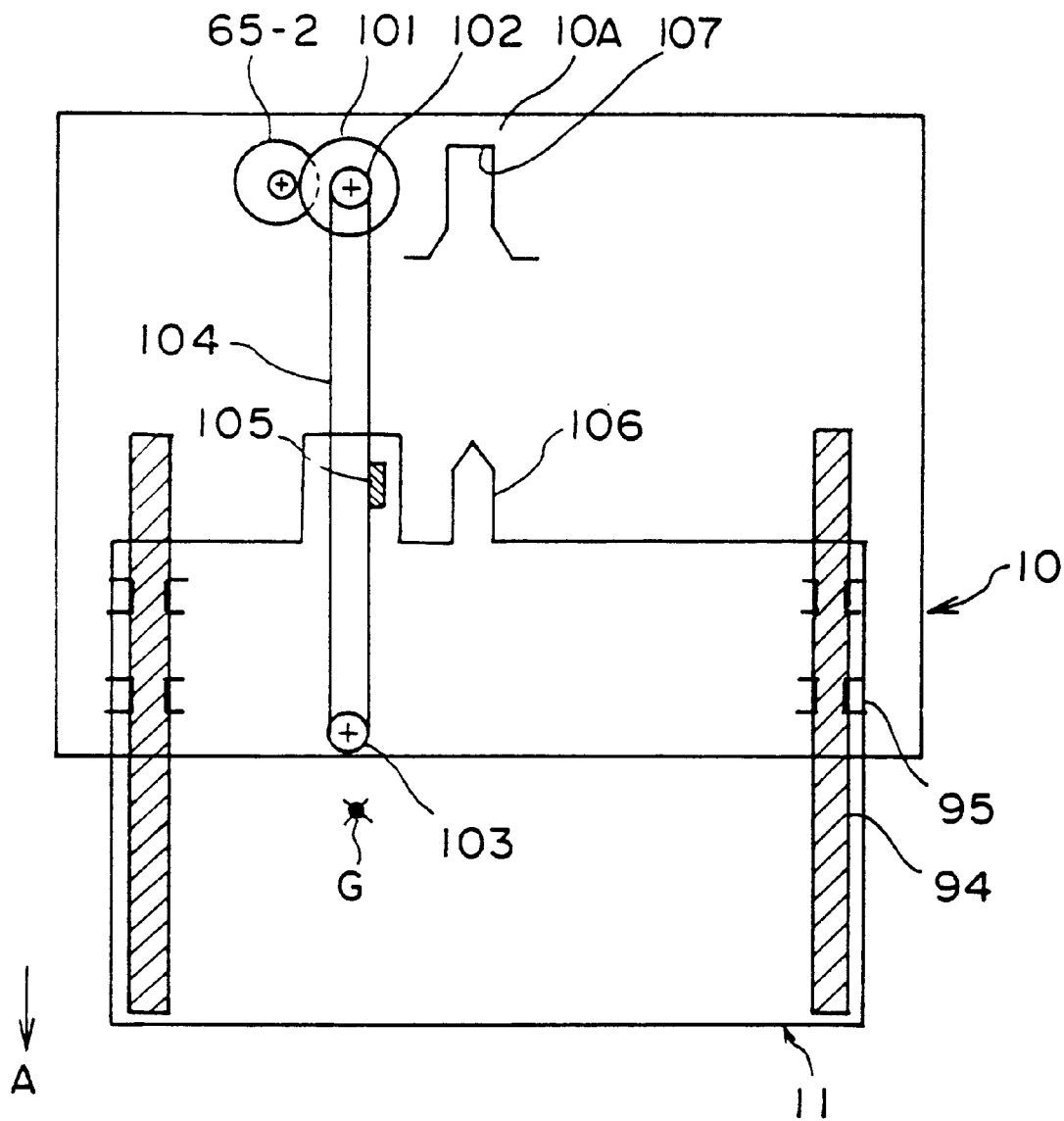
FIG. 69 is a plan view showing an important part of a fifth embodiment of the drawer using the automatic system.

FIG. 69 shows an important part of a fifth embodiment of the drawer employing the automatic system. In FIG. 69, those parts which are the same as those corresponding parts in FIG. 64 are designated by the same reference numerals, and a description thereof will be omitted. In FIG. 69, a direct belt driving system is employed instead of the rack-and-pinion driving system. In other words, the motor 65-2 rotates and drives one pulley 102 via a reduction gear 101. A belt 104 is provided across this pulley 102 and another pulley 103, and the rotation of the motor 65-2 is converted into the movement of the belt 104. A predetermined part 105 of this belt 104 is fixed to the drawer 11, so that the drawer 11 opens and closes when the belt 104 moves. A center of gravity G of the drawer 11 is located on an extension of the driving system using this belt 104, and for this reason, it is possible to stably and smoothly drive the drawer 11.

A projecting part 106 is provided on the rear of the drawer 11. An engaging part 107 is provided on the chassis 10A at a position corresponding to the projecting part 106. Hence, when the drawer 11 is closed, the projecting part 106 engages the engaging part 107, and the drawer 11 is positioned in the closed state. In addition, the rails 94 and the guide parts 95 are respectively provided on the right and left sides of the drawer 11.

Figure 70:
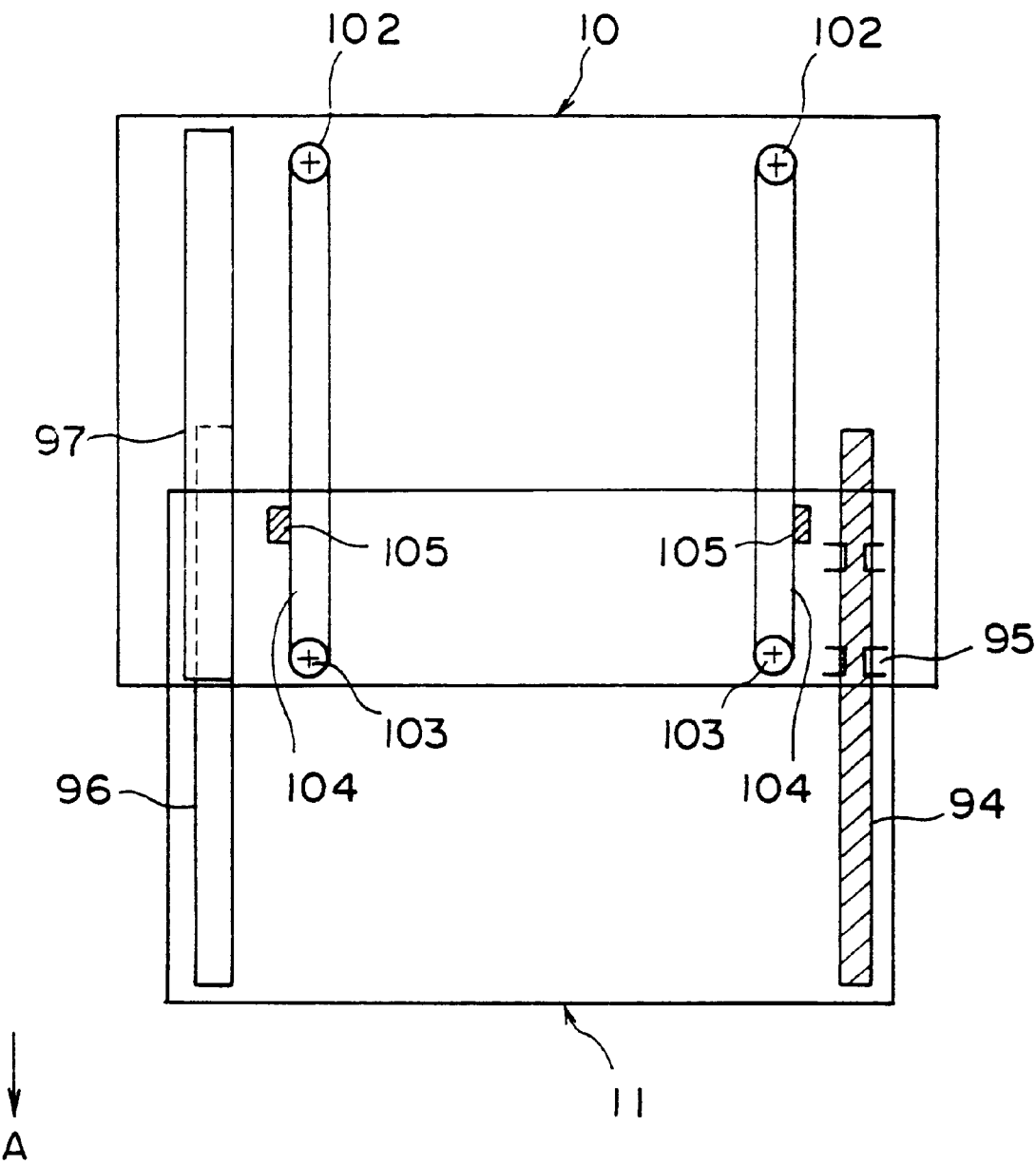
FIG. 70 is a plan view showing an important part of a sixth embodiment of the drawer using the automatic system.

FIG. 70 shows an important part of a sixth embodiment of the drawer employing the automatic system. In FIG. 70, those parts which are the same as those corresponding parts in FIGS. 64 and 69 are designated by the same reference numerals, and a description thereof will be omitted. In FIG. 70, two driving systems employing the belt 104 are provided. In addition, the rail 94 is guided by the guide part 95, and the other rail 96 is guided by the ball slide bearing 97. Each pulley 102 is driven by the motor 65-2 as in the case of the above described embodiments, but the illustration thereof will be omitted.

Figure 71:
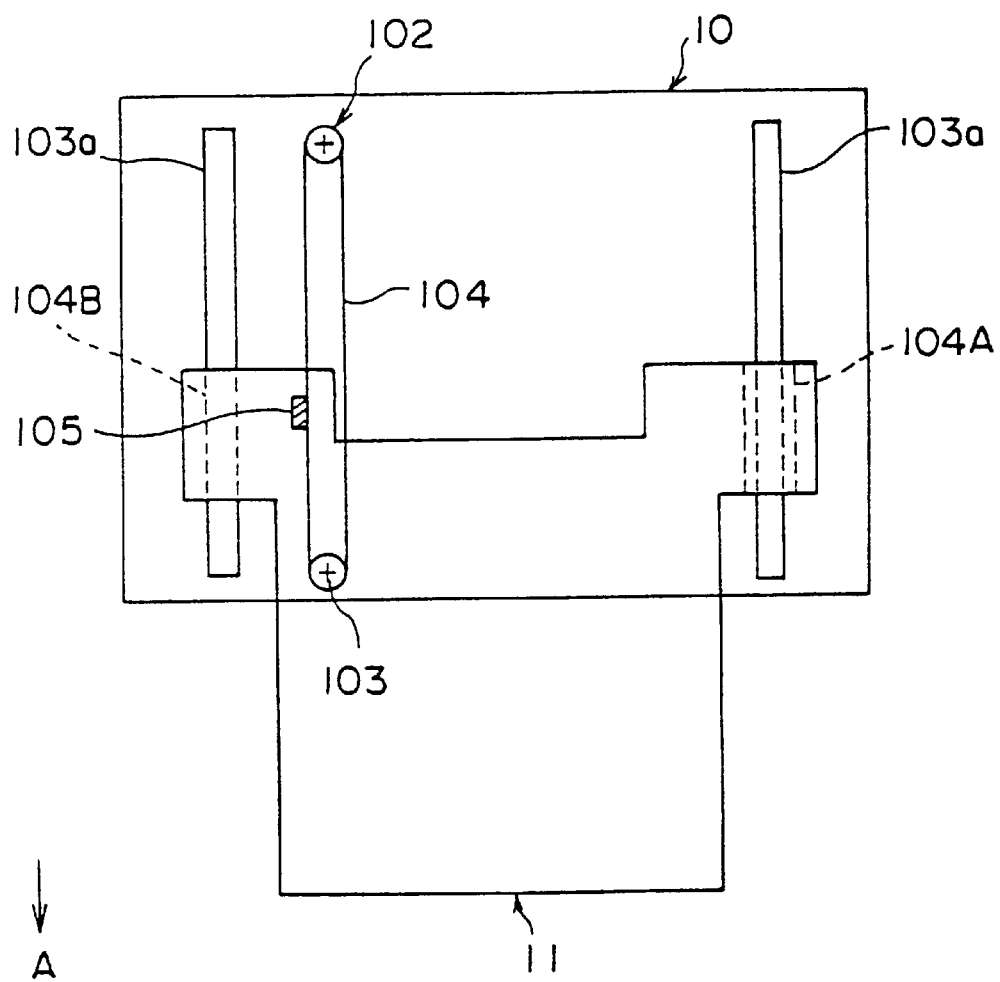
FIG. 71 is a plan view showing an important part of a seventh embodiment of the drawer using the automatic system.

FIG. 71 shows an important part of a seventh embodiment of the drawer employing the automatic system. In FIG. 71, those parts which are the same as those corresponding parts in FIG. 69 are designated by the same reference numerals, and a description thereof will be omitted. In FIG. 71, one driving system using the belt 104 is provided on the left side of the drawer 11. The drawer 11 has a pair of guide bearings 104A and 104B, and these guide bearings 104A and 104B are guided by guide shafts 103a. For example, the guide bearing 104B has a bearing hole with a circular cross section, and is guided along the guide shaft 103a with a high positional accuracy. On the other hand, the guide bearing 104A has a bearing hole with an oval cross section, and is guided along the guide shaft 103a with a positional accuracy which is not as high. The pulleys 102 are driven by the motor 65-2 as in the case of the above described embodiments, but the illustration thereof will be omitted.

Figure 72:
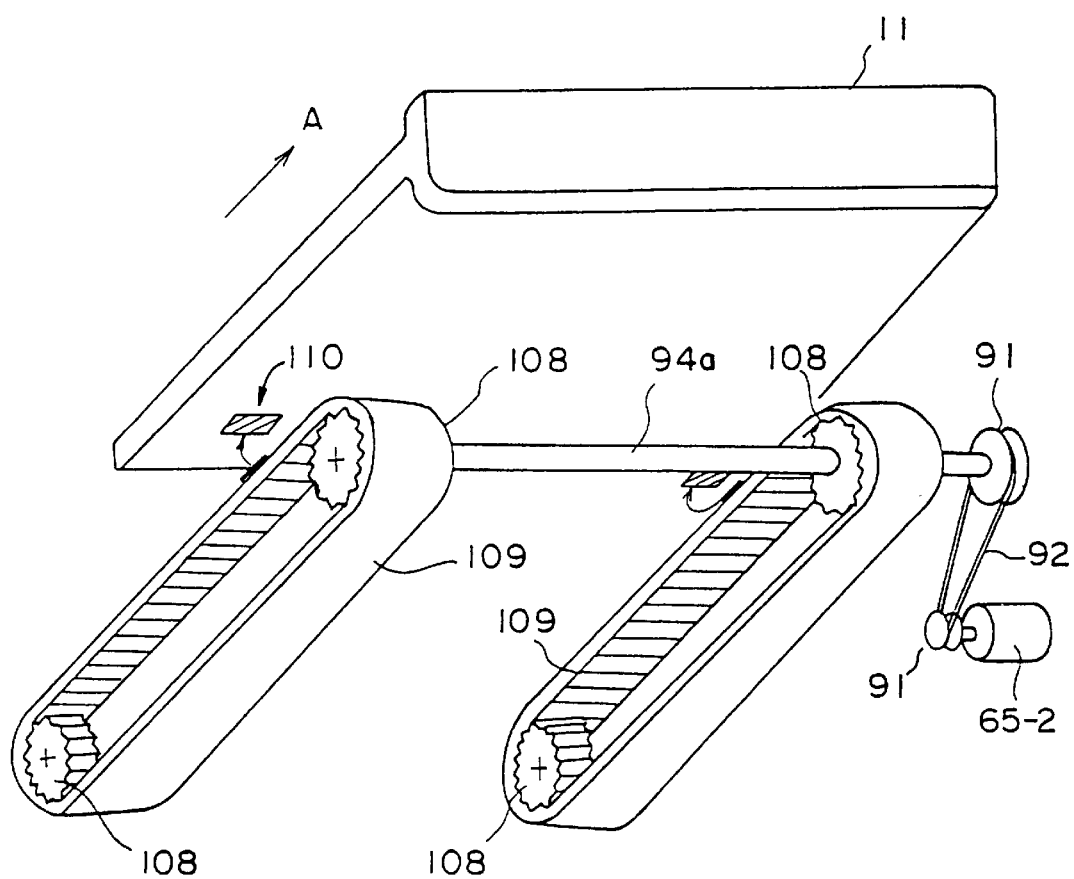
FIG. 72 is a perspective view from the bottom showing an important part of an eighth embodiment of the drawer using the automatic system.

FIG. 72 shows an important part of an eighth embodiment of the drawer employing the automatic system. In FIG. 72, those parts which are the same as those corresponding parts in FIG. 64 are designated by the same reference numerals, and a description thereof will be omitted. In FIG. 72, a pair of timing pulleys 108 is fixed to the shaft 94a, and one corresponding second pulley 108 is provided with respect to each first pulley 108. A timing belt 109 is provided across each pair of corresponding pulleys 108. Furthermore, the drawer 11 is fixed to a predetermined position 110 on each timing belt 109. Hence, the motor 65-2 drives the drawer 11 via the pulleys 91, the belt 92, the pulleys 108 and the timing belts 109.

Figure 73:
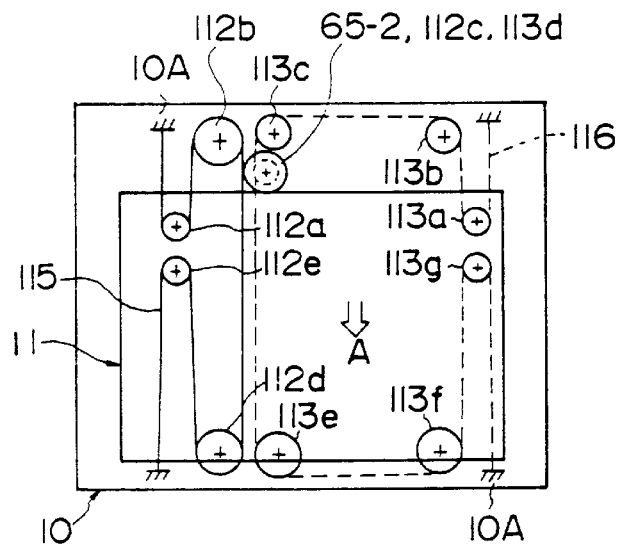
FIG. 73 is a plan view showing an important part of a ninth embodiment of the drawer using the automatic system.

FIG. 73 shows an important part of a ninth embodiment of the drawer employing the automatic system. In FIG. 73, those parts which are the same as those corresponding parts in FIG. 64 are designated by the same reference numerals, and a description thereof will be omitted. In FIG. 73, a first belt 115 indicated by a solid line is wound around pulleys 112a through 112e. One end of this first belt 115 is fixed to the chassis 10A at the rear of the box shaped case 10, and the other end is fixed to the chassis 10A at the front of the box shaped case 10. A second belt 116 indicated by a dotted line is wound around pulleys 113a through 113g. One end of this second belt 116 is fixed to the chassis 10A at the rear of the box shaped case 10, and the other end is fixed to the chassis 10A at the front of the box shaped case 10.

Figure 74:
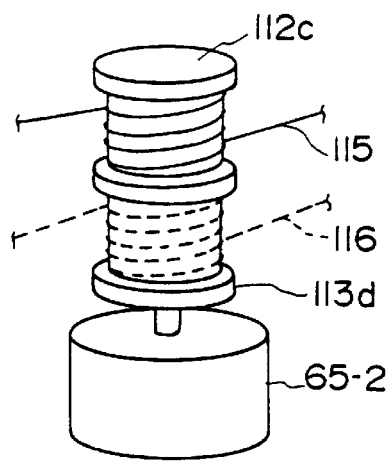
FIG. 74 is a perspective view showing a motor peripheral part of the ninth embodiment of the drawer.
Figure 75:
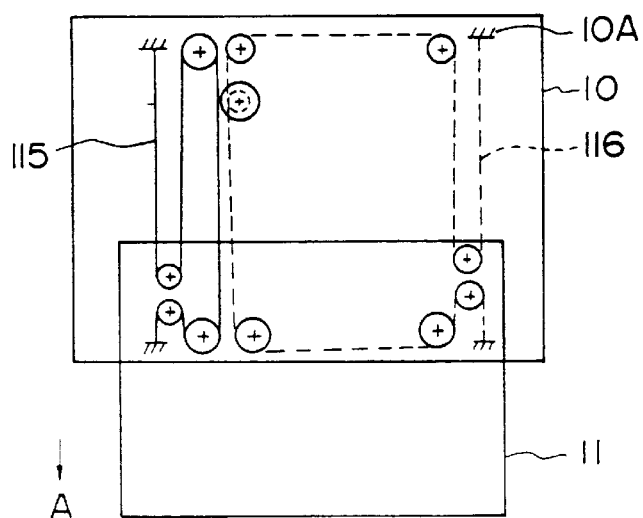
FIG. 75 is a plan view showing an important part of the ninth embodiment of the drawer in an open state.

FIG. 74 shows a motor peripheral part of the ninth embodiment of the drawer. As shown in FIG. 74, the shaft of the motor 65-2, the pulley 112c and the pulley 113d are provided coaxially, and the pulley 112c and the pulley 113d rotate integrally with the motor 65-2. Hence, when the motor 65-2 rotates clockwise in FIG. 73, the drawer 11 moves in the direction A and assumes the open state shown in FIG. 75.

Next, the opening and closing operation of the drawer 11 will be described.

Figure 76:
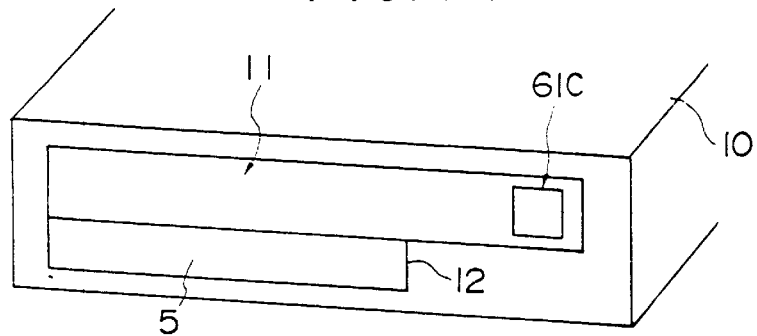
FIG. 76 is a perspective view showing the position of a drawer open/close button.
Figure 77:
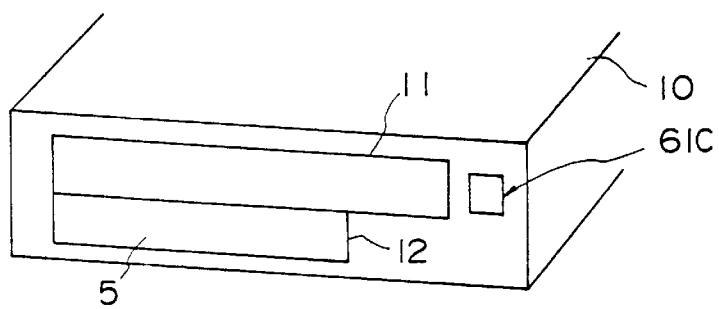
FIG. 77 is a perspective view showing the position of the drawer open/close button.

FIGS. 76 and 77 respectively show the position of a drawer open/close button. In FIG. 76, a drawer open/close button 61C is provided on the drawer 11 at the front of the apparatus. In FIG. 77, the drawer open/close button 61C is provided on the front of the box shaped case 10 beside the drawer 11, that is, on the operation panel 61. In these figures, the drawer open/close button 61C is a single button. However, it is of course possible to provide two buttons, one for opening and one for closing the drawer 11. In addition, the position of the drawer open/close button 61C is not limited to those shown in these figures.

Figure 78:
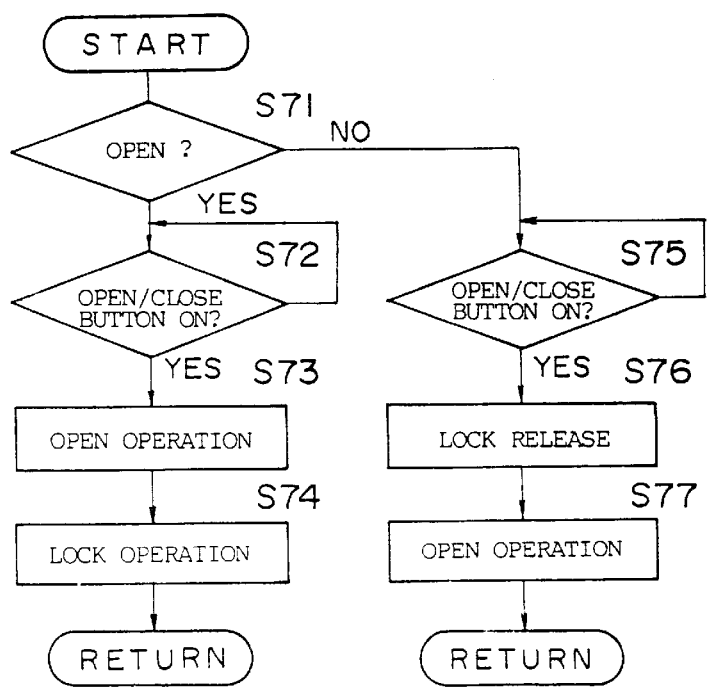
FIG. 78 is a flow chart for explaining a drawer open/close operation.

FIG. 78 is a flow chart for explaining the drawer open/close operation. As will be described later in conjunction with FIG. 79, for example, the apparatus is provided with a sensor 66-1 for outputting a detection signal when the closed state of the drawer 11 is detected. A step S71 decides whether or not the drawer 11 is open, based on the output signal of the sensor 66-1. When the drawer 11 is open and the decision result in the step S71 is YES, a step S72 decides whether or not the drawer open/close button 61C is pushed.

When the decision result in the step S72 is YES, a step S73 drives the motor 65-2 via the motor driving circuit 63, so as to close the drawer 11 by moving it in the direction opposite to the direction A. In addition, in a case where a locking mechanism for locking the drawer 11 in the closed state as shown in FIGS. 59 through 61 is driven by an electrical means such as the solenoid, a step S74 operates the locking mechanism to lock the drawer 11 in the closed state.

On the other hand, when the decision result in the step S71 is NO, a step S75 decides whether or not the drawer open/close button 61C is pushed. When the decision result in the step S75 is YES, a step S76 releases the above locking mechanism. A step S77 drives the motor 65-2 via the motor driving circuit 63, so as to open the drawer 11 by moving it in the direction A.

Figure 79:
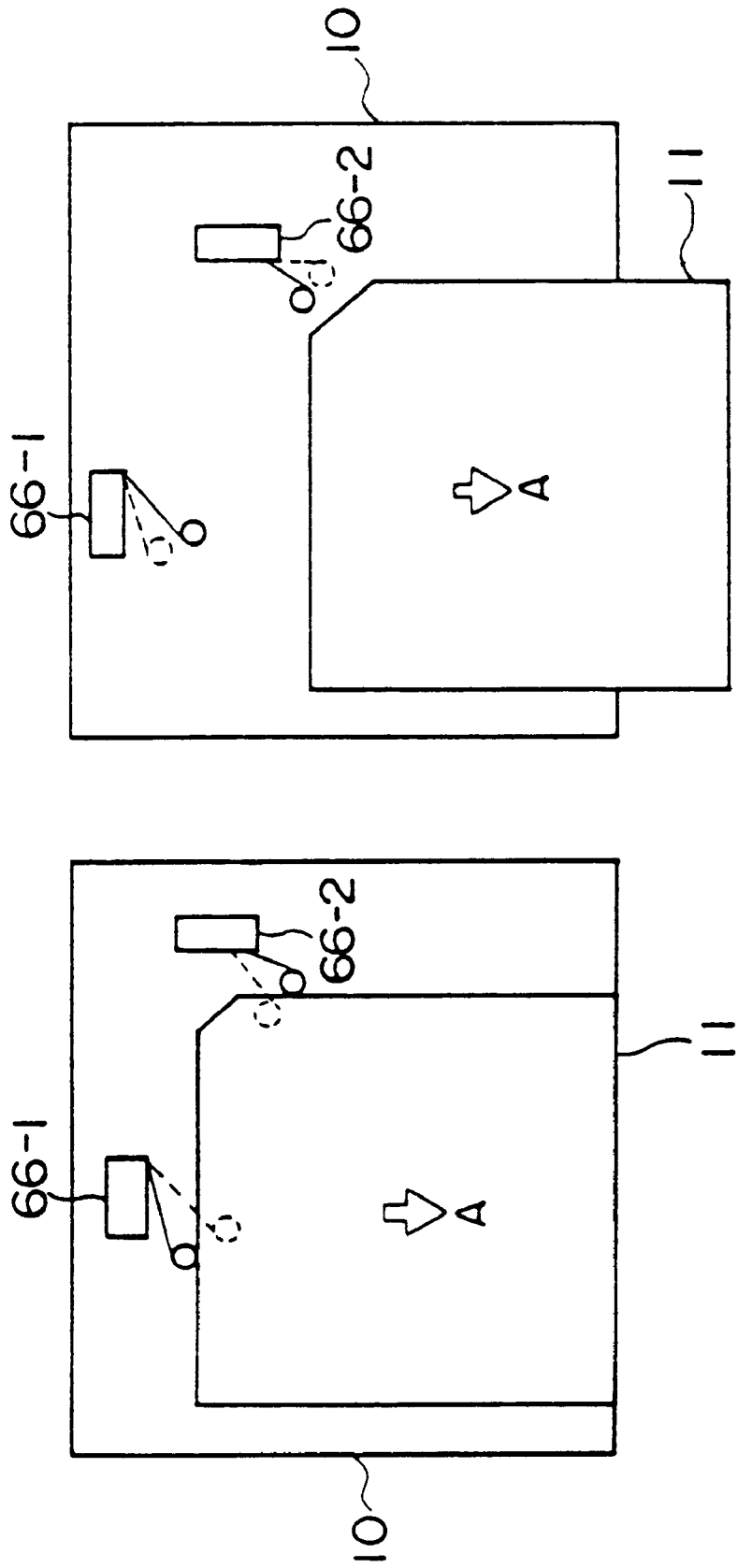
FIGS. 79(a) and 79(b) respectively are plan views for explaining a drawer position detecting operation.

FIG. 79 is a diagram for explaining a drawer position detecting operation. It is convenient to automatically open and close the drawer 11, but when equipment such as a keyboard is placed in front of the apparatus, there are cases where it is more convenient if the drawer 11 does not automatically move to the fully open state. A description will be given of an embodiment which satisfies such a demand.

FIG. 79(a) shows the drawer 11 in the closed state. Sensors 66-1 and 66-2 are provided in the apparatus. The sensor 66-1 is a microswitch for detecting the closed state of the drawer, and is ON in the state shown in FIG. 79(a) and OFF in a state shown in FIG. 79(b). On the other hand, the sensor 66-2 is a microswitch which turns OFF when the drawer 11 is opened by a predetermined amount from the closed state. Accordingly, the sensor 66-2 is ON in the state shown in FIG. 79(a) and is OFF in the state shown in FIG. 79(b).

Figure 80:
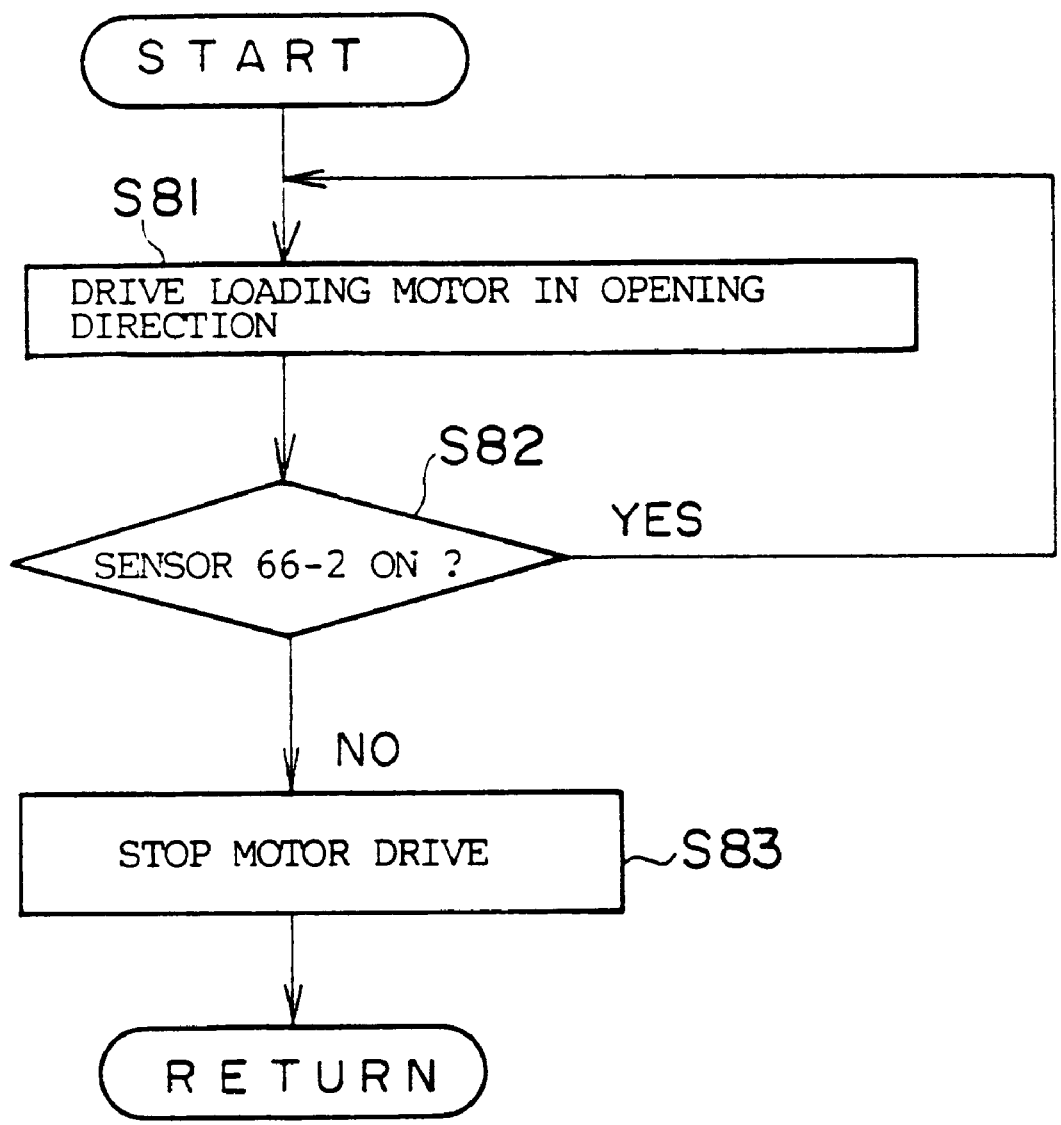
FIG. 80 is a flow chart for explaining a drawer open operation.

FIG. 80 is a flow chart for explaining a drawer open operation. A step S81 drives the motor 65-2 via the motor driving circuit 63, so as to move the drawer 11 in the direction A. A step S82 decides whether or not the sensor 66-2 is ON. When the decision result in the step S82 is NO, the process returns to the step S82. On the other hand, when the decision result in the step S82 is YES, a step S83 stops driving the motor 65-2, and the process ends. Hence, the drawer 11 stops at a position opened halfway, and is thereafter moved manually to the fully open state. Therefore, it is possible to prevent the drawer 11 from suddenly and fully opening to hit the equipment provided in front of the apparatus.

FIG. 81 is a flow chart for explaining a drawer close operation. A step S84 decides whether or not the sensor 66-2 is ON. When the decision result in the step S84 is YES, a step S85 drives the motor 65-2 via the motor driving circuit 63, so as to move the drawer 11 in the direction opposite to the direction A. A step S86 decides whether or not the sensor 66-1 is ON. When the decision result in the step S86 is NO, the process returns to the step S85. On the other hand, when the decision result in the step S86 is YES, a step S87 stops driving the motor 65-2, and the process ends. Therefore, when the drawer 11 is manually pushed a predetermined amount in the closing direction from the fully open state, the drawer 11 thereafter closes automatically.

The sensor 66-2 and the like may be provided at arbitrary positions in the apparatus, and a switch or the like may be provided on the operation panel 61, so that the outputs of one or a plurality of sensors to be used may be selected by the switch or the like. In this case, it is also possible to arbitrarily set the open/close operation of the drawer 11 to the manual mode, the automatic mode and the semi-automatic mode.

Next, a description will be given of a driving system for the document transport part and the document eject part.

Figure 82:
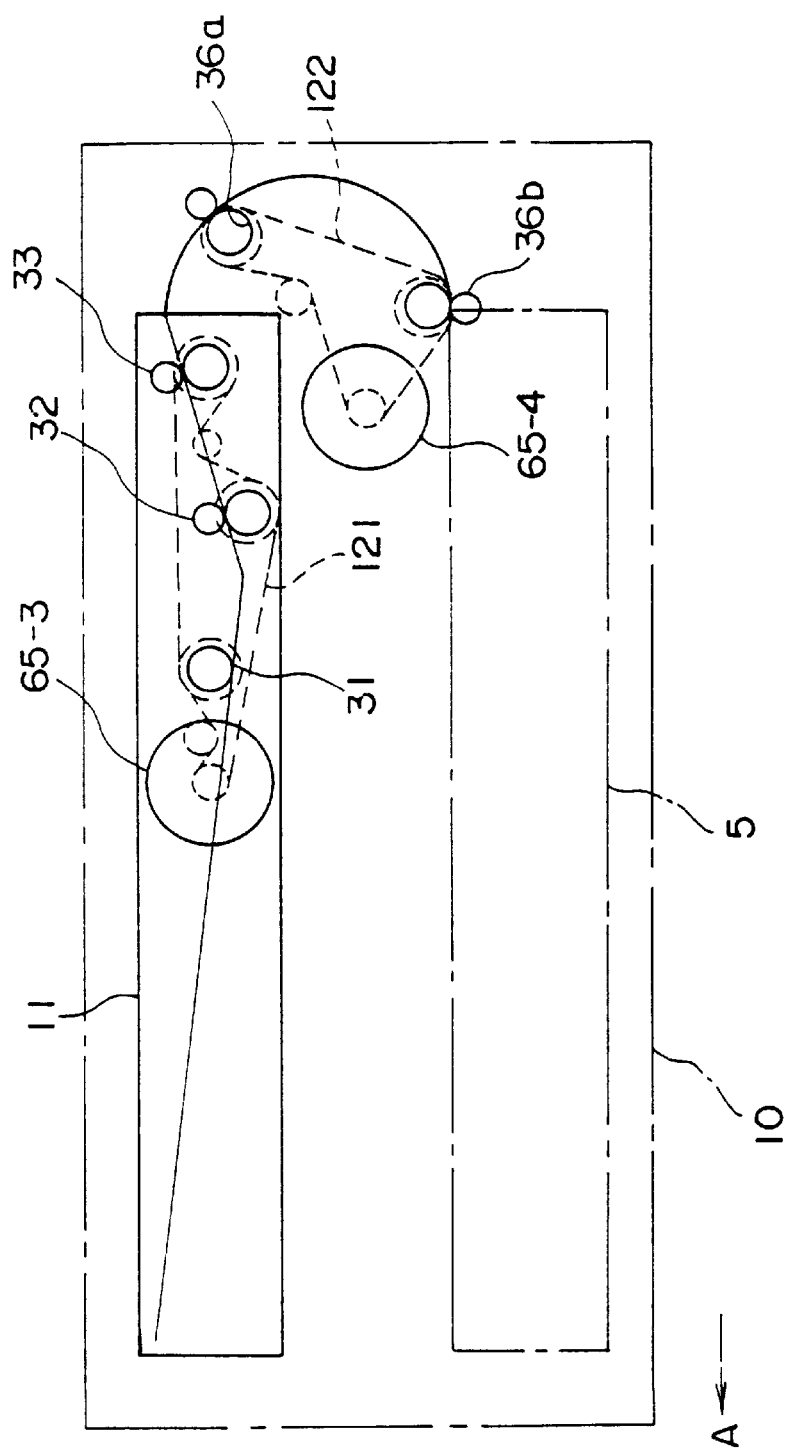
FIG. 82 is a cross sectional view for explaining a first embodiment of a driving system for a document transport part and a document eject part.

FIG. 82 is a diagram for explaining a first embodiment of the driving system for the document transport part and the document eject part. In FIG. 82, for the sake of convenience, belts and pulleys are indicated by a dotted line, and rollers are indicated by a solid line. A motor 65-3 drives the paper supply roller 31, the separation roller 32, the feed roller 33 and the like via a belt 121 and pulleys. On the other hand, a motor 65-4 drives the eject rollers 36a and 36b and the like via a belt 122 and pulleys. In other words, in this embodiment, the CPU 60 drives the document transport part and the document eject part by the independent motors 65-3 and 65-4.

Figure 83:
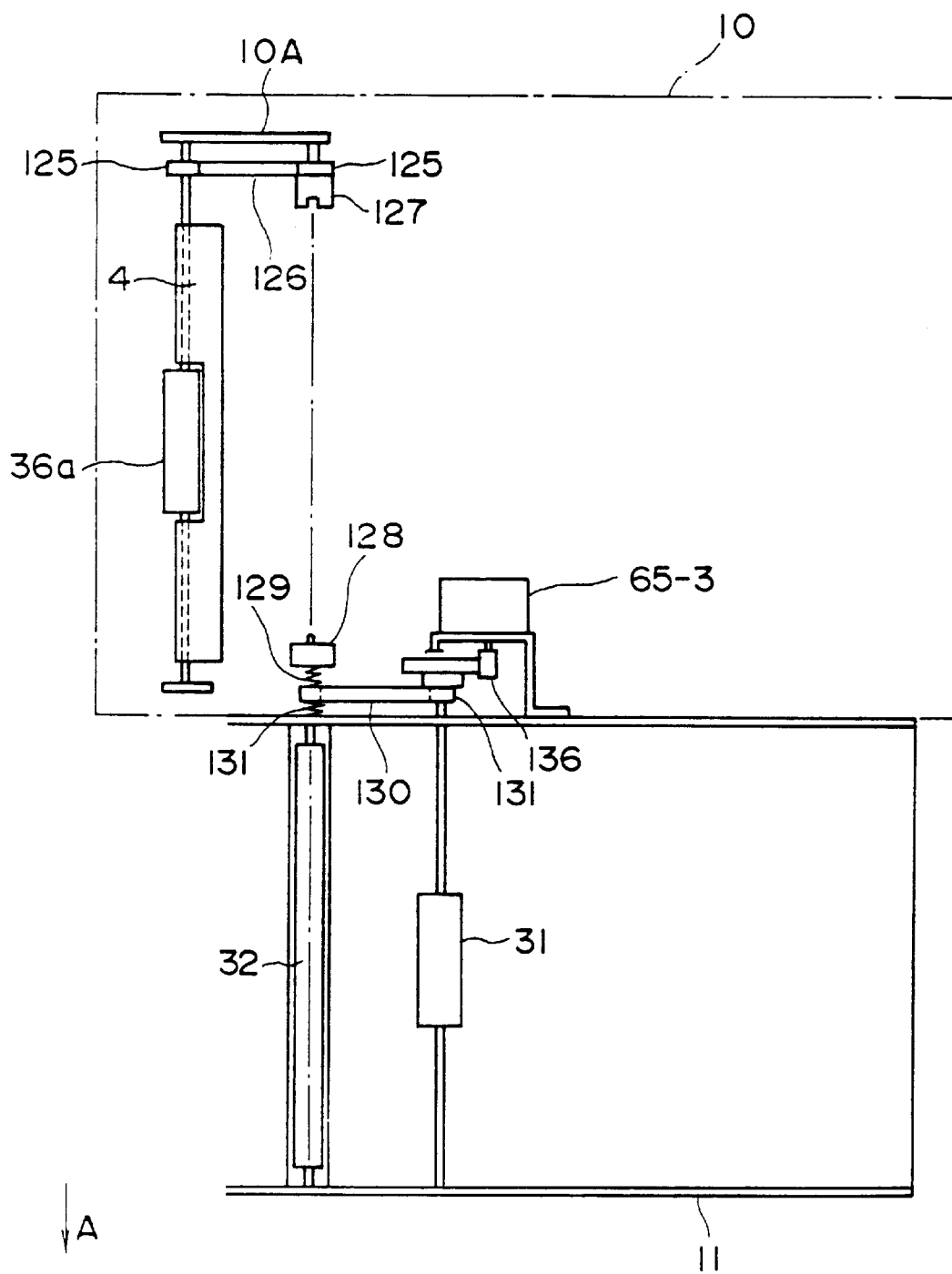
FIG. 83 is a plan view for explaining a second embodiment of the driving system for the document transport part and the document eject part.
Figure 85:
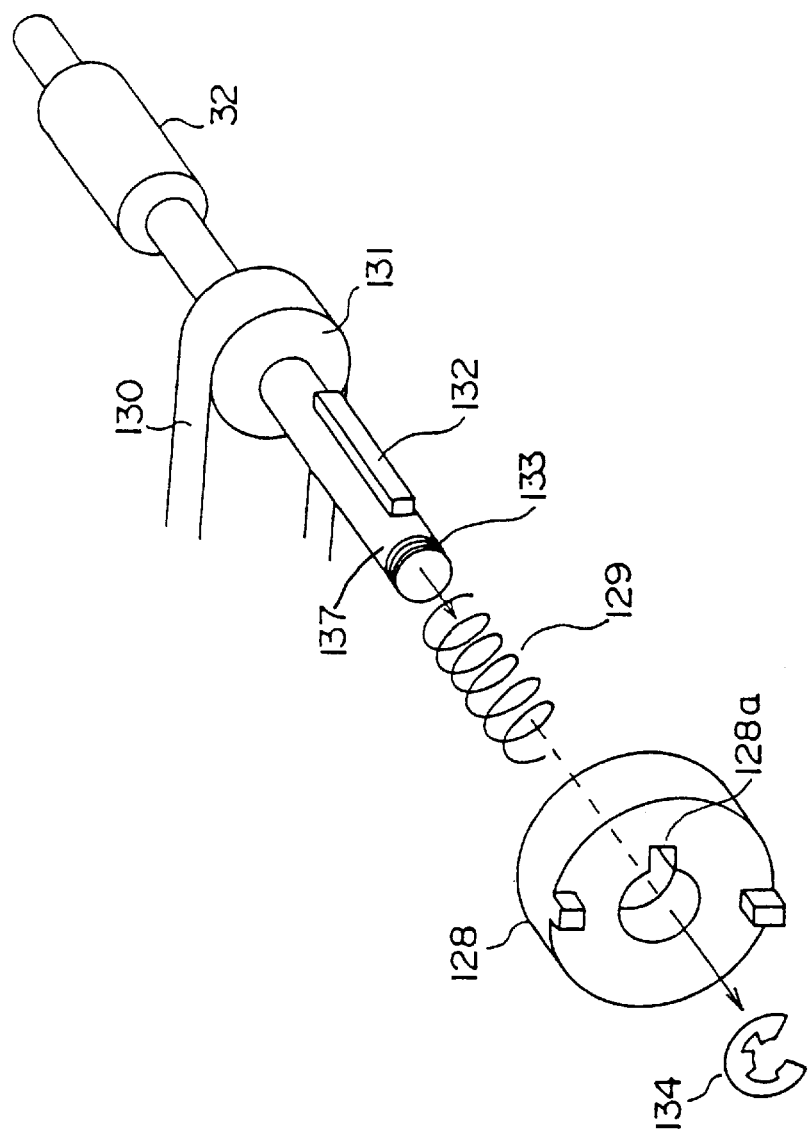
FIG. 85 is a perspective view showing an important part of a coupling part of the document transport part.
Figure 84:
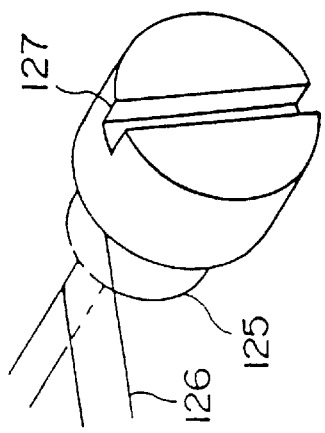
FIG. 84 is a perspective view showing an important part of a coupling part of the document eject part.

FIGS. 83 through 85 are diagrams for explaining a second embodiment of the driving system for the document transport part and the document eject part. In this embodiment, the CPU 60 drives both the document transport part and the document eject part by the single motor 65-3. FIG. 83 shows a state where the drawer 11 is open. In addition, FIG. 84 shows on an enlarged scale a coupling 127 which is arranged on the box shaped case 10, and FIG. 85 shows on an enlarged scale a coupling 128 arranged on the drawer 11.

The coupling 127 arranged on the box shaped case 10 is linked to the eject roller 36a via a pair of pulleys 125 and a belt 126 which is provided across these pulleys 125. Accordingly, when the coupling 127 rotates, the eject roller 36a is driven thereby.

On the other hand, the motor 65-3 drives the paper supply roller 31, the separation roller 32 and the like via two gears 136, a pair of pulleys 131 and a belt 130. The motor 65-3, the gears 136, the pulleys 131, the belt 130 and the like are all provided in the drawer 11. In addition, the coupling 128 is also driven by the motor 65-3, but the coupling 128 engages the coupling 127 arranged on the box shaped case 10 and drives the coupling 127 only in the closed state of the drawer 11. Projections of the coupling 128 engage a recess of the coupling 127.

As shown in FIG. 85, the pulley 131 is fixed to a shaft 137 which has a key 132 and a groove 133 located at a tip end thereof. The coupling 128 is fit over the shaft 137 via a coil spring 129 so that the key 132 engages a key groove 128a of the coupling 128, and is secured by a securing member 134 which engages the groove 133.

Hence, in this embodiment, it is possible to drive the document transport part by the motor 65-3 even in the open state of the drawer 11. For this reason, the operation of reading the document 6 can be made in the closed state of the drawer 11 and in the open state of the drawer 11. When it is possible to read the document 6 in the open state of the drawer 11, it is extremely convenient, for example, in a case where the document 6 to be read has a size such that the document 6 cannot be accommodated within the drawer 11. Furthermore, when reading the document 6 in the open state of the drawer 11, it is possible to manually supply the document 6 one page at a time. However, when reading the document 6 in the open state of the drawer 11, the document eject part is not used, and the read document 6 is, for example, ejected from the platen roller 35, the illustration of which is omitted in FIG. 83.

Figure 86:
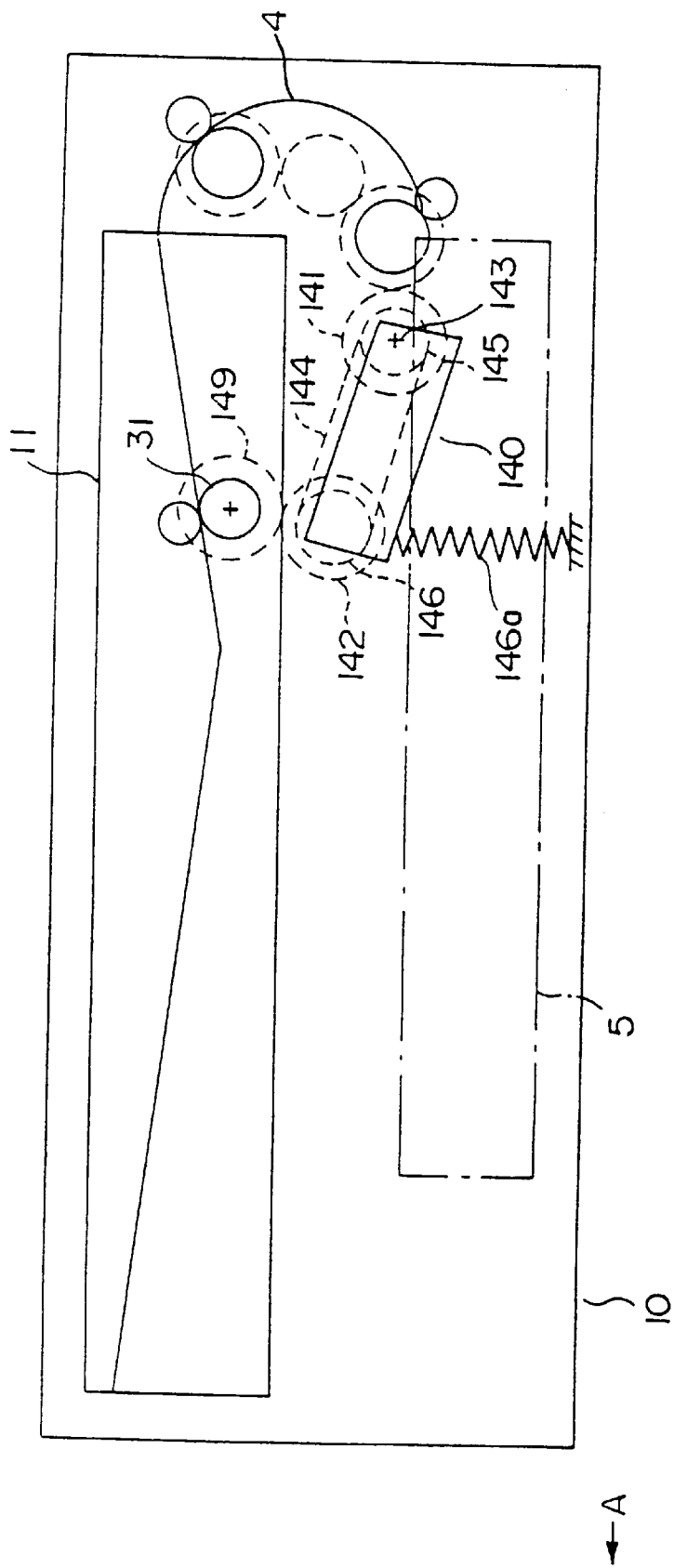
FIG. 86 is a cross sectional view for explaining a third embodiment of the driving system for the document transport part and the document eject part.
Figure 87:
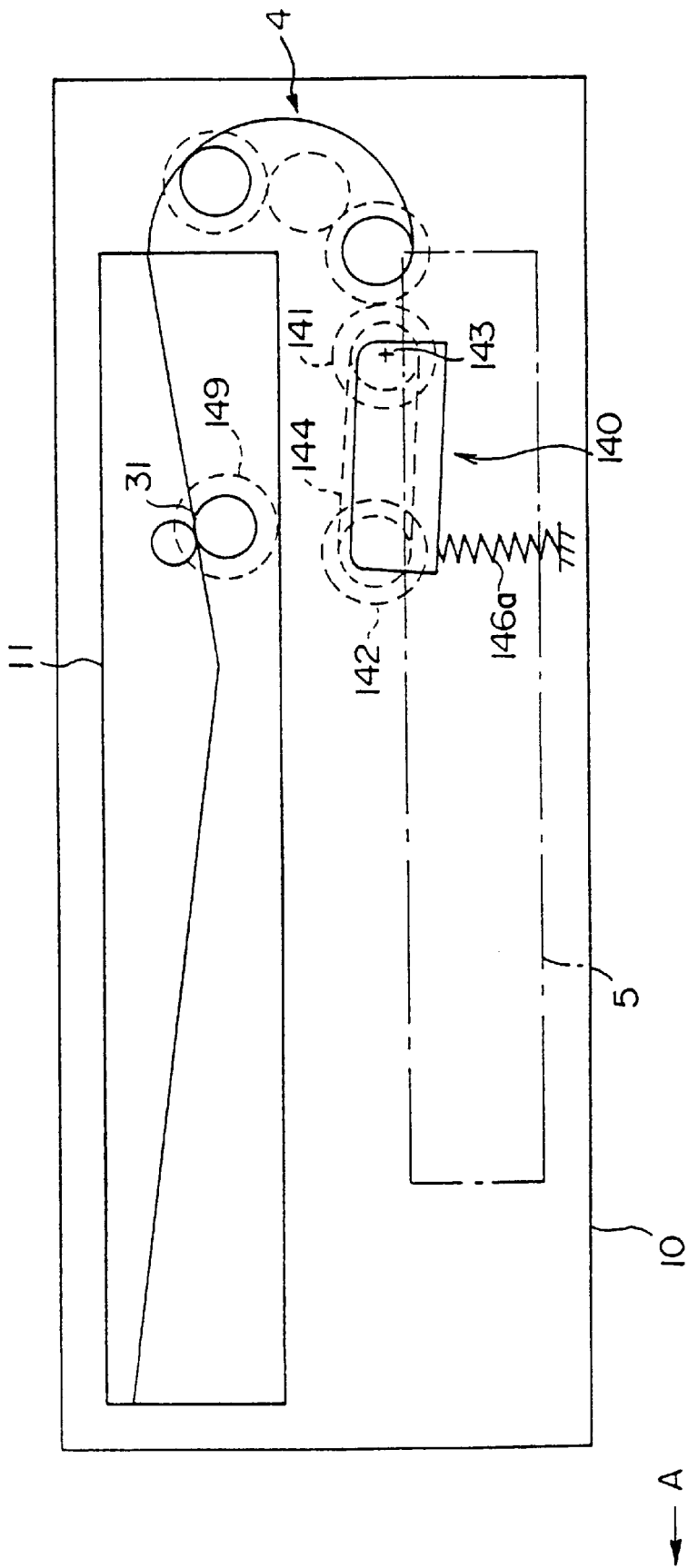
FIG. 87 is a plan view for explaining the third embodiment of the driving system for the document transport part and the document eject part.
Figure 88:
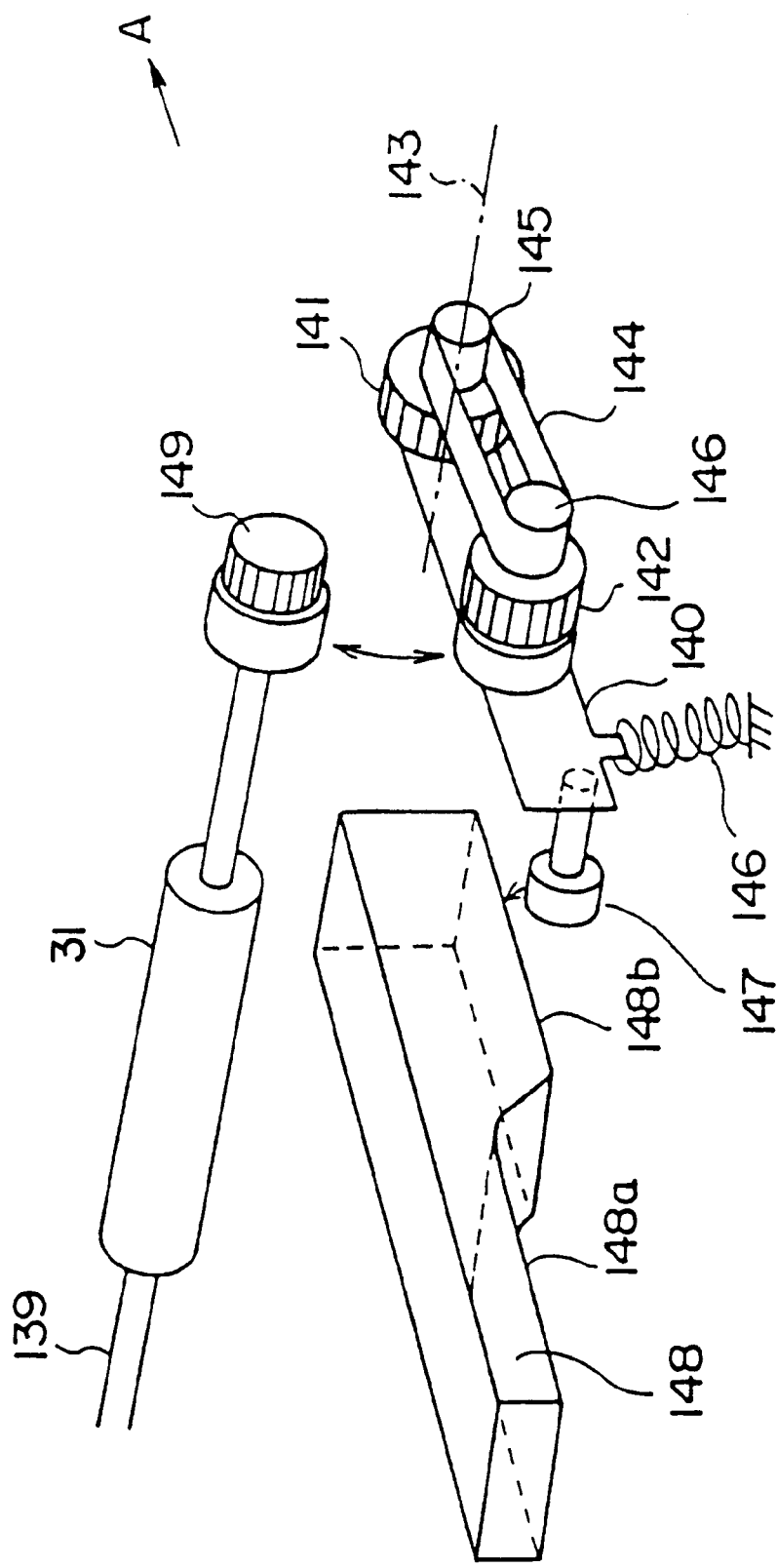
FIG. 88 is a perspective view showing an important part of the third embodiment of the driving system for the document transport part and the document eject part.

FIGS. 86 through 88 are diagrams for explaining a third embodiment of the driving system for the document transport part and the document eject part. In this embodiment, the document transport part and the document eject part are also both driven by the single motor 65-3.

FIGS. 86 and 87 respectively are cross sectional views for explaining the third embodiment of the driving system for the document transport part and the document eject part.

FIG. 86 shows a state where both the document transport part and the document eject part are driven by the motor 65-3, and FIG. 87 shows a state where only the document transport part is driven by the motor 65-3.

As shown in FIG. 88, the paper supply roller 31 provided on the drawer 11 is driven by the motor 65-3, the illustration of which is omitted in FIG. 88, via a shaft 139. A gear 149 which can mesh with a gear 142 provided on the box shaped case 10 is fixed to one end of this shaft 139. The gear 142 is rotatably supported on an arm 140 together with a gear 141. The arm 140 is rotatably provided about a rotation fulcrum 143. The gears 141 and 142 are linked and rotate together because a belt 144 is provided across pulleys 145 and 146 which are respectively provided coaxially to the gears 141 and 142. The gear 141 drives a roller of the document eject part.

The arm 140 is urged upwards in FIG. 86 by a spring 146a. In addition, in the closed state of the drawer 11, a guide pin 147 mounted on one end of the arm 140 is guided by a recess 148a of a cam surface 148 fixed to the chassis 10A, the illustration of which is omitted in FIG. 88. On the other hand, in the open state of the drawer 11, the guide pin 147 is guided by a projecting part 148b of the cam surface 148. Hence, in the closed state of the drawer 11, the arm 140 is located at the position shown in FIG. 86, the gears 149 and 142 mesh, and both the document transport part and the document eject part are driven by the motor 65-3. But in the closed state of the drawer 11, the arm 140 pivots to the position shown in FIG. 87 against the action of the spring 146a the gears 142 and 149 disengage, and the motor 65-3 drives only the document transport part.

The selective drive of the document transport part and the document eject part by the motor 65-3 is not limited to the mechanical means described above, and it is possible to employ an electrical means such as a solenoid.

Figure 89:
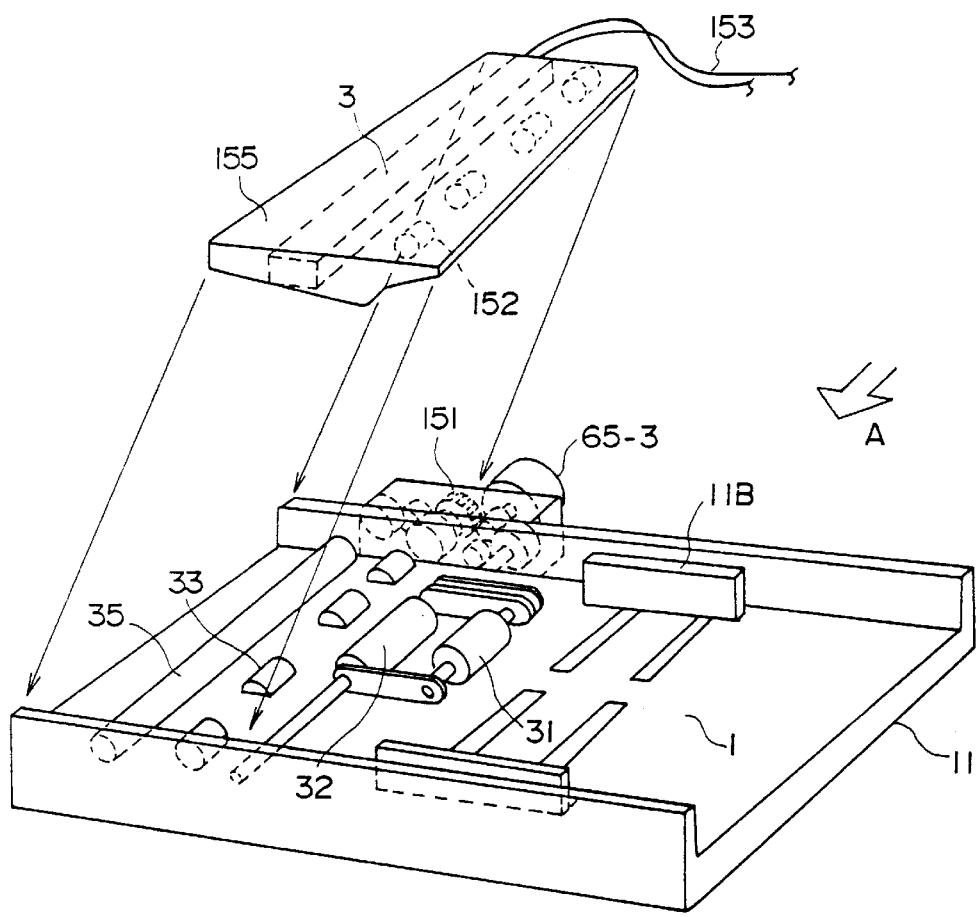
FIG. 89 is a partially disassembled perspective view showing a tenth embodiment of the drawer which is suited for making a read operation even in the open state.

FIG. 89 shows a tenth embodiment of the drawer 11 which is suited for making the read operation even in the open state. The motor 65-3 drives the paper supply roller 31, the separation roller 32, the feed roller 33, the platen roller 35 and the like of the document transport part via a transport driving system 151 which is made up of gears and the like. The image reader part 3 and a pinch roller 152 are provided on a member 155, and this member is mounted on the drawer 11 as indicated by the arrows in FIG. 89. The image reader part 3 is coupled to the CPU 60 via a signal line 153.

Figure 90:
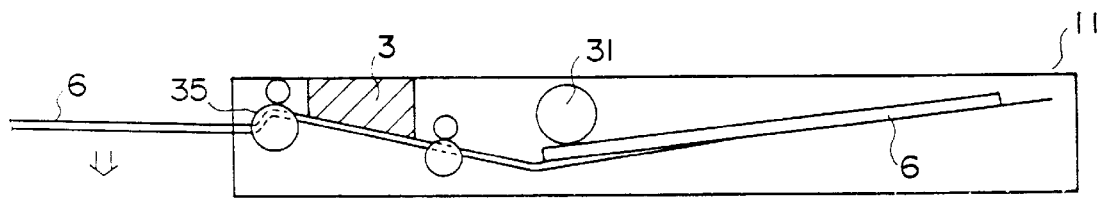
FIG. 90 is a cross sectional view showing an eleventh embodiment of the drawer which is suited for making the read operation even in the open state.

When reading the document 6 in the open state of the drawer 11, the document 6 which is ejected from the drawer 11 will not be ejected completely outside the drawer 11 if the final roller passed by the read document 6 is arranged at a position relatively on the inside of the drawer 11, and there is a possibility that the trailing end of the document 6 will remain within the drawer 11. Hence, in an eleventh embodiment of the drawer 11, the final roller passed by the read document 6 is arranged at the end part of the drawer 11 as shown in FIG. 90. As a result, the document 6 which is ejected from the drawer 11 is always ejected completely outside the drawer 11. In FIG. 90, the final roller passed by the read document 6 is the platen roller 35, however, the final roller is of course not limited thereto.

It is desirable to provide projections at predetermined angular intervals on the outer periphery of the final roller passed by the document 6, so as to shape the final roller in the form of a strike or brush-out roller. In this case, it is possible to increase the ejection energy with which the document 6 is ejected.

Furthermore, it is desirable to arrange an electrostatic elimination member such as a discharge brush in a vicinity of the final roller described above. In the case where the image reader part 3 or the image forming part 3 is provided in the hopper part 1 (drawer 11), it is possible to use the apparatus even in the open state of the drawer 11, and it is desirable to provide the discharge brush or the like in the hopper part 1 also in this case. The discharge brush or the like is desirably provided at two locations, namely, at a part behind the roller 35 of the hopper part 1 and at a part behind the eject roller 36b or the like to the stacker part 5.

Figure 91:
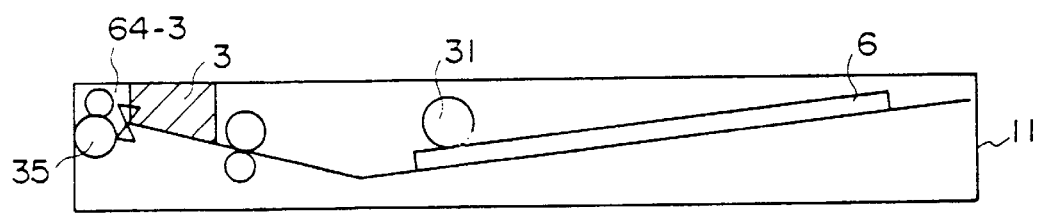
FIG. 91 is a cross sectional view showing a twelfth embodiment of the drawer for positively ejecting the document when making the read operation in the open state.
Figure 92:
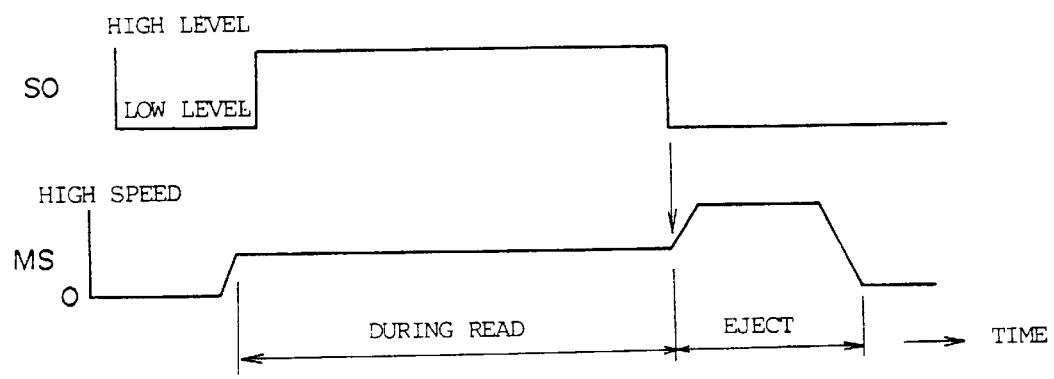
FIG. 92 is a time chart for explaining the operation of the twelfth embodiment of the drawer.

Next, a description will be given of a twelfth embodiment of the drawer 11 which positively ejects the document 6 when the read operation is carried out in the open state of the drawer 11, by referring to FIGS. 91 and 92. FIG. 91 shows the twelfth embodiment of the drawer 11, and FIG. 92 is a flow chart for explaining the operation of this embodiment.

As shown in FIG. 91, a read completion sensor 64-3 is provided in this embodiment. The read completion sensor 64-3 outputs a low-level output signal SO shown in FIG. 92 when the read document 6 is detected, and outputs a high-level output signal SO when no read document 6 is detected. The CPU 60 controls the motor 65-3 based on the output signal SO of the read completion sensor 64-3 obtained via the sensor circuit 62, so that a transport speed MS of the document 6 is controlled as shown in FIG. 92. Hence, the transport speed is set to a normal transport speed while reading the document 6, and is set to a high speed as shown in FIG. 92 when it is detected that the read document 6 has been ejected. As a result, the read document 6 is more positively ejected outside the drawer 11.

Next, a description will be given of a thirteenth embodiment of the drawer 11, by referring to FIG. 93. In this embodiment, a pivotable locking finger 158 is provided on the box shaped case 10 as shown in FIG. 93(a). By manually pivoting the locking finger 158 to lock the drawer 11 at the open position, it is possible to prevent the drawer 11 from unexpectedly sliding in the closing direction due to vibration or the like when the document 6 is read in the open position of the drawer 11. By releasing this locking by the locking finger 158, it is possible to close the drawer 11 as shown in FIG. 93(b).

FIG. 94 shows a fourteenth embodiment of the drawer 11. In this embodiment, a rack 159 is formed on the side portion of the drawer 11 as shown in FIG. 94(a), and a gear 160 is provided on the box shaped case 10. A load is applied on this gear 160 by a spring or the like so that the gear 160 will not rotate unless a force greater than a predetermined force is applied thereon. Accordingly, in the open state of the drawer 11, it is possible to prevent the drawer 11 from unexpectedly sliding in the closing direction due to vibration or the like when reading the document 6 in the open position of the drawer 11, because the gear 160 and the rack 159 are engaged in the open state of the drawer 11. When the drawer 11 is pushed in the direction opposite to the direction A with a force greater than the predetermined force, the gear 160 disengages from the rack 159 as shown in FIG. 94(b), and the drawer 11 can thereafter be closed with a small force.

Figure 95:
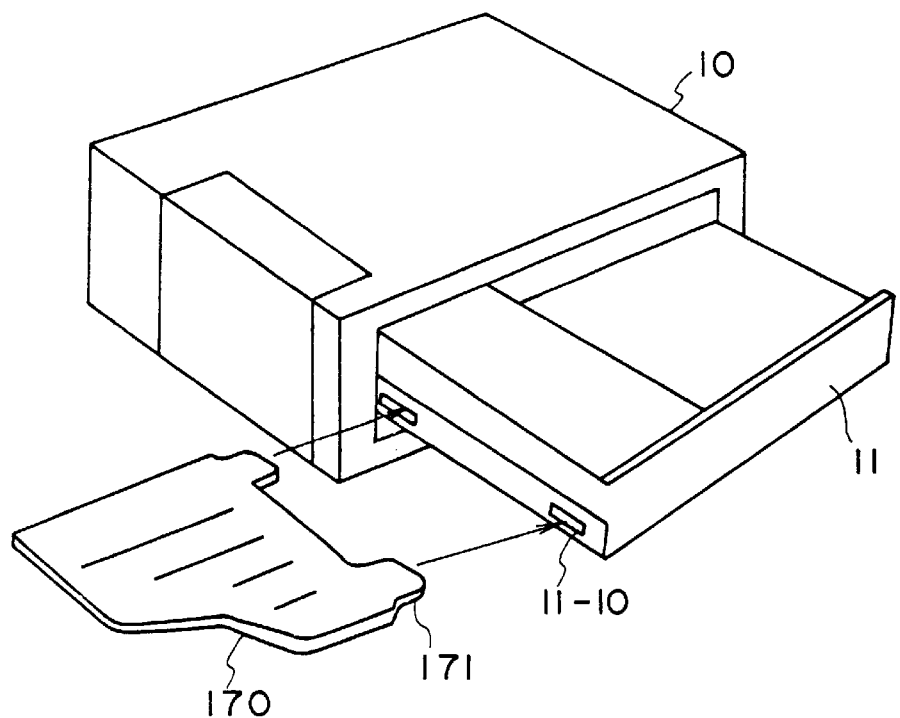
FIG. 95 is a perspective view for explaining a fifteenth embodiment of the drawer.

FIG. 95 shows a fifteenth embodiment of the drawer 11. In this embodiment, a pair of holes 11-10 is provided on the side surface of the drawer 11. When reading the document 6 in the open state of the drawer 11, engaging parts 171 of a tray 170 are inserted into the corresponding holes 11-10 in the drawer 11. Hence, it is possible to stack the documents 6 ejected from the drawer 11 onto the tray 170.

Figure 96:
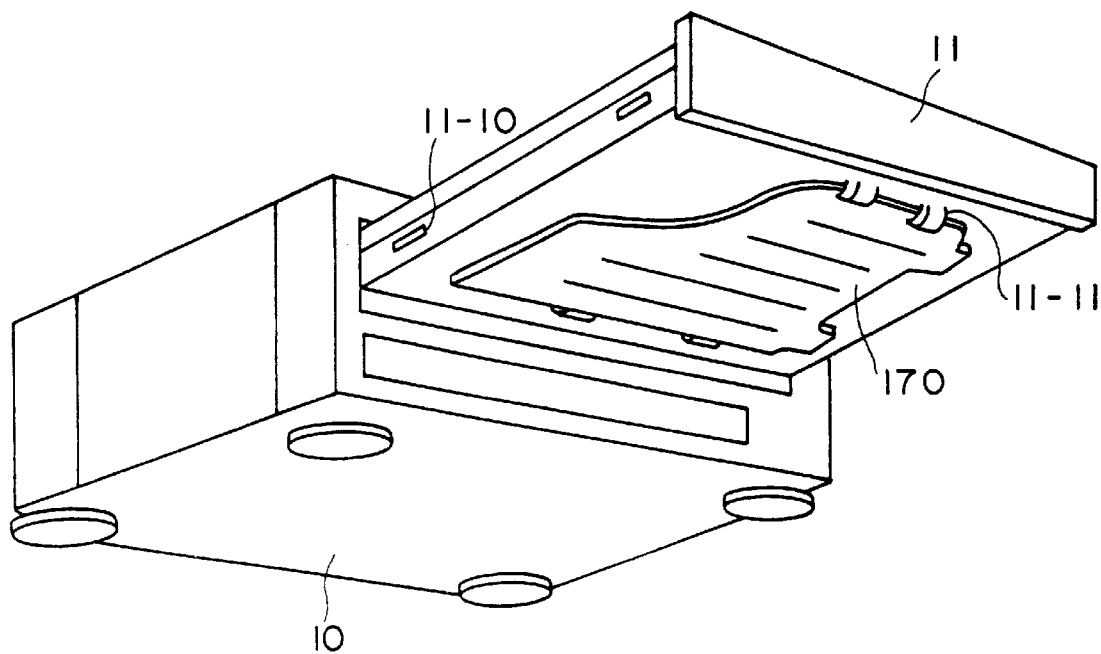
FIG. 96 is a perspective view from the bottom for explaining a sixteenth embodiment of the drawer.

FIG. 96 shows a sixteenth embodiment of the drawer 11. In this embodiment, the tray 170 shown in FIG. 95 is held by fingers 11—11 provided on the back side of the drawer 11, so that the tray 170 may be accommodated on the back side of the drawer 11.

Figure 97:
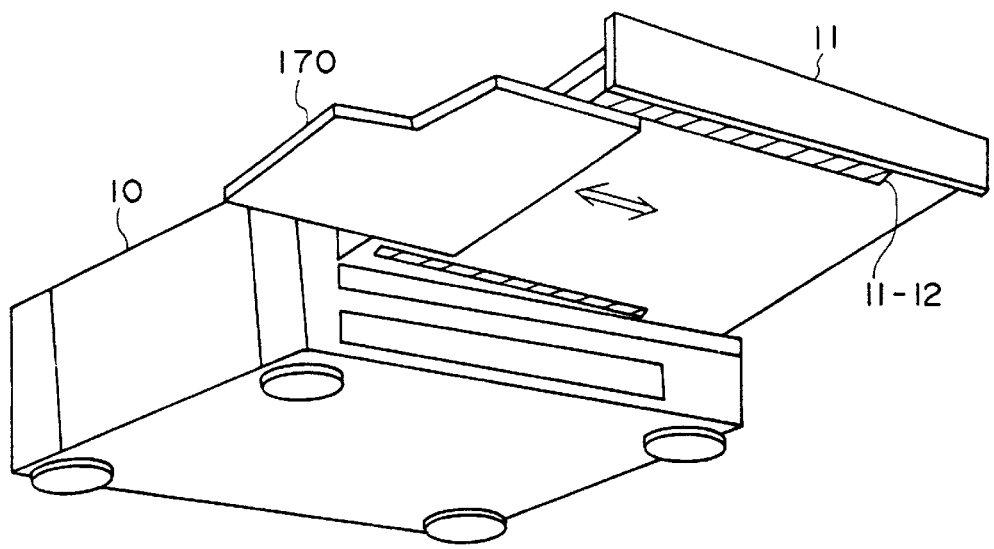
FIG. 97 is a perspective view from the bottom for explaining a seventeenth embodiment of the drawer.

FIG. 97 shows a seventeenth embodiment of the drawer 11. In this embodiment, the tray 170 shown in FIG. 95 is held by guide rails 11-12 provided on the back side of the drawer 11, so that the tray 170 may be accommodated on the back side of the drawer 11.

Next, a description will be given of an embodiment in which the image reader part 3 is provided on the box shaped case 10 instead of on the drawer 11.

Figure 98:
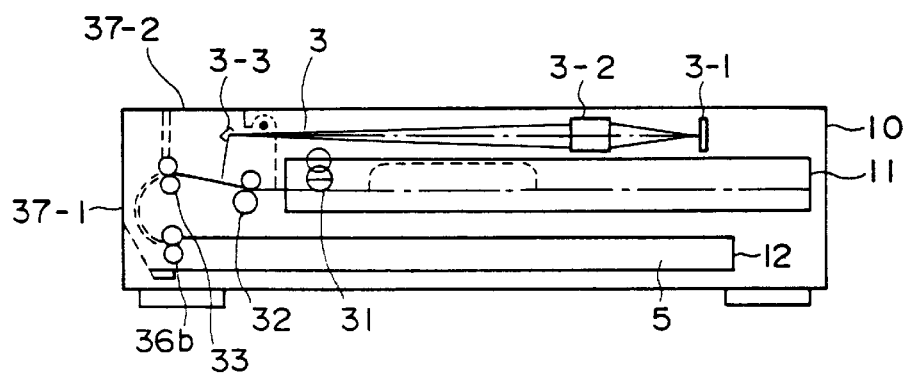
FIG. 98 is a cross sectional view showing a sixth embodiment of the apparatus according to the present invention.
Figure 100:
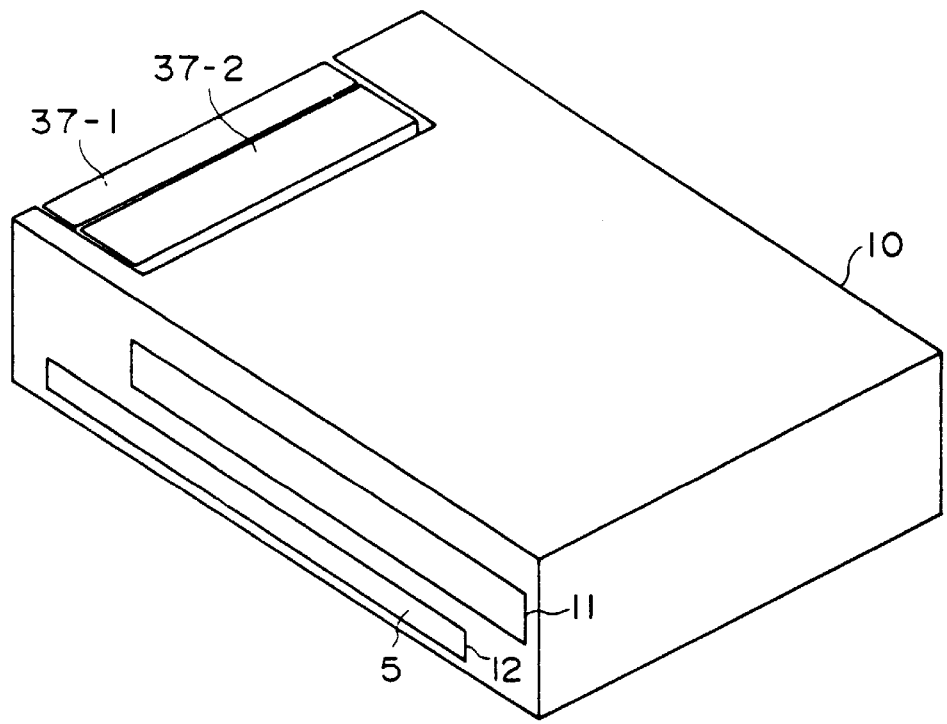
FIG. 100 is a perspective view showing the sixth embodiment of the apparatus according to the present invention.

FIG. 98 shows a sixth embodiment of the apparatus according to the present invention. In FIG. 98, those parts which are the same as those corresponding parts in FIG. 6 are designated by the same reference numerals, and a description thereof will be omitted. In this embodiment, the image reader part 3 generally includes a CCD line sensor 3-1, a lens system 3-2, and a mirror 3-3. This image reader part 3 is arranged within the box shaped case 10 at a position above the closed drawer 11.

FIG. 99 shows the sixth embodiment of the apparatus according to the present invention in the open state of the drawer 11.

Figure 101:
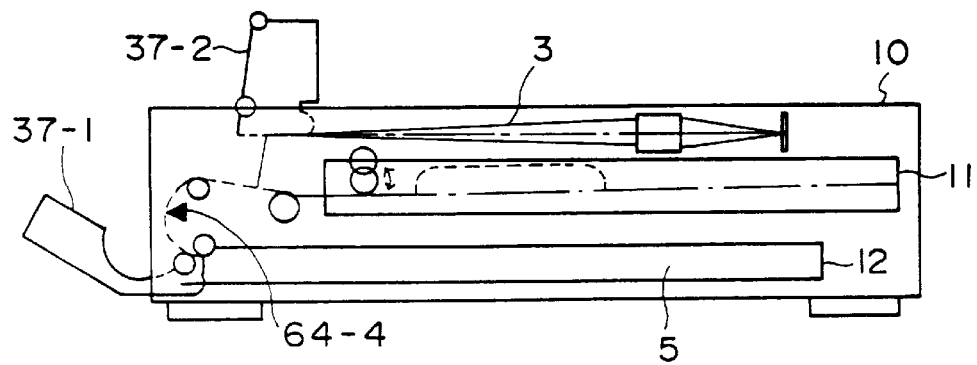
FIG. 101 is a cross sectional view for explaining a jam removing operation in the sixth embodiment of the apparatus according to the present invention.
Figure 102:
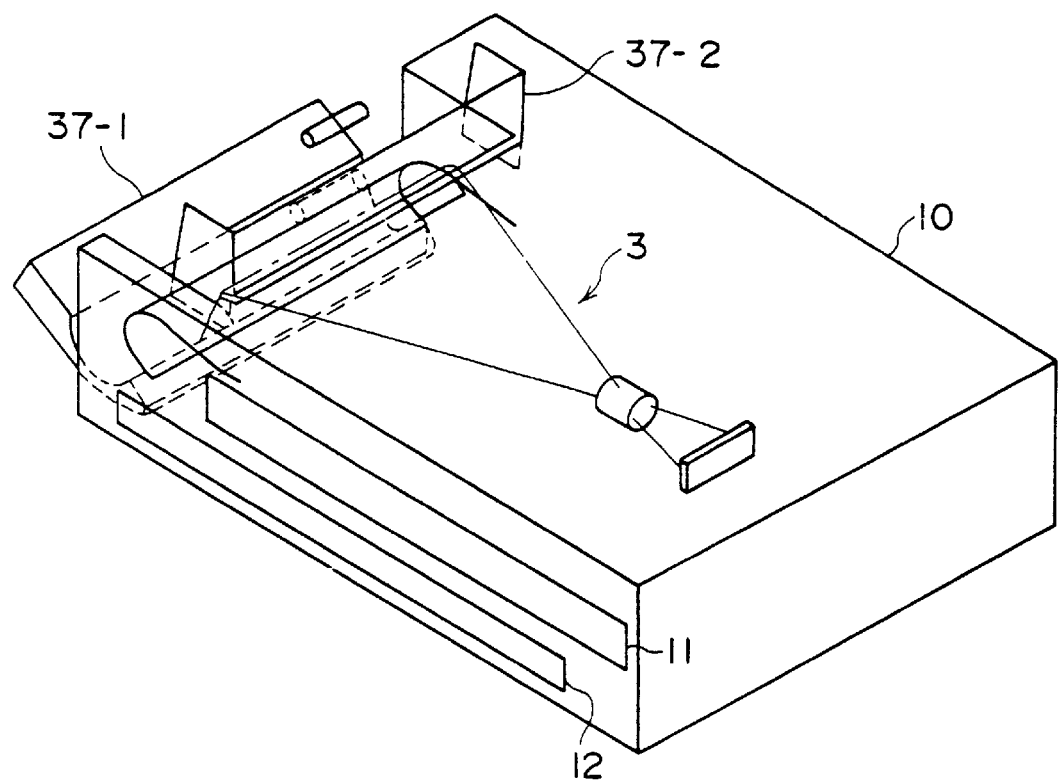
FIG. 102 is a perspective view for explaining the jam removing operation in the sixth embodiment of the apparatus according to the present invention.

FIG. 101 is a cross sectional view for explaining a jam removing operation in the sixth embodiment of the apparatus according to the present invention, and FIG. 102 is a perspective view for explaining the jam removing operation in the sixth embodiment of the apparatus according to the present invention. As shown in FIGS. 101 and 102, a cover is made up of a side cover portion 37-1 and a top cover portion 37-2. When the document 6 gets stuck for some reason and the so-called jam occurs, the document 6 being transported can easily be removed by opening the side cover portion 37-1 and the top cover portion 37-2 as shown in FIGS. 101–102. The jam may be detected using a known technique. For example, when a sensor 64-4 shown in FIG. 101 detects the document 6 for a time greater than a predetermined time, the CPU 60 detects the jam based on an output signal of the sensor 64-4 obtained via the sensor circuit 62, and outputs an alarm or the like to the operation panel 61, for example.

Figure 103:
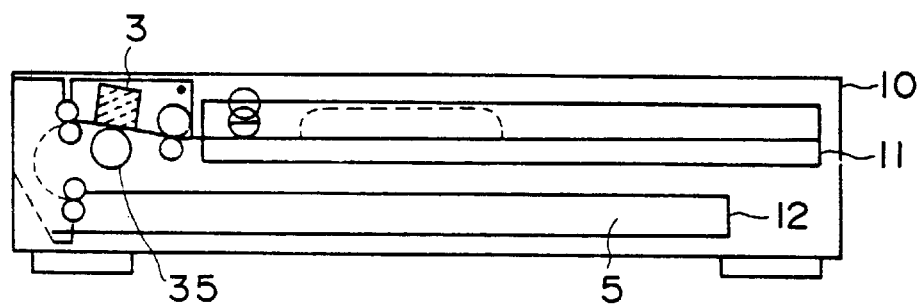
FIG. 103 is a cross sectional view showing a seventh embodiment of the apparatus according to the present invention.

FIG. 103 shows a seventh embodiment of the apparatus according to the present invention. In FIG. 103, those parts which are the same as those corresponding parts in FIG. 6 are designated by the same reference numerals, and a description thereof will be omitted. In this embodiment, the image reader part 3 is made up of a contact type image sensor, for example. The image reader part 3 is provided on the top cover portion 37-2, and when the apparatus is viewed from the front, the image reader part 3 is arranged in a top left direction of the drawer 11.

Figure 104:
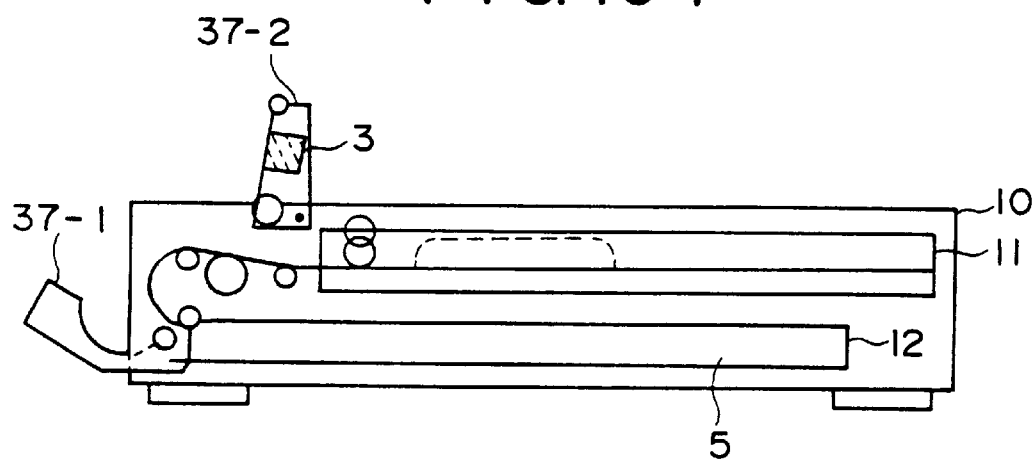
FIG. 104 is a cross sectional view for explaining the jam removing operation in the seventh embodiment of the apparatus according to the present invention.

FIG. 104 is a cross sectional view for explaining the jam removing operation in the seventh embodiment of the apparatus according to the present invention. When the document 6 gets stuck for some reason and the so-called jam occurs, the document 6 being transported may easily be removed by opening the side cover 37-1 and the top cover 37-2 as shown in FIG. 104. When the top cover 37-1 is opened, the image reader part 3 also moves together with the top cover portion 37-2, and this is convenient from the point of view of removing the jam.

FIG. 105 shows an eighth embodiment of the apparatus according to the present invention. In FIG. 105, those parts which are the same as those corresponding parts in FIG. 6 are designated by the same reference numerals, and a description thereof will be omitted. In this embodiment, the image reader part 3 is made up of a contact type image sensor, for example. The image reader part 3 is provided on the side cover portion 37-1, and when viewed from the front of the apparatus, the image reader part 3 is arranged in the top left direction of the drawer 11.

FIG. 106 is a cross sectional view for explaining the jam removing operation in the eighth embodiment of the apparatus according to the present invention. When the document 6 gets stuck for some reason and the so-called jam occurs, the document 6 being transported can easily be removed by opening the cover portion 37 as shown in FIG. 106. When the cover portion 37 is opened, the image reader part 3 also moves together with the cover portion 37, and this is convenient from the point of view of removing the jam.

When employing the layout of the apparatus shown in FIG. 13, it would be extremely convenient if the drawer 11 can be opened without moving the keyboard 21. Accordingly, in an eighteenth embodiment of the drawer 11, the height position of the drawer 11 is set higher than the height position of the keyboard 21 as shown in FIG. 107. As a result, it becomes possible to open and close the drawer 11 without having to move the keyboard 21.

The height of the apparatus (box shaped case 10) is 100 mm to 105 mm, for example, and the height of the keyboard 21 is 40 mm to 50 mm, for example. Accordingly, the height position of the hopper part 1 is set to a height position by taking these heights of the apparatus and the keyboard 21 into consideration. In FIG. 6, for example, measures are taken to reduce the height of the apparatus, such as making the paper path of the hopper part 1 face upwards, making the radius of curvature of the document turn-over part 4 as large as possible, and minimizing the space required on the lower part such as below the rollers 35 and 33.

As described above in conjunction with FIG. 4, the apparatus according to the present invention is not limited to the image reading apparatus, and the present invention is applicable to the image forming apparatus such as a printer. When the present invention is applied to the image forming apparatus, a construction which is the same as that of any of the embodiments of the image reading apparatus described above may be employed, except for the fact that an image forming part such as a printing head is used in place of the image reader part. Accordingly, in the following description, a description will only be given of typical embodiments of the image forming apparatus.

Figure 108:
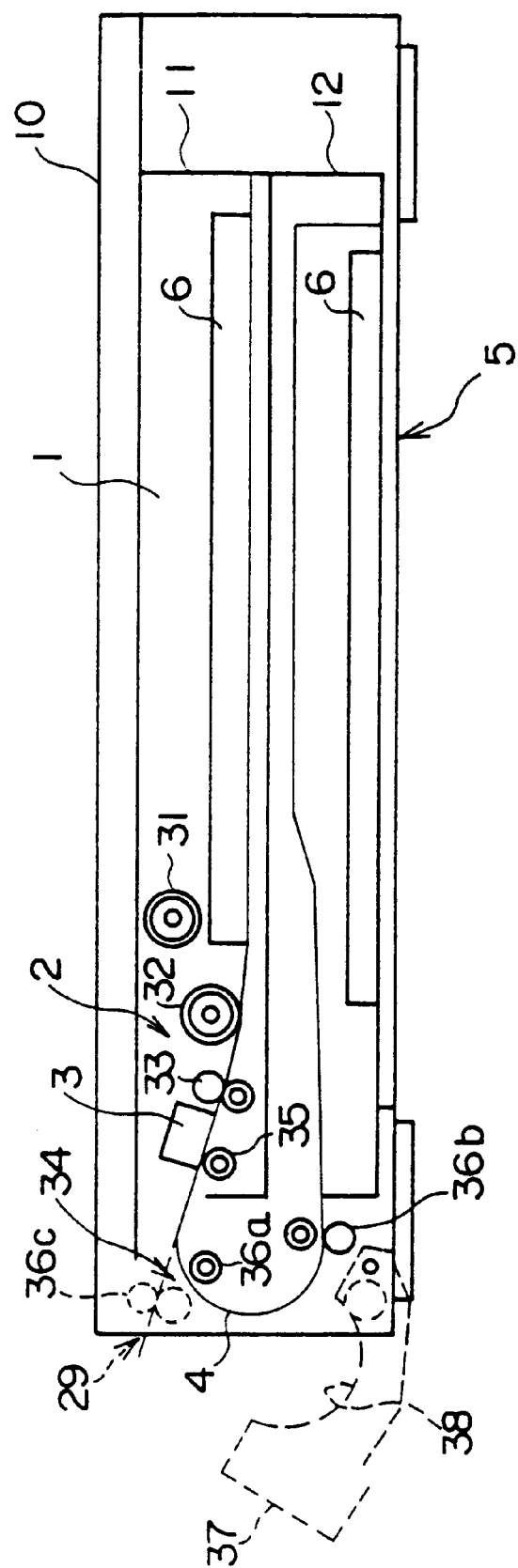
FIG. 108 is a cross sectional view showing a nineteenth embodiment of the apparatus according to the present invention.

FIG. 108 shows a nineteenth embodiment of the apparatus according to the present invention. In FIG. 108 and FIGS. 109 through 118 which will be described later, those parts which are the same as those corresponding parts in FIGS. 4 through 6 are designated by the same reference numerals, and a description thereof will be omitted.

In FIG. 108, an image forming part 3 such as a printing head is provided within the drawer 11 in place of the image reader part 3 shown in FIG. 6. The other parts are essentially the same as those of the image reading apparatus shown in FIG. 6.

Figure 109:
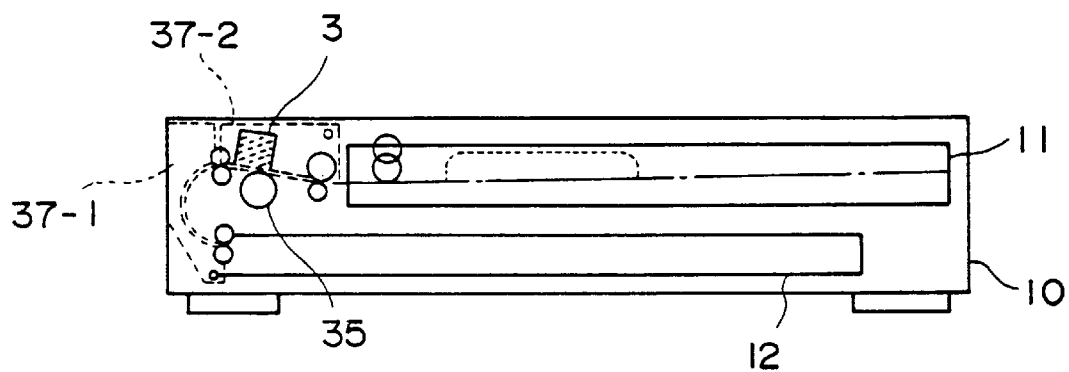
FIG. 109 is a cross sectional view showing a twentieth embodiment of the apparatus according to the present invention.

FIG. 109 shows a twentieth embodiment of the apparatus according to the present invention. In this embodiment, the image forming part 3 is made up of an ink jet type printing head, for example. When viewed from the front of the apparatus, this image forming part 3 is arranged in the top left direction of the drawer 11. However, unlike the case shown in FIG. 103, the image forming part 3 is provided on the main body of the apparatus and not on the top cover portion 37-2.

Figure 110:
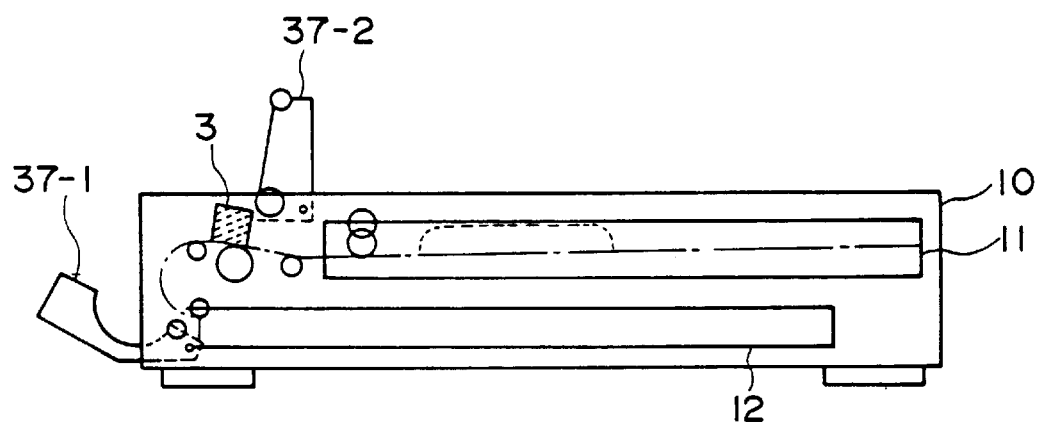
FIG. 110 is a cross sectional view for explaining the jam removing operation in the twentieth embodiment of the apparatus according to the present invention.

FIG. 110 is a cross sectional view for explaining the jam removing operation in the twentieth embodiment of the apparatus according to the present invention. When the document 6 gets stuck for some reason and the so-called jam occurs, the document 6 being transported may easily be removed by opening the side cover portion 37-1 and the top cover portion 37-2 as shown in FIG. 110. When the top cover portion 37-2 is opened, a large portion of the document transport part is released, which makes it convenient for removing the jam.

Figure 111:
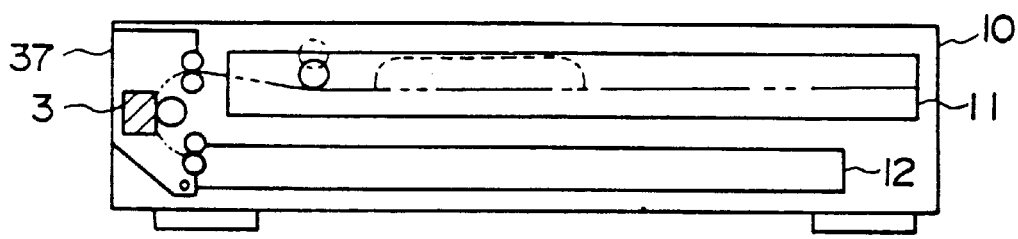
FIG. 111 is a cross sectional view showing twenty-first and twenty-second embodiments of the apparatus according to the present invention.
Figure 112:
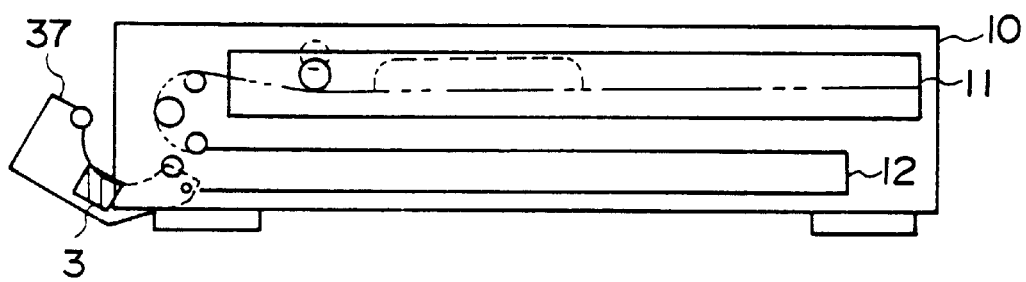
FIG. 112 is a cross sectional view for explaining the jam removing operation in the twenty-first embodiment of the apparatus according to the present invention.

FIG. 111 shows twenty-first and twenty-second embodiments of the apparatus according to the present invention. In these embodiments, the image forming part 3 is made up of an ink jet type printing head, for example. When viewed from the front of the apparatus, this image forming part 3 is arranged in the bottom left direction of the drawer 11. As shown in FIG. 112 which will be described later, the image forming part 3 is provided on the side cover 37 in the twenty-first embodiment. On the other hand, as will be described later in conjunction with FIG. 113, the image forming part 3 is provided on the main body of the apparatus in the twenty-second embodiment.

FIG. 112 is a cross sectional view for explaining the jam removing operation of the twenty-first embodiment of the apparatus according to the present invention. When the document 6 gets stuck for some reason and the so-called jam occurs, the document 6 being transported may easily be removed by opening the side cover 37 as shown in FIG. 112. When the side cover 37 is opened, the image forming part 3 also moves together with the side cover 37, thereby making it convenient for removing the jam.

Figure 113:
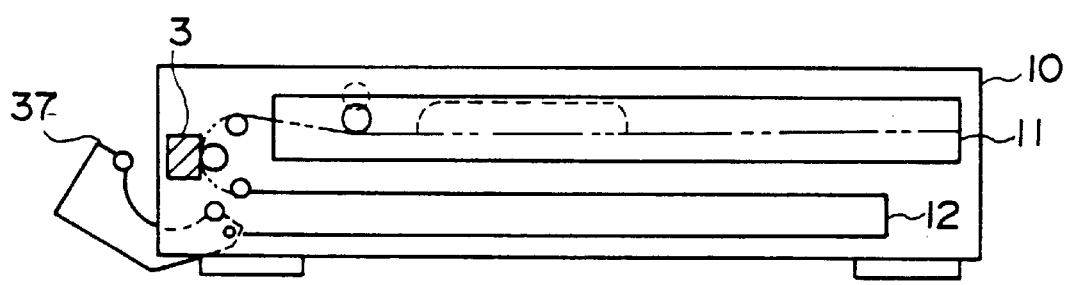
FIG. 113 is a cross sectional view for explaining the jam removing operation in the twenty-second embodiment of the apparatus according to the present invention.

FIG. 113 is a cross sectional view for explaining the jam removing operation of the twenty-second embodiment of the apparatus according to the present invention. When the document 6 gets stuck for some reason and the so-called jam occurs, the document 6 being transported may easily be removed by opening the side cover 37 as shown in FIG. 113. When the side cover 37 is opened, a large part of the document transport part is released, thereby making it convenient for removing the jam.

Figure 114:
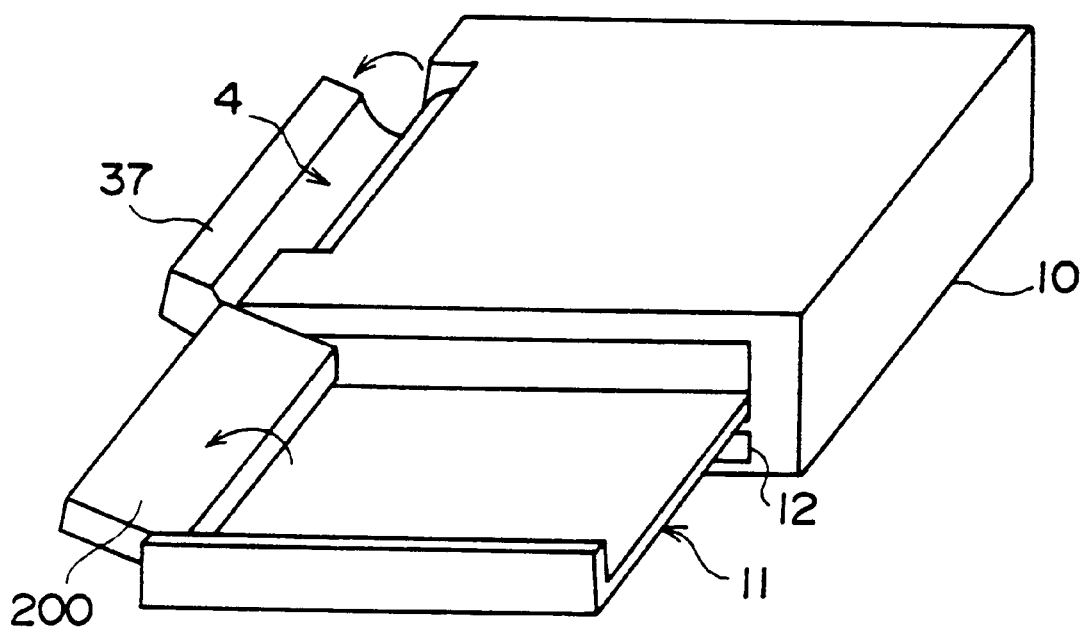
FIG. 114 is a perspective view showing a twenty-third embodiment of the apparatus according to the present invention.

FIG. 114 shows a twenty-third embodiment of the apparatus according to the present invention. FIG. 114 shows a state where the drawer 11 is open. In this embodiment, it is possible to easily remove the jam by opening the side cover 37 and rotating a rotary part 200 in the arrow direction in FIG. 114. At least a part of the document transport part 2 and/or the image forming part 3 are provided on the rotary part 200.

The image forming part 3 may be made up of any means of forming an image. For example, various kinds of printing heads such as an ink jet type printing head, an impact type printing head and a thermal transfer type printing head may be used as the image forming part 3. Since such printing heads themselves are known, a detailed description thereof will be omitted. However, as an example, a description will be given of a case where the ink jet type printing head is used, by referring to FIGS. 115 through 117.

Figure 115:
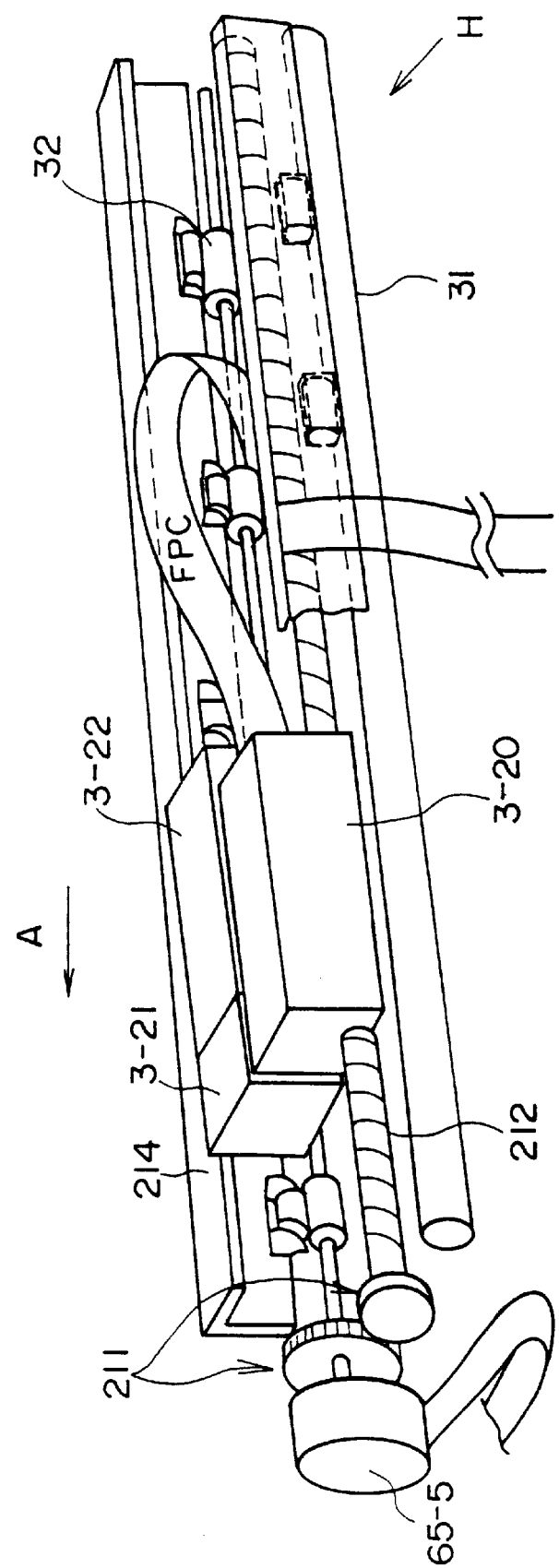
FIG. 115 is a perspective view showing a peripheral part of an image forming part.
Figure 117:
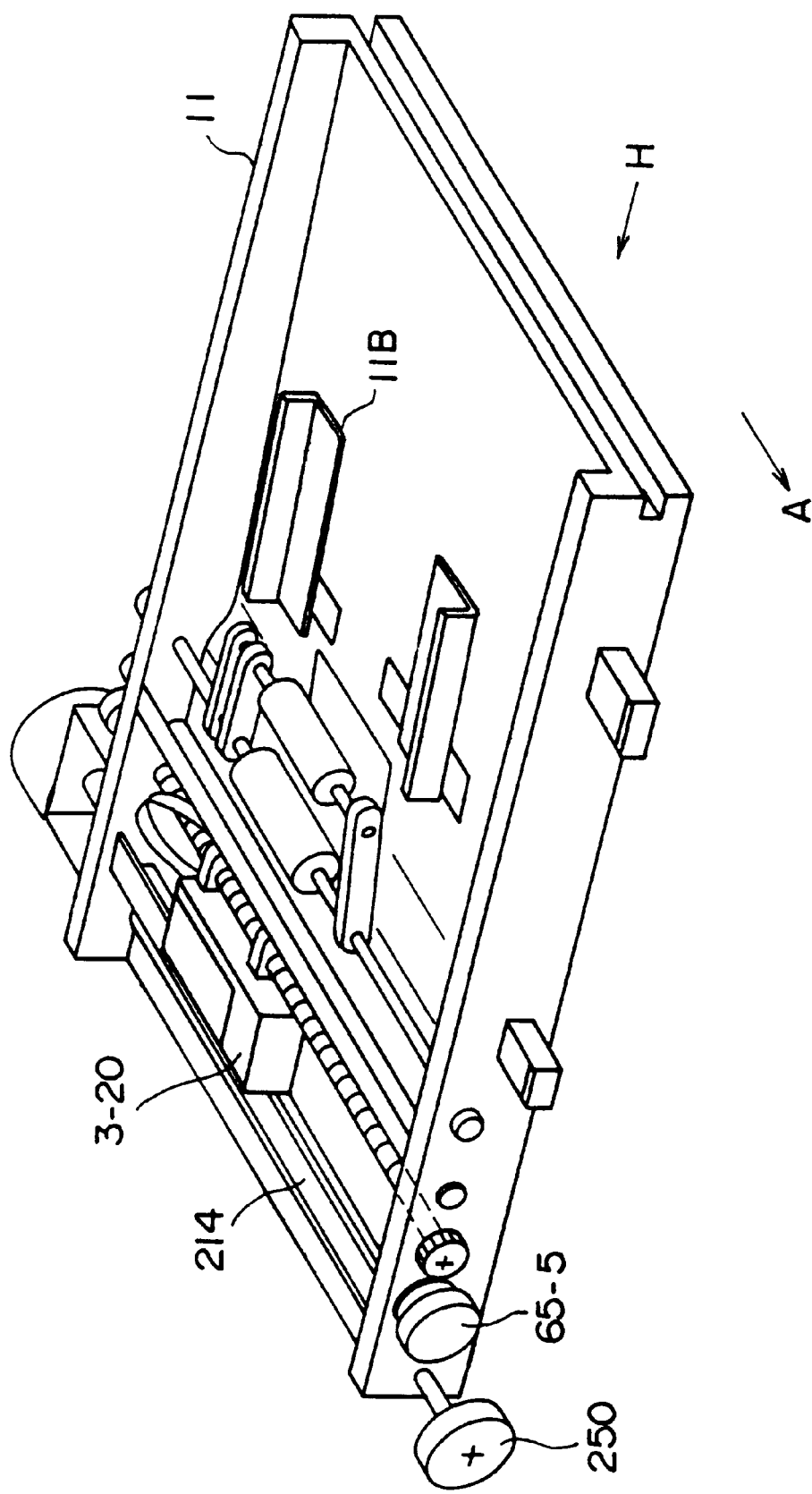
FIG. 117 is a perspective view showing the drawer including the image forming part.
Figure 116:
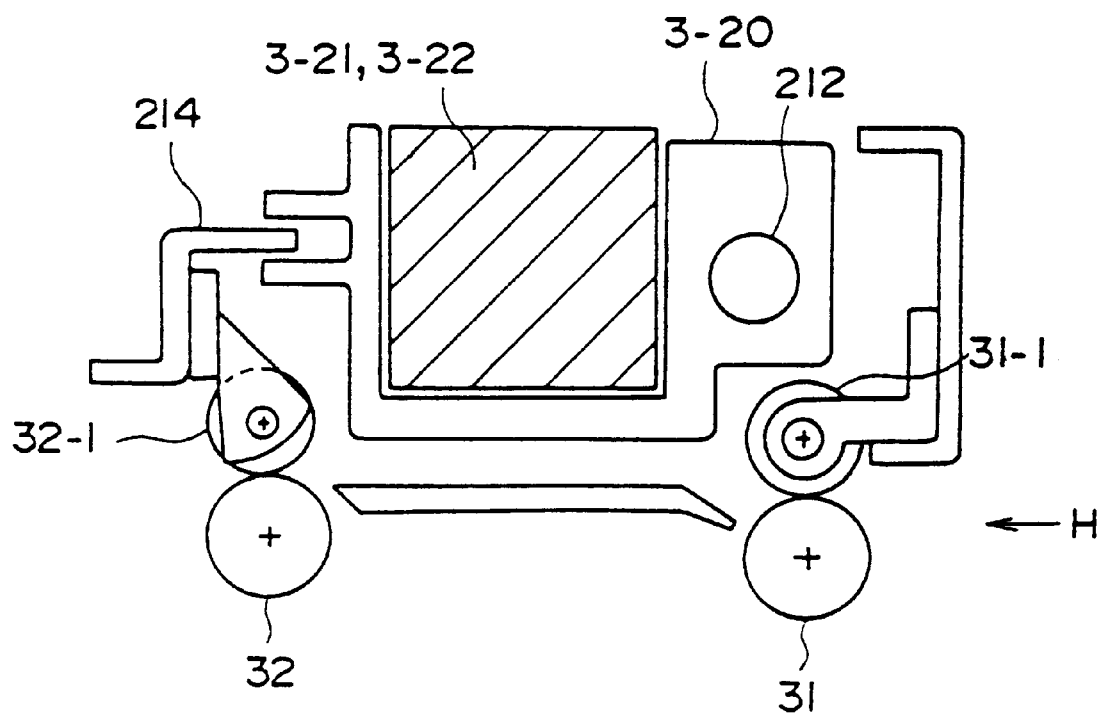
FIG. 116 is a cross sectional view showing a head part.

FIG. 115 is a perspective view showing a peripheral part of the image forming part, FIG. 116 is a cross sectional view showing the head part, and FIG. 117 is a perspective view showing the drawer including the image forming part. As shown in FIG. 115, the image forming part 3 generally includes a carriage 3-20, an ink jet head 3-21, and an ink cartridge 3-22. The ink jet head 3-21 and the ink cartridge 3-22 are mounted on the carriage 3-20. The carriage 3-20 is driven by a motor 65-5 via reduction gears 211 and a feed screw 212, and moves in the direction opposite to the direction A.

In addition, as shown in FIG. 116, the carriage 3-20 is guided by a guide rail 214. The document 6 is transported in a direction H in FIG. 116 by a pinch roller 31-1, the paper supply roller 31, a pinch roller 32-1 and the separation roller 32.

FIG. 117 is a perspective view showing the drawer 11 including the image forming part 3 described above and a head driving system. A handle 250 is manually turned when a jam occurs below the guide rail 214, so as to manually eject the stuck document 6.

Figure 118:
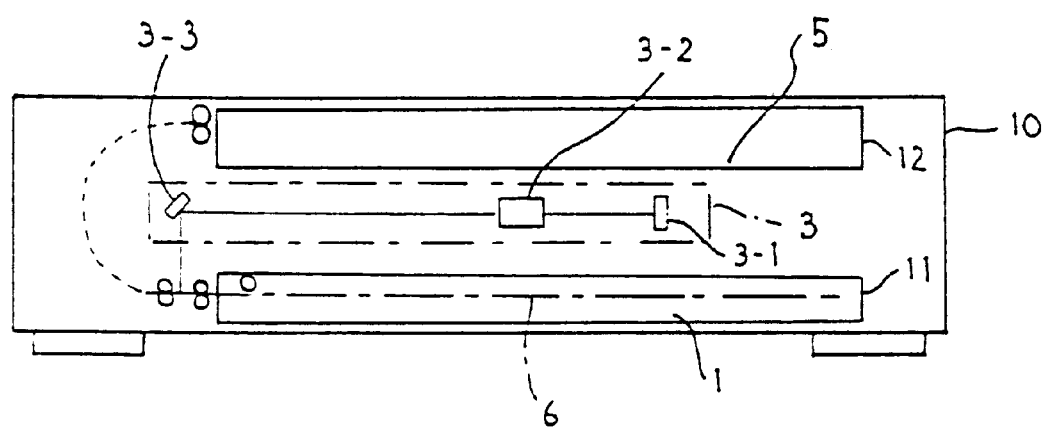
FIG. 118 is a cross sectional view showing an important part of a twenty-fourth embodiment of the apparatus according to the present invention.

FIG. 118 shows an essential part of a twenty-fourth embodiment of the apparatus according to the present invention. In FIG. 118, those parts which are the same as those corresponding parts in FIG. 98 are designated by the same reference numerals, and a description thereof will be omitted. In this embodiment, the stacker part 5 is located at a position above the hopper part 1.

In general, a reduction optical system has advantages in that a high-speed read can be made by a contact type image sensor, a fine gradation of the image is obtainable, and the system is inexpensive. On the other hand, the volume of the optical system becomes several times to several tens of times bigger. When the image reader part 3 employs the reduction optical system including the lens, mirror, CCD and the like, the optical system is arranged laterally on the document reading side (top side in FIG. 98 and the like) of the drawer 11.

Since the mirror, lens and the like are mounted in the optical system, the optical system has a certain thickness and this thickness increases the height of the apparatus. In this case, it is possible to employ the layout shown in FIG. 98 and the like where the hopper part 1 is provided in the upper level and the stacker part 5 is provided in the lower level or, the layout shown in FIG. 118 where the stacker part 5 is provided in the upper level and the hopper part 1 is provided in the lower level.

When the stacker part 5 is provided in the upper level and the hopper part 1 is provided in the lower level as shown in FIG. 118, the thickness of the optical system is used as it is to increase the radius of curvature of the document transport path at the document turn-over part 4 which turns over the document in the U-shape. Hence, there is an advantage in that it becomes easier to cope with thick sheet documents 6 because of the increased height of the apparatus.

The arrangement of the hopper part 1 and the stacker part 5 shown in FIG. 118 may of course be applied to the image forming apparatus such as the printer.

Although the illustration thereof will be omitted, it is possible to provide both the image reader part and the image forming part in the apparatus. In this case, it is possible to selectively use the apparatus as the image reading apparatus or the image forming apparatus. Furthermore, in this case, it is of course possible to provide one of or both the image reader part and the image forming part on the box shaped case or, to provide one of or both the image reader part and the image forming part on the drawer.

In addition, although the opening 11 corresponding to the hopper part 1 and the opening 12 corresponding to the stacker part 5 are provided on the same side (front face) of the box shaped case 10 in each of the described embodiments, it is possible to provide the opening 11 and the opening 12 on mutually different sides of the box shaped case 10.

Further, the present invention is not limited to these embodiments, but various variations and modifications may be made without departing from the scope of the present invention.

As described above, according to the apparatus of the present invention, a document input/output part does not exist at least on top of the apparatus, and a document which is subjected to an image read or an image formation process is ejected within a box shaped case. Hence, it is possible to confine the operation space for the image reading and image forming processes within the box shaped case, and an object can be placed on top of the apparatus. In addition, it is possible to effectively utilize not only the space above the apparatus but also the space in front, rear, right and left of the apparatus. For example, there is no part that projects from the side of the apparatus, and the restrictions related to the set-up position of the apparatus are small, thereby making it possible to efficiently utilize the office space and the like. Therefore, the present invention is extremely useful from the practical point of view.

We claim:

1. An apparatus comprising:
   a case having an opening;
   a hopper provided within said case to receive media;
   a stacker part provided within said case for stacking media transported along a first direction within said case from the hopper to the stacker part; and
   a movable ejector mechanism located in said case and including at least a portion of a wall of said stacker part, pushing the media stacked within said stacker part outwardly from said case via the opening.

2. The apparatus as claimed in claim 1, wherein said media has a first length in the first direction, and a second length in a direction perpendicular to the first direction, and wherein said mechanism pushes the media outwardly from said case, via the opening, by a distance which is less than or equal to the second length of the media.

3. The apparatus as claimed in claim 2, which further comprises:
   a motor operatively connected to and driving said mechanism.

4. The apparatus as claimed in claim 3, which further comprises:
   a detector detecting whether or not the media remains within said stacker part and producing a corresponding detector output; and
   a control unit for operating said motor in response to said detector output.

5. The apparatus as claimed in claim 4, wherein, in response to the detector output corresponding to no media remaining within said stacker part, said control unit operates said motor so as to return said mechanism from an operated position, at which the media has been pushed outwardly from said case via the opening, to a home position, at which the media is stacked within said stacker part.

6. The apparatus as claimed in claim 2, which further comprises:
   a detector detecting a size of the media and producing a corresponding size detection output; and
   a control unit controlling said distance in response to the size detection output of said detector.

7. The apparatus as claimed in claim 2, further comprising:
   a guide for guiding said part of the wall of said stacker part in a second direction.

8. The apparatus as claimed in claim 7, wherein said guide comprises a guide rail for guiding said part of the wall of said stacker part.

9. The apparatus as claimed in claim 7, wherein said guide comprises at least one guide slot for guiding said part of the wall of said stacker part.

10. The apparatus as claimed in claim 7, wherein said guide comprises at least one guide groove for guiding said part of the wall of said stacker part.

11. The apparatus as claimed in claim 10, wherein said guide groove is tapered in the first direction, which is approximately perpendicular to the second direction.

12. The apparatus as claimed in claim 11, wherein a length of said part of the wall of said stacker part, along the first direction, is at least approximately the same as a length of a medium which is usable on said apparatus, and has a minimum size along the first direction.

13. The apparatus as claimed in claim 10, wherein said part of the wall of said stacker part is of a length approximately the same as a length of the opening along the first direction which is approximately perpendicular to the second direction.

14. The apparatus as claimed in claim 1, which further comprises:
   a manually operated handle operatively connected to and operating said mechanism so as to push the media outwardly from said case via the opening.

15. The apparatus as claimed in claim 14, which further comprises:
   a rack-and-pinion part driving said mechanism by transferring a movement of said handle to said mechanism in response to a manipulation of said handle.

16. The apparatus as claimed in claim 14, which further comprises:
   a spring returning said handle from an operated position, at which the media is pushed outwardly from said case via the opening, to a home position, at which the media remains within said stacker part.

17. The apparatus as claimed in claim 1, which further comprises:
   a sloping guide mounted on said stacker part adjacent said opening and raising, upwardly, an end of the media pushed outwardly by said mechanism.

18. The apparatus as claimed in claim 17, wherein said sloping guide is detachably mounted on said stacker part.

19. The apparatus as claimed in claim 17, wherein said sloping guide is pivotable, providing a selectively variable inclination angle.

20. The apparatus as claimed in claim 1, further comprising:
   a guide guiding said part of the wall of said stacker part in a second direction.

21. The apparatus as claimed in claim 20, wherein said guide comprises a guide rail guiding said part of the wall of said stacker part.

22. The apparatus as claimed in claim 20, wherein said guide comprises at least one guide slot guiding said part of the wall of said stacker part.

23. The apparatus as claimed in claim 20, wherein said guide comprises at least one guide groove guiding said part of the wall of said stacker part.

24. The apparatus as claimed in claim 23, wherein said guide groove is tapered in the first direction which is approximately perpendicular to the second direction.

25. The apparatus as claimed in claim 24, wherein a length of said part of the wall of said stacker part, along the first direction, is at least approximately the same as a length of a medium which is usable on said apparatus, and has a minimum size along the first direction.

26. The apparatus as claimed in claim 23, wherein said part of the wall of said stacker part is of a length approximately the same as a length of the opening along the first direction, which is approximately perpendicular to the second direction.

27. The apparatus as claimed in claim 1, which further comprises:
   a detector detecting an amount of the media stacked in said stacker part and producing a corresponding amount detection output; and
   a control unit outputting an alarm when the amount detection output of said detector exceeds a tolerable value.

28. An apparatus comprising:
   a case having an opening;
   a stacker part provided within said case for stacking media transported within said case; and
   a movable ejector mechanism, located in said case and including at least a portion of a wall of said stacker part, for pushing the media stacked within said stacker part outwardly from said case via the opening,
   wherein said media has a first length and a second length perpendicular to the first length, and wherein said mechanism pushes the media outwardly by a distance which is less than or equal to the second length of the media.

29. The apparatus as claimed in claim 28, further comprising:
   a manually operated handle operatively connected to and operating said mechanism so as to push the media outwardly.

30. The apparatus as claimed in claim 29, further comprising:
   a rack-and-pinion part driving said mechanism by transferring a movement of said handle to said mechanism in response to a manipulation of said handle.

31. The apparatus as claimed in claim 29, further comprising:
   a spring for return g said handle from an operated position, at which the media is pushed outwardly from said case via the opening, to a home position, at which the media is stacked within said stacker part.

32. The apparatus as claimed in claim 28, further comprising:
   a motor operatively connected to and driving said mechanism.

33. The apparatus as claimed in claim 32, further comprising:
   a detector for detecting whether or not the media remain s within said stacker part, and producing a corresponding detector output; and
   a control unit for operating said motor in response to said detector output.

34. The apparatus as claimed in claim 33, wherein, in response to a detector output corresponding to no media remaining within said stacker part, said control unit operates said motor so as to return said mechanism from an operated position, at which the media has been pushed outwardly from said case via the opening, to a home position, at which the media is stacked within said stacker part.

35. The apparatus as claimed in claim 28, further comprising:
   a sloping guide mounted on said stacker part adjacent said opening and raising, upwardly, an end of the media pushed outwardly by said mechanism.

36. The apparatus as claimed in claim 35, wherein said sloping guide is detachably mounted on said stacker part.

37. The apparatus as claimed in claim 35, wherein said sloping guide is pivotable, providing a selectively variable inclination angle.

38. The apparatus as claimed in claim 28, further comprising:
   a detector for detecting a size of the media, and producing a corresponding size detection output; and
   a control unit controlling said distance in response to the size detection output of said detector.

39. The apparatus as claimed in claim 28, further comprising:
   a detector detecting an amount of the media stacked in said stacker part, and producing a corresponding amount detection output; and
   a control unit outputting an alarm when the amount detection output of said detector exceeds a tolerable value.

40. An apparatus comprising:
   a case having an opening;
   a hopper provided within said case to receive media;
   a stacker part provided within said case for stacking media transported within said case along a first direction from the hopper to the stacker part; and
   a movable ejector mechanism located within said case and including at least a portion of a wall of said stacker part, pushing the media, stacked within said stacker part, from said case outwardly via the opening along a second direction substantially perpendicular to the first direction.

41. The apparatus as claimed in claim 40, wherein said media has a first length in the first direction and a second length in the second direction, and wherein said mechanism pushes the media outwardly, by a distance which is less than or equal to the second length of the media.

42. The apparatus as claimed in claim 41, further comprising:
   a motor operatively connected to and driving said mechanism.

43. The apparatus as claimed in claim 42, further comprising:
   a detector detecting whether or not the media remains within said stacker part, and producing a corresponding detector output; and
   a control unit for operating said motor in response to said detector output.

44. The apparatus as claimed in claim 43, wherein, in response to a detector output corresponding to no media remaining within said stacker part, said control unit operates said motor so as to return said mechanism from an operated position, at which the media has been pushed outwardly, to a home position, at which the media is stacked within said stacker part.

45. The apparatus as claimed in claim 41, further comprising:
   a detector detecting a size of the media, and producing a corresponding size detection output; and
   a control unit controlling said distance in response to the size detection output of said detector.

46. The apparatus as claimed in claim 40, further comprising:
   a manually operated handle operatively connected to and operating said mechanism so as to push the media outwardly.

47. The apparatus as claimed in claim 46, further comprising:
   a rack-and-pinion part driving said mechanism by transferring a movement of said handle to said mechanism in response to a manipulation of said handle.

48. The apparatus as claimed in claim 46, further comprising:
   a spring for returning said handle from an operated position, at which the media is pushed outwardly from said case via the opening, to a home position, at which the media is stacked within said stacker part.

49. The apparatus as claimed in claim 40, further comprising:
   a sloping guide mounted on said stacker part adjacent said opening and raising, upwardly, an end of the media pushed outwardly by said mechanism.

50. The apparatus as claimed in claim 49, wherein said sloping guide is detachably mounted on said stacker part.

51. The apparatus as claimed in claim 49, wherein said sloping guide is pivotable, providing a selectively variable inclination angle.

52. The apparatus as claimed in claim 40, further comprising:
   a guide for guiding said part of the wall of said stacker part in the second.

53. The apparatus as claimed in claim 52, wherein said guide comprises a guide rail for guiding said part of the wall of said stacker part.

54. The apparatus as claimed in claim 52, wherein said guide comprises at least one guide slot for guiding said part of the wall of said stacker part.

55. The apparatus as claimed in claim 52, wherein said guide comprises at least one guide groove for guiding said part of the wall of said stacker part.

56. The apparatus as claimed in claim 55, wherein said guide groove is tapered in the first direction.

57. The apparatus as claimed in claim 55, wherein a length of said part of the wall of said stacker part, along the first direction, is at least approximately the same as a length of a medium which is usable on said apparatus, and has a minimum size along the first direction.

58. The apparatus as claimed in claim 55, wherein said part of the wall of said stacker part is of a length approximately the same as a length of the opening along the first direction.

59. The apparatus as claimed in claim 40, further comprising:
   a detector detecting an amount of the media stacked in said stacker part, and producing a corresponding amount detection output; and
   a control unit outputting an alarm when the amount detection output of said detector exceeds a tolerable value.

* * * * *

UNITED STATES PATENT AND TRADEMARK OFFICE
CERTIFICATE OF CORRECTION

PATENT NO.: 6,079,707
DATED : June 27, 2000
INVENTOR(S): Tatsuo FUJIWARA et al.

It is certified that error appears in the above-identified patent and that said Letters Patent is hereby corrected as shown below:

On the title page, [62] Related U.S. Application Data, change "October 12, 1992" to --October 8, 1993--.

Col. 35, line 35, change 'return g" to --returning--;
lines 46-47, change "remain s" to --remains--.

Signed and Sealed this

Twenty-second Day of May, 2001

Attest:

NICHOLAS P. GODICI

Attesting Officer

Acting Director of the United States Patent and Trademark Office